United States Patent
Igarashi et al.

(10) Patent No.: US 6,324,216 B1
(45) Date of Patent: Nov. 27, 2001

(54) VIDEO CODING SELECTABLE BETWEEN INTRA-FRAME PREDICTION/FIELD-BASED ORTHOGONAL TRANSFORMATION AND INTER-FRAME PREDICTION/FRAME-BASED ORTHOGONAL TRANSFORMATION

(75) Inventors: Katsuji Igarashi, Tokyo; Jun Yonemitsu; Yoichi Yagasaki, both of Kanagawa; Yasushi Fujinami, Kanagawa; Tomoyuki Sato, Tokyo; Motoki Kato, Kanagawa; Teruhiko Suzuki, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/454,076

(22) Filed: May 30, 1995

Related U.S. Application Data

(60) Division of application No. 08/084,642, filed on Jun. 29, 1993, now Pat. No. 6,226,327, which is a continuation-in-part of application No. 08/030,019, filed on Apr. 21, 1993, now abandoned.

(30) Foreign Application Priority Data

Jun. 29, 1992 (JP) .................................................. 04-170324
Jul. 28, 1992 (JP) .................................................. 04-219633

(51) Int. Cl.[7] .................................................. H04N 7/12
(52) U.S. Cl. ............................................... 375/240.14
(58) Field of Search .................................... 348/416, 415, 348/409, 413, 412, 411, 402, 401, 400, 390, 384; 375/240.14, 240.22

(56) References Cited

U.S. PATENT DOCUMENTS

| | | |
|---|---|---|
| 4,217,609 | 8/1980 | Hatori et al. .................... 348/412 |
| 4,437,119 | 3/1984 | Matsumoto et al. .............. 348/412 |
| 4,546,386 | 10/1985 | Matsumoto et al. ............. 348/412 |
| 4,571,618 | 2/1986 | Hatori et al. .................... 348/412 |
| 5,068,724 | 11/1991 | Krause et al. ................... 348/402 |
| 5,091,782 | 2/1992 | Krause et al. ................... 348/400 |
| 5,093,720 | 3/1992 | Krause et al. ................... 348/416 |
| 5,175,618 | 12/1992 | Ueda et al. ...................... 348/416 |
| 5,351,086 | * 9/1994 | Park .................................. 348/402 |
| 5,355,378 | 10/1994 | Ohta .................................. 348/413 |

OTHER PUBLICATIONS

"Test Model 1 Draft", CCITT SG XV, Working Party XV/1 Experts group on ATM Video Coding, ISO–IEC/JTC1/SC29/WG11, MPEG 92/160, May 5, 1992.

"Test Model 4 Draft", CCITT SG XV, Working Party XV/1 Experts group on ATM Video Coding, ISO–IEC/JTC1/SC29/WG11, MPEG 93/225b, Feb. 1993.

* cited by examiner

*Primary Examiner*—Chris Kelley
(74) *Attorney, Agent, or Firm*—Frommer Lawrence & Haug LLP; William S. Frommer

(57) ABSTRACT

An encoder considers a frame representing a picture as comprised of areas. For each area, the encoder decides which of frame-based or field-based orthogonal transformation will be most efficient at reducing spatial redundancy in that area. For each area, the encoder decides which of frame-based or field-based predictive encoding will be most efficient at reducing temporal redundancy in that area. The encoder encodes each area of the picture frame using the most efficient orthogonal transformation technique and using the most efficient predictive encoding technique to produce an encoded signal. A decoder decodes the encoded signal. The encoded signal is recorded on a recording medium, transmitted over a transmission channel, or broadcast.

4 Claims, 46 Drawing Sheets

FIG.10A

|  | | | | | |
|---|---|---|---|---|---|
| 1/37 | 2/38 | 3/39 | 4 | 5 | 6 |
| 7 | 8/40 | 9/41 | 10/42 | 11 | 12 |
| 13 | 14 | 15/43 | 16/44 | 17/45 | 18 |
| 19 | 20 | 21/46 | 22/47 | 23/48 | 24/49 |
| 25 | 26 | 27/50 | 28/51 | 29 | 30 |
| 31/52 | 32/53 | 33/54 | 34/55 | 35 | 36 |

ODD / EVEN, INTERLACED, MB, PICTURE

FIG.10B

|  | | | | | |
|---|---|---|---|---|---|
| 1 | 2 | 3 | 4 | 5 | 6 |
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

ODD, EVEN, MB

FIG.10C

|  | | | | | |
|---|---|---|---|---|---|
| 1/2 | 3/4 | 5/6 | 7 | 8 | 9 |
| 10 | 11/12 | 13/14 | 15/16 | 17 | 18 |
| 19 | 20 | 21/22 | 23/24 | 25/26 | 27 |
| 28 | 29 | 30/31 | 32/33 | 34/35 | 36/37 |
| 38 | 39 | 40/41 | 42/43 | 44 | 45 |
| 46/47 | 48/49 | 50/51 | 52/53 | 54 | 55 |

ODD / EVEN, INTERLACED, MB

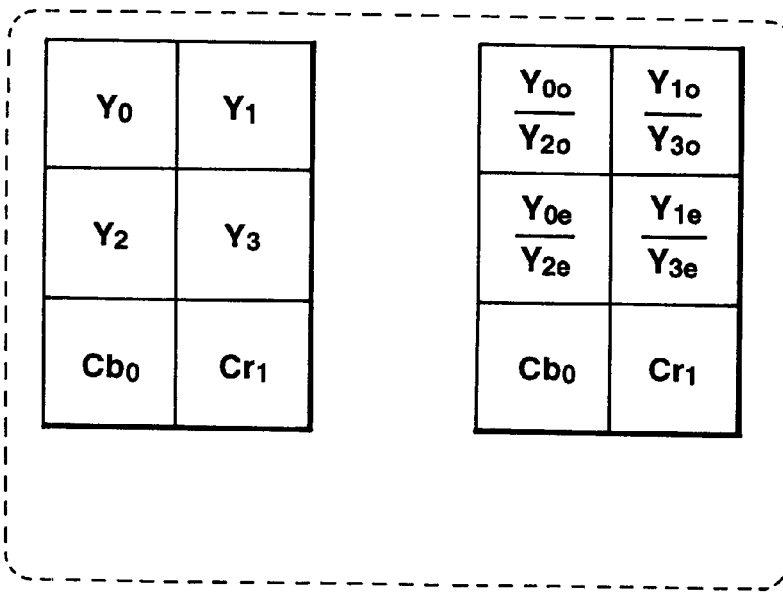
FIG.15A   FIG.15B
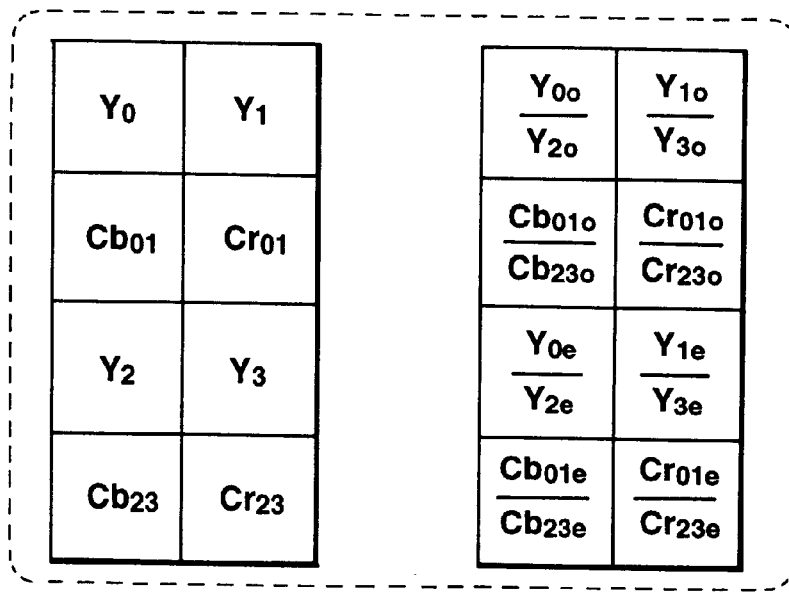
FIG.15C   FIG.15D

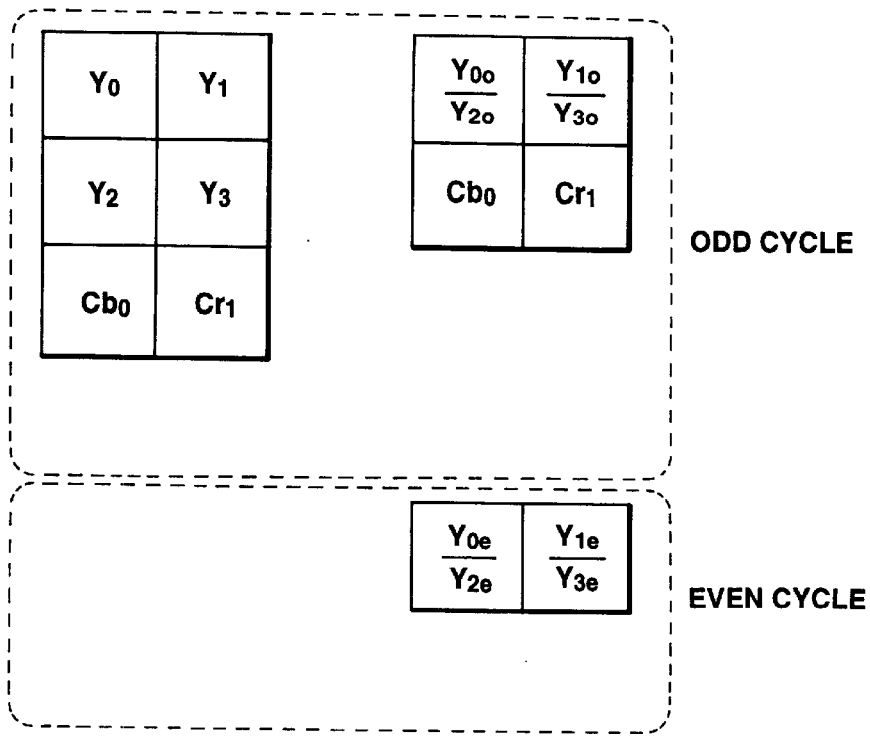
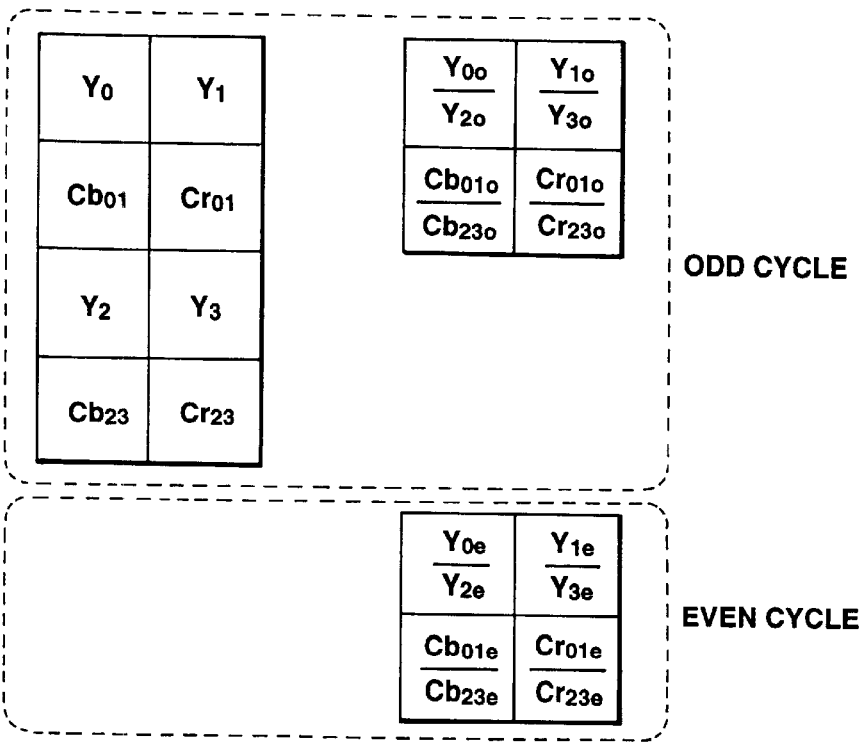
FIG.16A FIG.16B
FIG.16C FIG.16D

VIDEO CODING SELECTABLE BETWEEN INTRA-FRAME PREDICTION/FIELD-BASED ORTHOGONAL TRANSFORMATION AND INTER-FRAME PREDICTION/FRAME-BASED ORTHOGONAL TRANSFORMATION

This is a divisional of U.S. application Ser. No. 08/084,642, now U.S. Pat. No. 6,226,327 which is a continuation-in-part of application Ser. No. 08/030,019, filed in the United States Patent and Trademark Office on Apr. 21, 1993, now abandoned and corresponding to International Application No. PCT/JP92/00956, the disclosure of which is incorporated herein.

BACKGROUND OF THE INVENTION

This invention relates to the encoding and decoding of interlace scanned picture signals using predictive encoding and DCT transformation, and to a recording medium on which the encoded signals are recorded.

The Moving Picture Experts Group has proposed a standard for high efficiency encoding of progressively scanned picture signals and recording of the same on digital storage media in its Committee Draft MPEG 90/176/Revision 2 (1990), subsequently published as ISO/IEC 11172-2 (1992). The high efficiency is achieved through reduction of temporal and spatial redundancy in a picture.

Storage media intended for use with such encoded picture signals, such as an optical compact disc (CD), a digital audio tape (DAT) or a magnetic disk, have a continuous transfer rate of up to 1.5 Mbit/sec. A storage medium may be directly connected to a decoder or it may be connected thereto via a transmission medium such as a computer bus, local area network (LAN) or telecommunications line.

The 1990 MPEG draft standard contemplates the implementation of special functions beyond normal forward playback, such as random accessing, high speed playback, and reverse playback.

Temporal redundancy between successive pictures is reduced by predictive encoding, wherein corrections are applied to a previously encoded picture to obtain a current picture, that is, predictive encoding avoids the need to transmit a picture in its entirety. More specifically, motion compensation vectors are applied to a previous picture to obtain a predicted picture, which is subtracted from the current picture to provide differential data. The current picture is represented by the motion compensation vectors and differential data. This technique is very efficient, that is, permits representation of a picture with a substantially reduced amount of data, for a picture having little motion relative to a previous picture.

As shown in FIG. 1, three types of pictures may exist in a sequence of pictures.

An intra coded picture (I picture) is coded without reference to other pictures. An I picture permits random access of a sequence of pictures, but cannot be efficiently coded.

A predictive coded picture (P picture) is coded by predicting forward in time from a previously encoded I picture or P picture. A P picture is used as a reference for further prediction, and can be efficiently coded.

A bidirectionally coded picture (B picture) is coded using one or both of a temporally preceding (past) picture and a temporally succeeding (future) picture as reference pictures. B pictures are never used as references for prediction, but can be compressed with extreme efficiency.

A decodable sequence of pictures includes at least one I picture and a variable number of P and B pictures. One or more B pictures may be located temporally between two P pictures, or between an I picture and a P picture. When these pictures are encoded for transmission or recording, their sequence is changed from a temporal sequence to an encoded sequence, so that the decoder will have decoded the one or more pictures (I or P pictures) from which a current picture (P or B picture) is predicted before decoding of the current picture commences. The decoder returns the decoded pictures to their original temporal sequence, and presents the thus decoded sequence for display.

Spatial redundancy within a picture is reduced by an orthogonal transformation, such as a discrete cosine transformation (DCT), of a portion of the picture from the time domain into the frequency domain. A block of pixel data from the picture having a dimension of, for example, 8 pixels width×8 rows height, representing luminance or chrominance amplitudes at the respective pixels, is converted by DCT transformation into a block of 8×8 frequency coefficients, which is scanned in a predetermined zigzag manner from low frequency to high frequency to provide a sequence of 64 coefficients representing the amounts of respective frequencies contained in the block. The first coefficient is referred to as the DC coefficient, while the other 63 coefficients are referred to as the AC or high frequency coefficients. A pixel block representing a solid portion of an image corresponds to a DC coefficient indicating the amplitude of the solid portion, and no high frequency coefficients. A pixel block representing a highly detailed image portion corresponds to coefficient data with many non-zero AC values.

A picture of a natural scene tends to be smooth, that is, to lack highly detailed image portions. Consequently, the pixel blocks of such a picture correspond to DCT coefficients lacking AC coefficients, that is, having runs of zero data. These runs of zero data are variable length coded by representing them as a run-length number indicating how many zeros are in the run. The run-length value is further encoded using a Huffman code.

At the decoder, the encoded signal is variable length decoded (inverse variable length coded), and then inverse DCT transformed to recover the original pixel data for the picture.

Applying the techniques of predictive encoding and orthogonal transformation to a picture sequence removes significant amounts of temporal and spatial redundancy from the picture sequence and results in a highly efficiently encoded representation of the picture sequence.

The 1990 MPEG draft standard is concerned with processing pictures on a frame by frame basis, and assumes that each frame is progressively scanned. In progressive scanning, the rows of pixels in a frame are scanned from top to bottom. During display, the pixels are presented in this same order.

In interlace scanning, first the odd-numbered rows of pixels forming an odd field in a frame are scanned, then the even-numbered rows of pixels forming an even field in the frame are scanned. During display, the odd field is displayed and then the even field is displayed such that its rows are interlaced with the rows in the odd field.

If motion is represented in a sequence of interlaced scanned pictures, each frame exhibits comb-like deformation. FIG. 2 shows an image of a car moving from the left side of the picture to the right side of the picture. When the odd field is scanned, the car is in one position. By the time that the even field is scanned, the car has advanced towards the right. During display of the interlaced scanned fields of a frame representing this picture, the edges represented by the even field are shifted with respect to the edges represented by the odd field, causing the edges of an object to appear jagged. The comb deformation may be particularly seen in a vertical edge, such as the front of the car.

An interlace scanned picture having comb deformation due to motion cannot be efficiently encoded using the technique proposed in the 1990 MPEG draft standard due to the large amount of data needed to represent the moving (jagged) edges in the picture.

If this interlace scanned picture is considered as two fields which are separately encoded, the resulting signal is also encoded with low efficiency due to the inefficiency of representing stationary portions of the image with field by field encoding.

Thus, there is no known way to encode a picture having stationary portions and moving portions with high efficiency.

OBJECTS AND SUMMARY OF THE INVENTION

Therefore, an object of the present invention is to provide a technique for encoding and decoding a signal with high efficiency which avoids the aforementioned disadvantages of the prior art.

Another object of the present invention is to encode a picture having stationary portions and moving portions with high efficiency.

Yet another object of the present invention is to encode a picture representing motion so that a decoder for the encoded picture can be realized as a small and inexpensive circuit.

A further object of the present invention is to encode a picture representing a lot of motion differently than a picture representing a moderate or no amount of motion.

In accordance with an aspect of this invention, a picture signal is encoded by receiving an interlaced signal having a frame containing an odd field and an even field and representing a current picture. The odd and even fields for the frame representing the current picture are evaluated two times, first, to determine a first amount of data which would result from frame-based orthogonal transformation of the current picture, and second, to determine a second amount of data which would result from field-based orthogonal transformation of the current picture. The one of the frame-based orthogonal transformation and the field-based orthogonal transformation which corresponds to the lesser of the first and second amounts of data is selected, and the current picture is orthogonally transformed using the selected one of the frame-based orthogonal transformation and the field-based orthogonal transformation.

In accordance with another aspect of this invention, a picture signal is encoded by receiving an interlaced signal having frames each containing an odd field and an even field and representing a current picture and at least one other picture. The odd and even fields for the frame representing the current picture are evaluated two times, first, to determine a first amount of data which would result from frame-based predictive encoding of the current picture, and second, to determine a second amount of data which would result from field-based predictive encoding of the current picture. The one of the frame-based predictive encoding and the field-based predictive encoding which corresponds to the lesser of the first and second amounts of data is selected, and the current picture is predictively encoded using the selected one of the frame-based predictive encoding and the field-based predictive encoding.

In accordance with another aspect of this invention, a picture signal is encoded by receiving an interlaced signal having frames each containing an odd field and an even field, the interlaced signal representing a current picture and at least one other picture. One of a first mode of only field-based predictive encoding and a second mode of field-based predictive encoding and frame-based predictive encoding is selected, and the current picture is predictively encoded relative to the at least one other picture using the selected one of the first mode and the second mode.

In accordance with another aspect of this invention, a picture signal is decoded by receiving an encoded signal including an encoded picture and a header indicating which of frame-based orthogonal transformation and field-based orthogonal transformation was used to encode the encoded picture. When the header indicates that the encoded picture was encoded using frame-based orthogonal transformation, the encoded picture is frame-based inverse orthogonally transformed. When the header indicates that the encoded picture was encoded using field-based orthogonal transformation, the encoded picture is field-based inverse orthogonally transformed.

In accordance with another aspect of this invention, a picture signal is decoded by receiving an encoded signal including an encoded picture and a header indicating which of frame-based predictive encoding and field-based predictive encoding was used to encode the encoded picture. When the header indicates that the encoded picture was encoded using frame-based predictive encoding, the encoded picture is frame-based predictively decoded. When the header indicates that the encoded picture was encoded using field-based predictive encoding, the encoded picture is field-based predictively decoded.

In accordance with another aspect of this invention, a picture signal is decoded by receiving an encoded signal including a header indicating which of a first mode of only field-based predictive encoding and a second mode of field-based predictive encoding and frame-based predictive encoding was used to encode the encoded signal, and predictively decoding the encoded signal using the one of the first and second modes indicated in the header.

The above, and other objects, features and advantages of the present invention will be apparent in the following detailed description of the preferred embodiments of the present invention when read in conjunction with the accompanying drawings in which corresponding parts are identified by the same reference numeral.

BRIEF DESCRIPTION OF THE DRAWINGS

FIGS. 10A–10C are charts respectively illustrating a scanning sequence according to the present invention for areas of a frame;

FIGS. 15A–15D are macroblock transmission sequences to which reference will be made in explaining the operation of the encoder of FIG. 3;

FIGS. 16A–16D are macroblock transmission sequences to which reference will be made in explaining the operation of the encoder of FIG. 4;

DETAILED DESCRIPTION OF THE PREFERRED EMBODIMENTS

In the present invention, a picture is considered as a mosaic of areas, and, to reduce spatial redundancy, each area is orthogonally transformed using either a frame-based transformation or a field-based transformation, depending on which will result in the least amount of transformed data, that is, frequency domain coefficients. Typically, a frame-based transformation is used for areas representing stationary portions of the picture, while a field-based transformation is used for areas representing moving portions of the picture.

In the present invention, a picture is considered as a mosaic of areas, and, to reduce temporal redundancy, each area is predictively encoded using either frame-based motion compensation of a previously encoded area, or field-based motion compensation of a previously encoded area, depending on which will result in the least amount of motion compensation data, that is, motion vectors for application to a previously encoded area to predict the current area. Typically, frame-based predictive encoding is used for areas which are stationary during a sequence of pictures, while field-based predictive encoding is used for areas exhibiting movement in the series of pictures.

Figure 3:
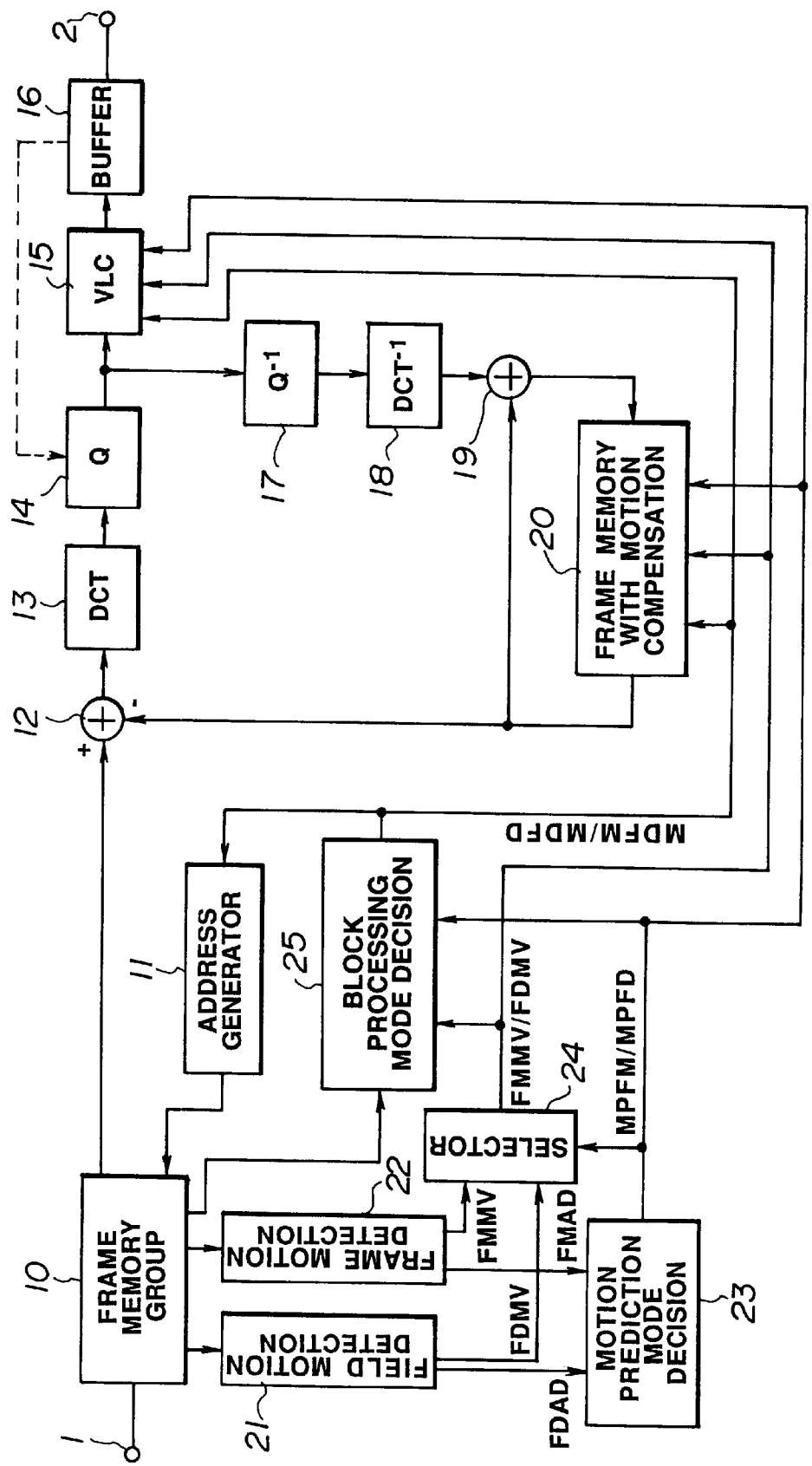
FIG. 3 is a block diagram showing an embodiment of an encoder according to the present invention.
Figure 4:
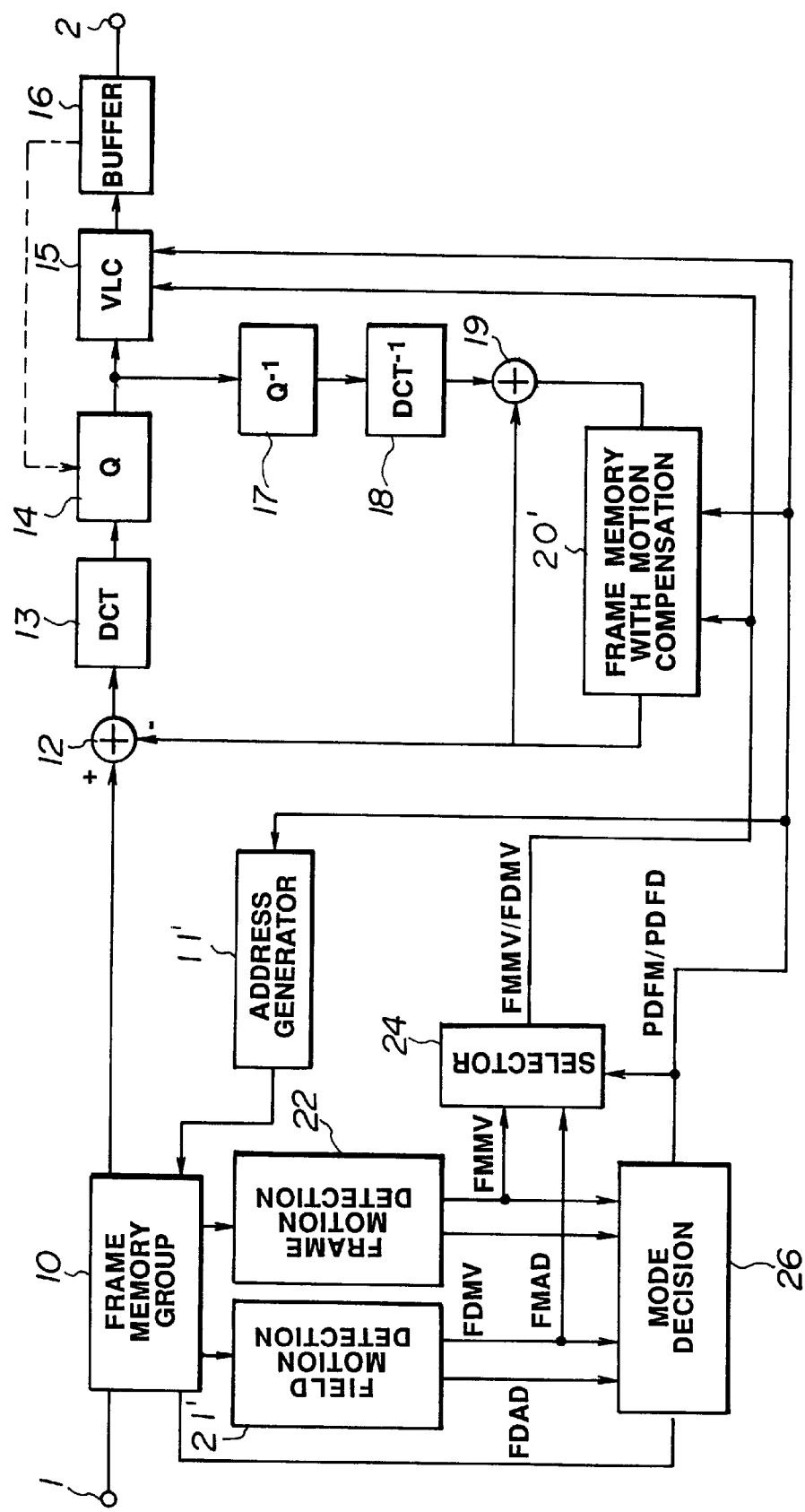
FIG. 4 is a block diagram showing another embodiment of an encoder according to the present invention.
Figure 5:
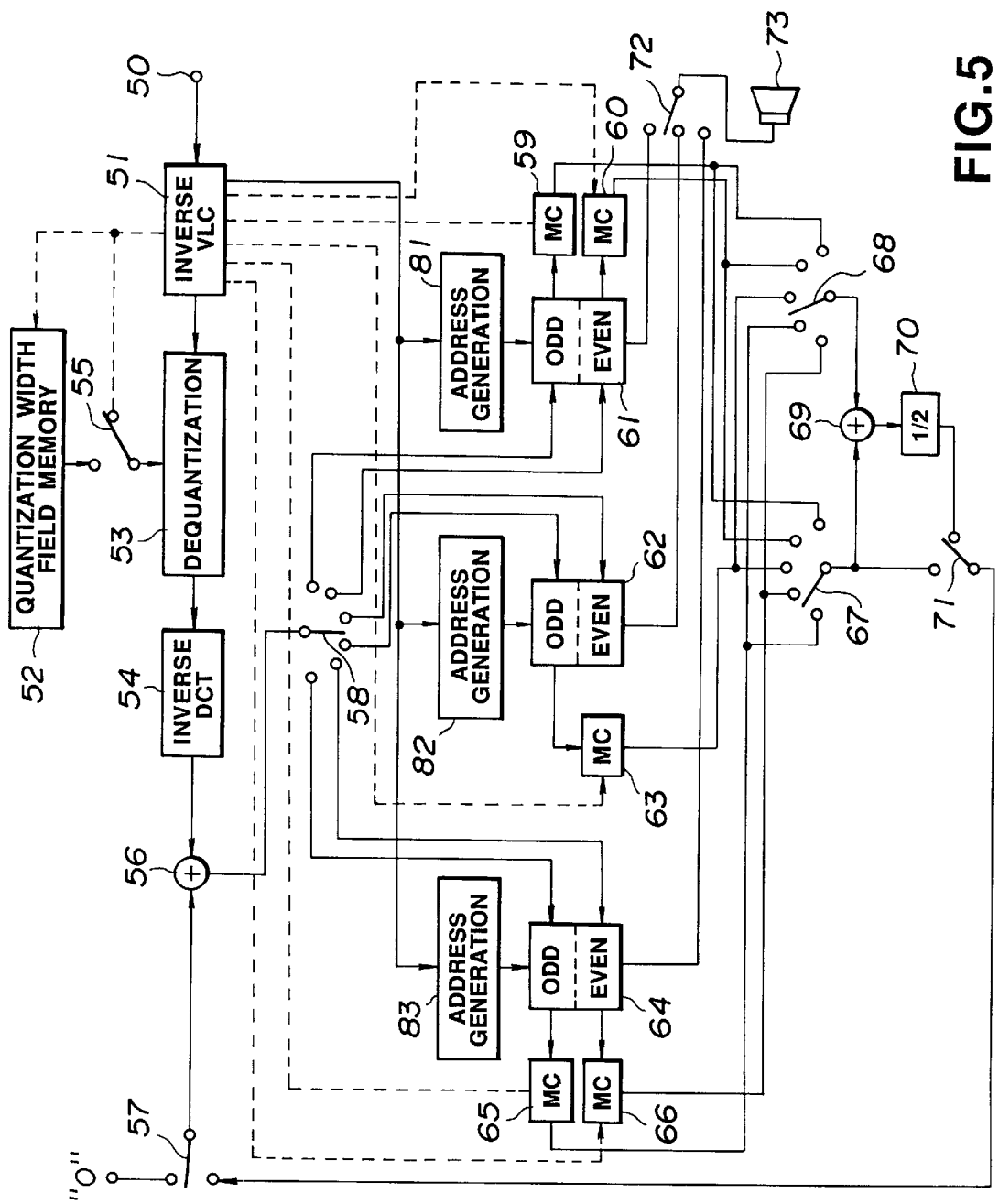
FIG. 5 is a block diagram showing an embodiment of a decoder according to the present invention.

When a picture is encoded, the type of orthogonal transformation may be selected independently of the type of predictive encoding, as is done in an encoder shown in FIG. 3, or the types of orthogonal transformation and predictive encoding may be constrained to be the same, as is done in an encoder shown in FIG. 4. Such constraint simplifies the construction of the encoder of FIG. 4. FIG. 5 shows a decoder according to the present invention, which serves to decode an encoded signal produced by the encoder of FIG. 3 or FIG. 4. After several concepts important to the present invention are explained, the construction and operation of the encoders of FIGS. 3 and 4, and the decoder of FIG. 5 will be explained in detail.

The concepts of frame-based and field-based orthogonal transformation of a picture will now be explained.

Figure 6:
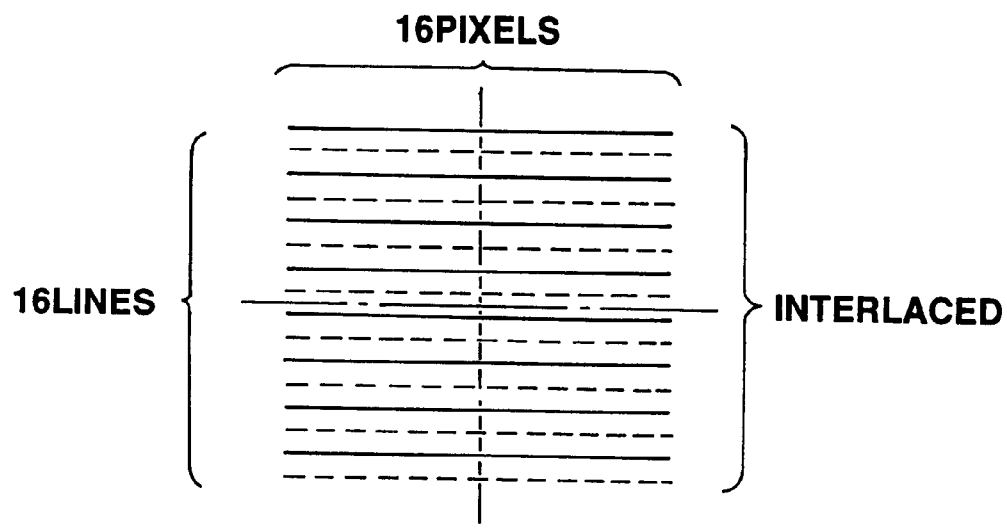
FIG. 6 is a diagram illustrating a macroblock formed of interlaced odd and even rows of a frame representing a picture.

An area of a picture includes pixels in odd-numbered rows and pixels in even-numbered rows. In frame-based processing, the pixel rows in an area are processed while they are interlaced, as shown in FIG. 6. DCT transformation is performed on a block of interlaced picture data of size 8 pixels×8 rows.

As used herein and in the claims, frame-based orthogonal transformation means an orthogonal transformation performed on an 8×8 block of picture data having rows from both the odd field and the even field of a frame, preferably alternating odd field rows and even field rows.

Figure 7:
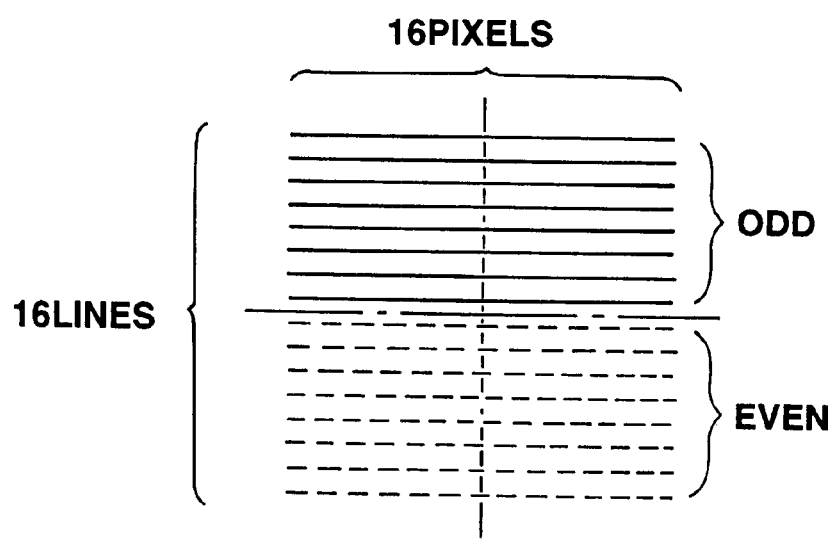
FIG. 7 is a diagram illustrating a macroblock formed of segregated odd and even rows of a frame representing a picture.

In field-based processing, the odd-numbered rows in an area of a picture are separated from the even-numbered rows in that area, and all of the odd-numbered rows are processed before all of the even-numbered rows, as shown in FIG. 7. DCT transformation is performed on an 8×8 block of data representing either an odd field or an even field of a picture area, that is, DCT transformation is performed on an 8×8 block of segregated picture data.

As used herein and in the claims, field-based orthogonal transformation means an orthogonal transformation performed on an 8×8 block of picture data having rows from either the odd field or the even field of a frame, but not both.

It is an important aspect of the present invention that the type of orthogonal transformation is selectable on an area by area basis for a picture. This selectability ensures transformation of each picture with the type of transformation best suited to its characteristics.

As mentioned, the amount of motion represented in a picture has a large influence on the amount of DCT coefficient data needed to represent the picture. As an example, in the car scene shown in FIG. 2, an area representing the street is uniform, and suitable for frame-based DCT transformation. However, an area representing the front edge of the car is ill-suited for frame-based DCT transformation, as a substantial amount of high frequency coefficients in a transformed block will have non-zero value, reducing the length of zero runs, and thus reducing the efficiency of the variable length code.

In contrast, in field-based processing, the odd-numbered rows in the edge of the car are considered separately from the even-numbered rows so that no abrupt transitions need be represented, that is, only smoothly changing edges need be represented, dramatically reducing the amount of high frequency coefficient data relative to when the rows are processed in interlaced form. Correspondingly, the zero runs in field-based DCT transformation of the edge of the car are longer than those in frame-based DCT transformation, so less variable length code encoded data is needed to represent the car edge using field-based DCT transformation.

In view of the influence of motion on the efficiency of orthogonal transformation, it is appropriate to select which of frame-based transformation and field-based transformation is best for an area of a picture as a function of the amount of motion in that area.

The concepts of frame-based and field-based predictive encoding of a picture will now be explained.

Figure 1:
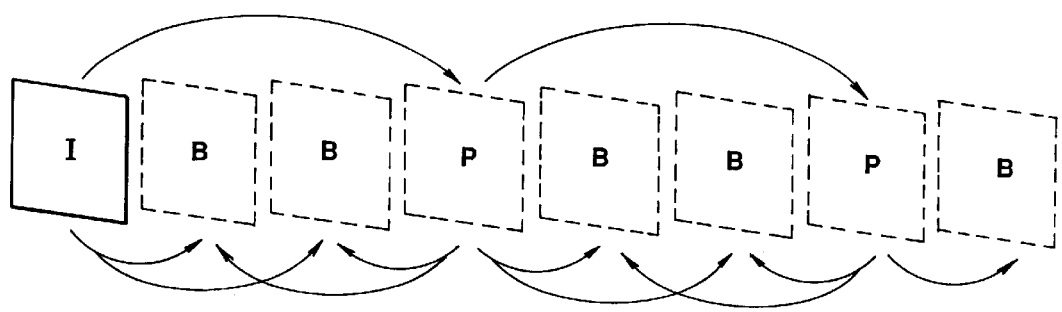
FIG. 1 is a chart showing the relationship between intra coded frame pictures, predictively encoded frame pictures and bidirectionally encoded frame pictures.

Each of the I, B and P pictures shown in FIG. 1 is a frame having an odd field and an even field. When the odd field in a frame is processed separately from the even field in the frame, it becomes possible to predict one field from another field. In this situation, the field is sometimes referred to herein as a picture. That is, an I picture is comprised of an $I_{ODD}$ picture and an $I_{EVEN}$ picture, a B picture is comprised of a $B_{ODD}$ picture and a $B_{EVEN}$ picture, and a P picture is comprised of a $P_{ODD}$ picture and a $P_{EVEN}$ picture. Table 1 shows inter-frame field predictability in the present invention and Table 2 shows intra-frame field predictability, with YES meaning that such prediction is always possible in field-based prediction, a double dash (--) meaning that such prediction is never possible, and MAYBE meaning that such prediction is possible in certain embodiments of the present invention.

As used herein and in the claims, frame-based predictive encoding means using a macroblock-sized amount of data from a previously encoded reference picture as the prediction of the current macroblock, with the macroblock having 8×8 blocks containing data from both an odd field and an even field of a frame, and subtracting the thus-obtained prediction from the current macroblock to obtain differential data which is frame-based predictively encoded data.

As used herein and in the claims, field-based predictive encoding means using a macroblock sized amount of data from a previously encoded reference picture as the prediction of the current macroblock, with the macroblock having 8×8 blocks containing data from either an odd field or an even field of a frame, and subtracting the thus-obtained prediction from the current macroblock to obtain differential data which is field-based predictively encoded data.

TABLE 1

Inter-frame Field Predictability

| from PREVIOUS | to CURRENT | | | | | |
|---|---|---|---|---|---|---|
| | $I_{ODD}$ | $I_{EVEN}$ | $B_{ODD}$ | $B_{EVEN}$ | $P_{ODD}$ | $P_{EVEN}$ |
| $I_{ODD}$ | — | — | MAYBE | MAYBE | YES | YES |
| $I_{EVEN}$ | — | — | YES | YES | YES | YES |
| $B_{ODD}$ | — | — | — | — | — | — |
| $B_{EVEN}$ | — | — | — | — | — | — |
| $P_{ODD}$ | — | — | MAYBE | MAYBE | YES | YES |
| $P_{EVEN}$ | — | — | YES | YES | YES | YES |

TABLE 2

Intra-frame Field Predictability

| from PREVIOUS | to CURRENT | | | | | |
|---|---|---|---|---|---|---|
| | $I_{ODD}$ | $I_{EVEN}$ | $B_{ODD}$ | $B_{EVEN}$ | $P_{ODD}$ | $P_{EVEN}$ |
| $I_{ODD}$ | — | MAYBE | — | — | — | — |
| $I_{EVEN}$ | — | — | — | — | — | — |
| $B_{ODD}$ | — | — | — | MAYBE | — | — |
| $B_{EVEN}$ | — | — | — | — | — | — |
| $P_{ODD}$ | — | — | — | — | — | MAYBE |
| $P_{EVEN}$ | — | — | — | — | — | — |

As can be seen from Tables 1 and 2, an $I_{ODD}$ field is always standalone, that is, not predicted from another field. Thus, an $I_{ODD}$ field can be used as a random access point in a sequence of encoded data. When intra-frame prediction is permitted, an $I_{EVEN}$ field may be predicted only from an $I_{ODD}$ field; if such prediction occurs, the field is actually a predicted field, not an intra field, but is referred to herein as an $I_{EVEN}$ field for convenience. When intra-frame prediction is permitted, a $B_{ODD}$ field may be used to predict the $B_{EVEN}$ field in the same frame; if such prediction occurs, the field is actually used as a reference field not a bidirectionally coded picture, but is referred to herein as a $B_{ODD}$ field for convenience.

Figure 8:
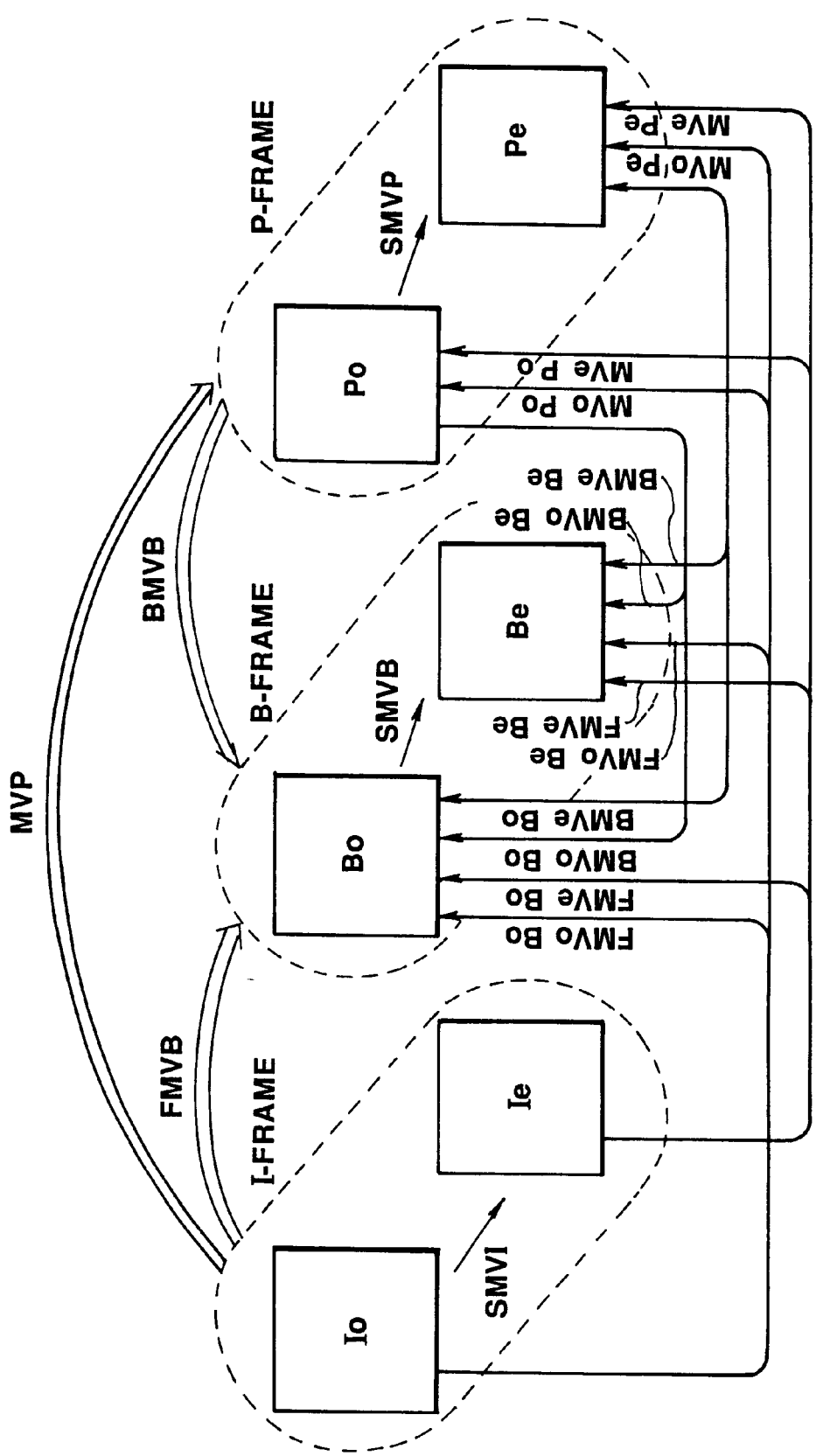
FIG. 8 is a chart illustrating motion vectors used in predictive encoding in the encoder shown in FIG. 4.

FIG. 8 shows various types of motion vectors used in the present invention. In frame-based motion prediction, only three motion vectors are permissible, MVP, FMVB and BMVB, as shown in Table 3. These vectors are referred to herein as frame motion vectors. The vector MVP indicates forward prediction from one reference picture to another, the vector FMVB indicates prediction to a B picture from a reference picture which temporally precedes the B picture, and the vector BMVB indicates prediction to a B picture from a reference picture which temporally succeeds the B picture, with the reference picture having interlaced odd field and even field rows.

TABLE 3

Frame Prediction Motion Vectors

| | TO | | |
|---|---|---|---|
| FROM | I | B | P |
| I | — | FMVB | MVP |
| B | — | — | — |
| P | — | BMVB | MVP |

In field-based motion prediction, possible motion vectors include intra-frame field motion vectors SMVI, SMVB, SMVP, forward inter-frame field motion vectors FMVoBo, FMVoBe, MVoPo, MVoPe, FMVeBo, FMVeBe, MVePo, MVePe, and backward inter-frame field motion vectors BMVoBo, BMVoBe, BMVeBo, BMVeBe.

The vector SMVI indicates prediction from an odd field to an even field of an I picture, the vector SMVB indicates prediction from an odd field to an even field of a B picture, and the vector SMVP indicates prediction from an odd field to an even field of a P picture.

The vector MVoPo indicates prediction from an odd field of a reference picture to an odd field of a P picture, the vector MVoPe indicates prediction from an odd field of a reference picture to an even field of a P picture, the vector MVePo indicates prediction from an even field of a reference picture to an odd field of a P picture, and the vector MVePe indicates prediction from an even field of a reference picture to an even field of a P picture, with the reference picture temporally preceding the P picture.

The vector FMVoBo indicates prediction from an odd field of a reference picture to an odd field of a B picture, the vector FMVoBe indicates prediction from an odd field of a reference picture to an even field of a B picture, the vector FMVeBo indicates prediction from an even field of a reference picture to an odd field of a B picture, and the vector FMVeBe indicates prediction from an even field of a reference picture to an even field of a B picture, with the reference picture temporally preceding the B picture.

The vector BMVoBo indicates prediction from an odd field of a reference picture to an odd field of a B picture, the vector BMVoBe indicates prediction from an odd field of a reference picture to an even field of a B picture, the vector BMVeBo indicates prediction from an even field of a reference picture to an odd field of a B picture, and the vector BMVeBe indicates prediction from an even field of a reference picture to an even field of a B picture, with the reference picture temporally succeding the B picture.

TABLE 4

Field Prediction Motion Vectors

| | TO | | | | | |
|---|---|---|---|---|---|---|
| FROM | $I_{ODD}$ | $I_{EVEN}$ | $B_{ODD}$ | $B_{EVEN}$ | $P_{ODD}$ | $P_{EVEN}$ |
| $I_{ODD}$ | — | SMVI | FMVoBo | FMVoBo | MVoPo | MVoPe |
| $I_{EVEN}$ | — | — | FMVeBo | FMVeBe | MVePo | MVePe |
| $B_{ODD}$ | — | — | — | SMVB | — | — |
| $B_{EVEN}$ | — | — | — | — | — | — |
| $P_{ODD}$ | — | — | BMVoBo | BMVoBe | MVoPo | MVoPe |

TABLE 4-continued

Field Prediction Motion Vectors

| | TO | | | | | |
|---|---|---|---|---|---|---|
| FROM | $I_{ODD}$ | $I_{EVEN}$ | $B_{ODD}$ | $B_{EVEN}$ | $P_{ODD}$ | $P_{EVEN}$ |
| $P_{EVEN}$ | — | — | BMVeBo | BMVeBe | MVePo | SMVP MVePe |

It is an important aspect of the present invention that the type of predictive encoding is selectable on an area by area basis for a picture. This selectability ensures encoding of each picture with the type of prediction best suited to its characteristics.

In the encoder of FIG. 4, intra-field motion prediction is possible. Thus, FIG. 8 represents the field-based prediction possibilities for the encoder of FIG. 4, although P picture to P picture predictions are not shown to simplify the drawing.

Figure 9:
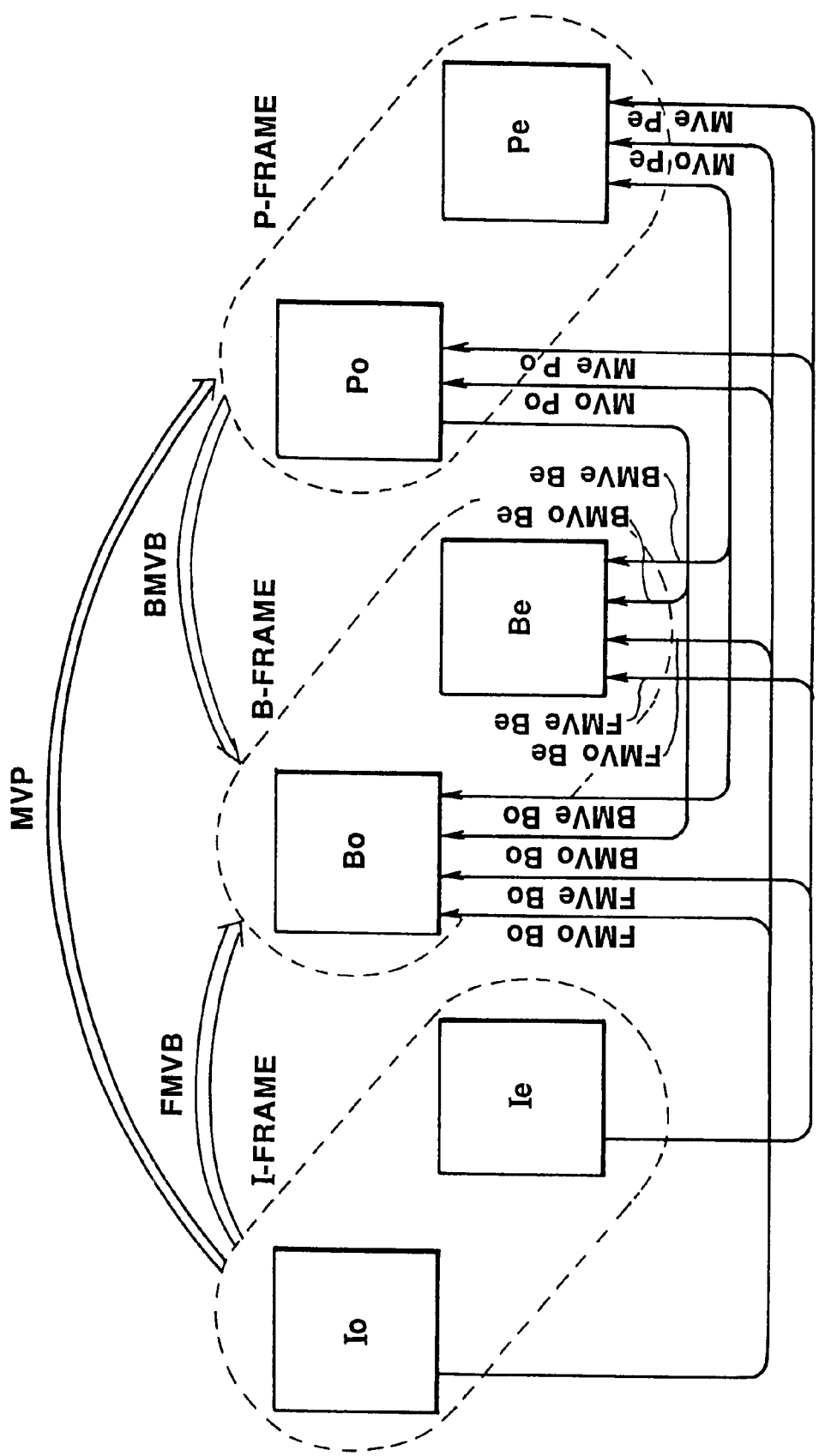
FIG. 9 is a chart illustrating motion vectors used in predictive encoding in the encoder shown in FIG. 3.

In the encoder of FIG. 3, intra-field motion prediction is inhibited because of the scanning cycle for transform coefficient data used in the encoder of FIG. 3. FIG. 9 represents the field-based prediction possibilities for the encoder of FIG. 3. It will be seen that the motion vectors SMVI, SMVB and SMVP are absent from FIG. 9.

The concept of scanning cycles for transmission of encoded picture information will now be explained.

FIG. 10A shows a scanning cycle generally used in the encoder of FIG. 4. FIGS. 10B and 10C show scanning cycles used in other embodiments of encoders, discussed below.

FIG. 10A shows a picture divided into a mosaic of areas, preferably macroblocks, discussed below. An area having only one number, such as the area in the upper right corner, represents an area processed with a frame-based transformation, that is, having interlaced blocks. An area having two numbers, such as the area in the upper left corner, represents an area processed with a field-based transformation, that is, having segregated blocks.

During processing of the picture, the areas are processed in a sequence depending upon their position in the picture. If the area has interlaced blocks, the entire area is processed at one time. If the area has segregated blocks, the odd field blocks are processed first. After processing of the odd field blocks and the interlaced blocks, the even field blocks are processed. This can readily be seen in FIG. 10A, specifically, the even field blocks in the upper left corner area, bearing the number "37", are processed after the interlaced blocks in the bottom right area, bearing the number "36".

In the encoder of FIG. 3, the entirety of the picture is processed in one cycle, in the manner described above. In the encoder of FIG. 4, the interlaced blocks and odd field blocks are processed during a time referred to as an odd cycle, while the even field blocks are processed during a time referred to as an even cycle. In terms of these processing cycles, the encoder of FIG. 3 may be generally considered as performing all of its processing during an odd cycle, so that its even cycle is empty.

Figure 2:
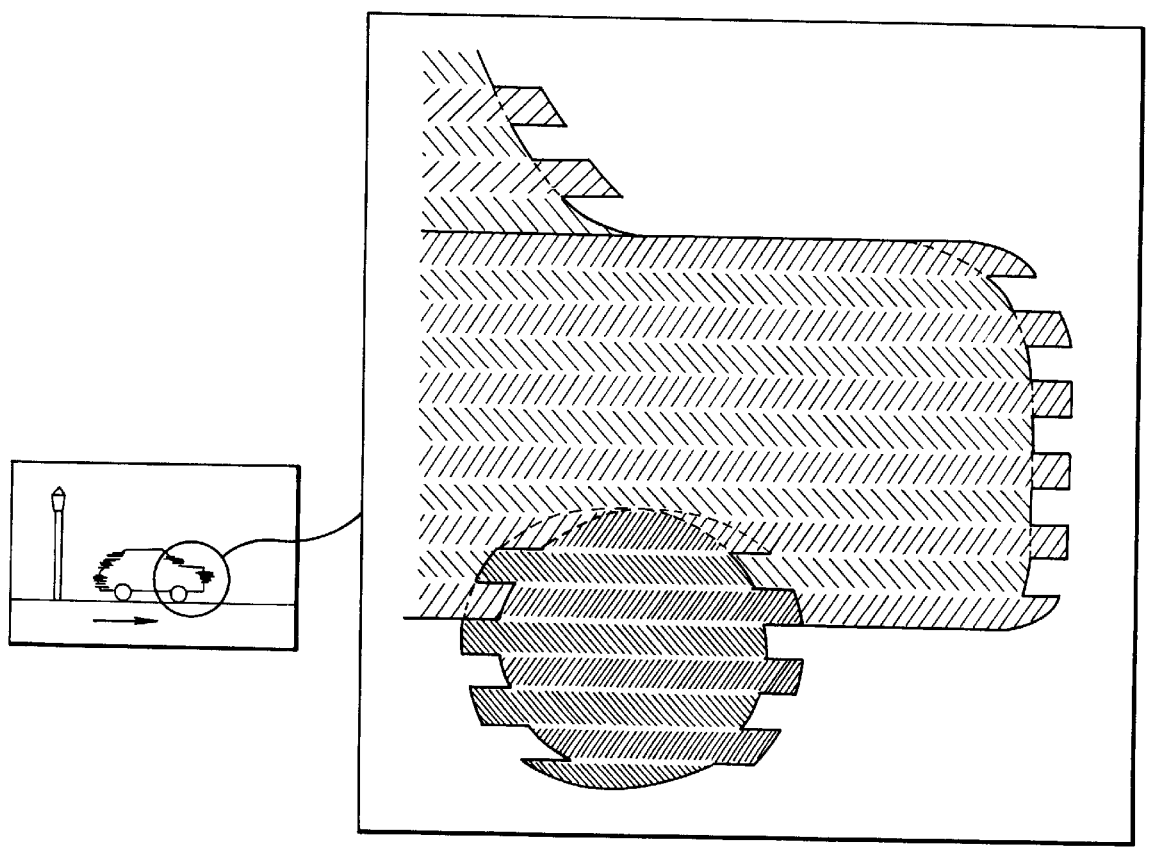
FIG. 2 is a diagram illustrating comb deformation of edges of an object in motion.

The car picture of FIG. 2 may be divided into areas, and transformed based on the amount of motion in each area. It will be readily appreciated that, since motion in this picture occurs only in areas representing the car itself, a field-based DCT transformation is most efficient for each of these areas. The other areas of the car picture are stationary, so a frame-based DCT transformation is most efficient for them.

Figure 11:
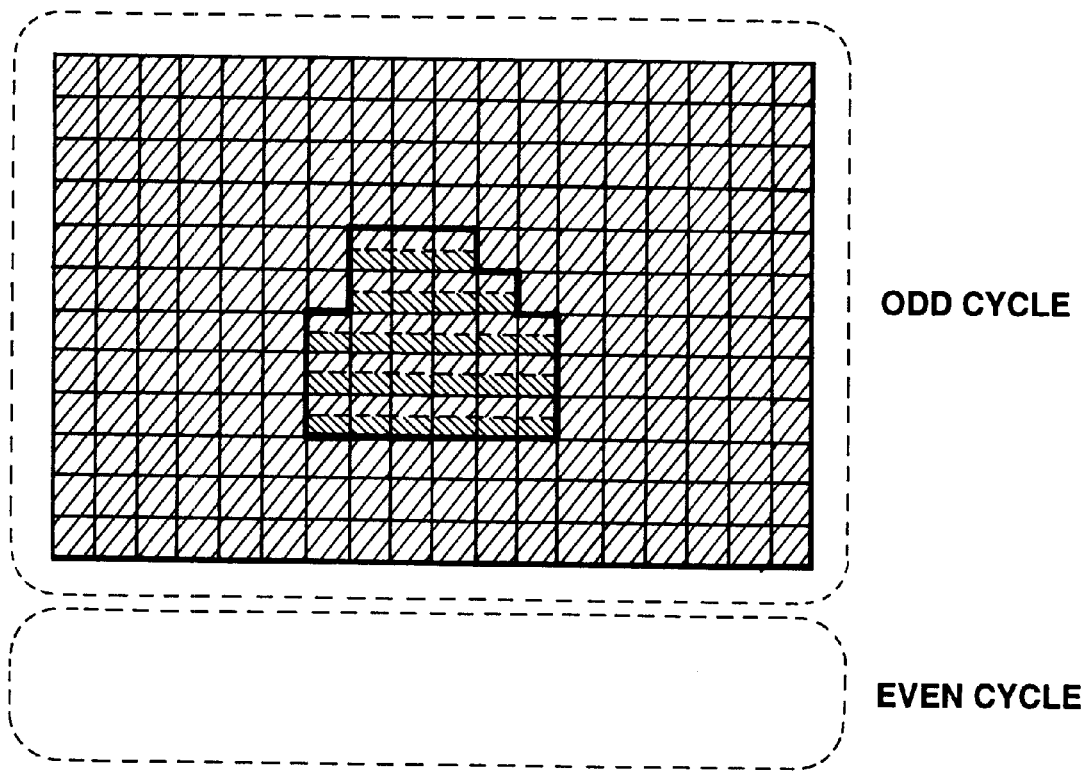
FIG. 11 is a diagram illustrating a transmission sequence for encoded data produced by the encoder shown in FIG. 3.

FIG. 11 shows how the encoder of FIG. 3 processes the car picture of FIG. 2. The center areas represent the car in motion, and so comprise segregated blocks. The other areas represent stationary objects, and so comprise interlaced blocks. As mentioned, all of the picture data is processed during one cycle.

Figure 12:
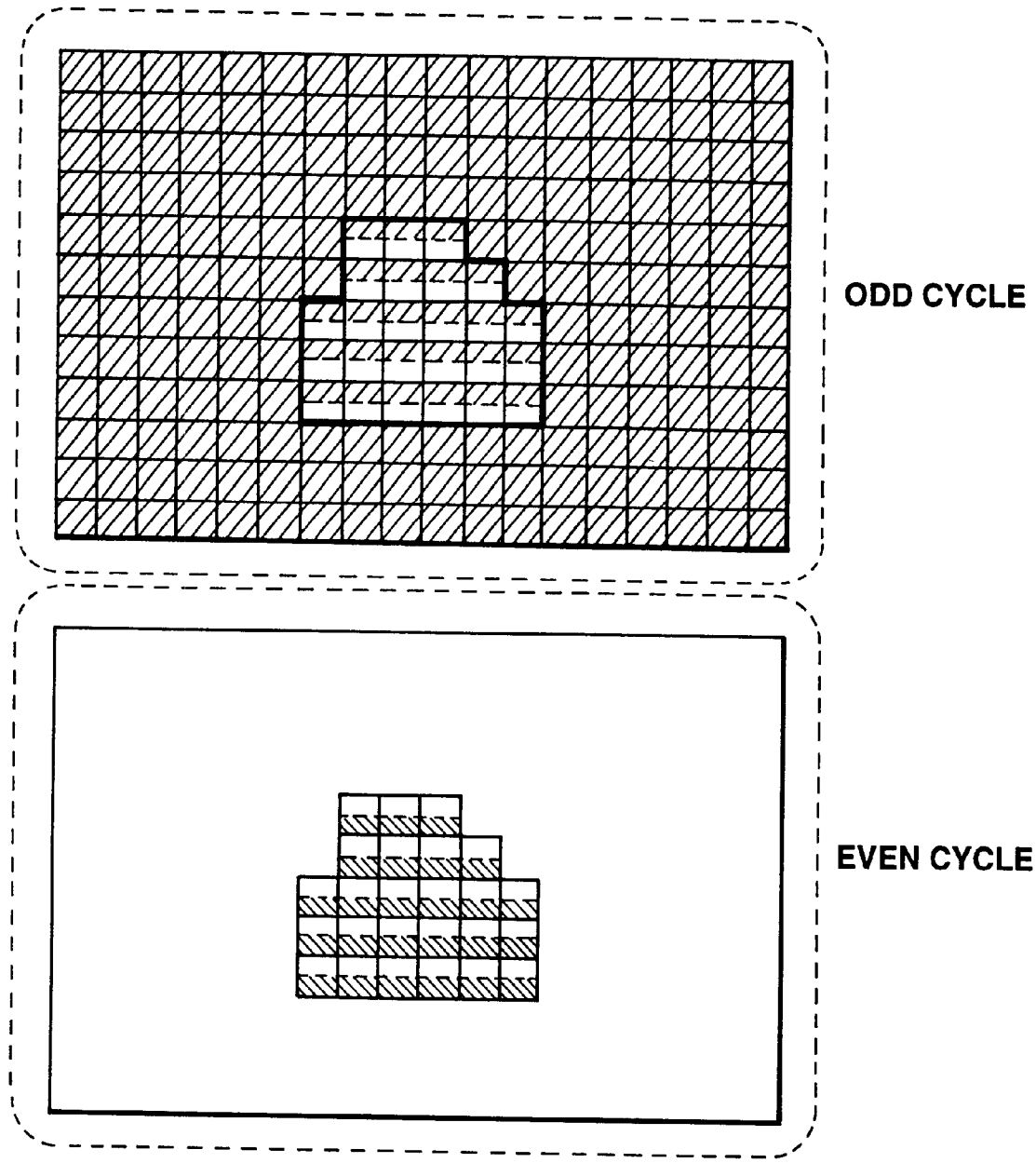
FIG. 12 is a diagram illustrating a transmission sequence for encoded data produced by the encoder shown in FIG. 4.

FIG. 12 shows how the encoder of FIG. 4 processes the car picture of FIG. 2. The interlaced blocks and odd field segregated blocks are transformed in the odd cycle, while the even field segregated blocks are transformed in the even cycle.

Intra-frame motion prediction is possible in the encoder of FIG. 4, since at the beginning of its even cycle, the odd fields comprise previously encoded blocks. This situation is explained further below.

As mentioned, it is preferred that each of the areas in the picture mosaic be a macroblock of size 16 pixels×16 lines. Each macroblock includes four blocks of size 8 pixels×8 lines. Orthogonal transformation is performed block-by-block, but the transformation types, either frame-based or field-based, are the same for the blocks in a macroblock. Predictive encoding is performed macroblock-by-macroblock.

Macroblock formation will now be explained.

Figure 13:
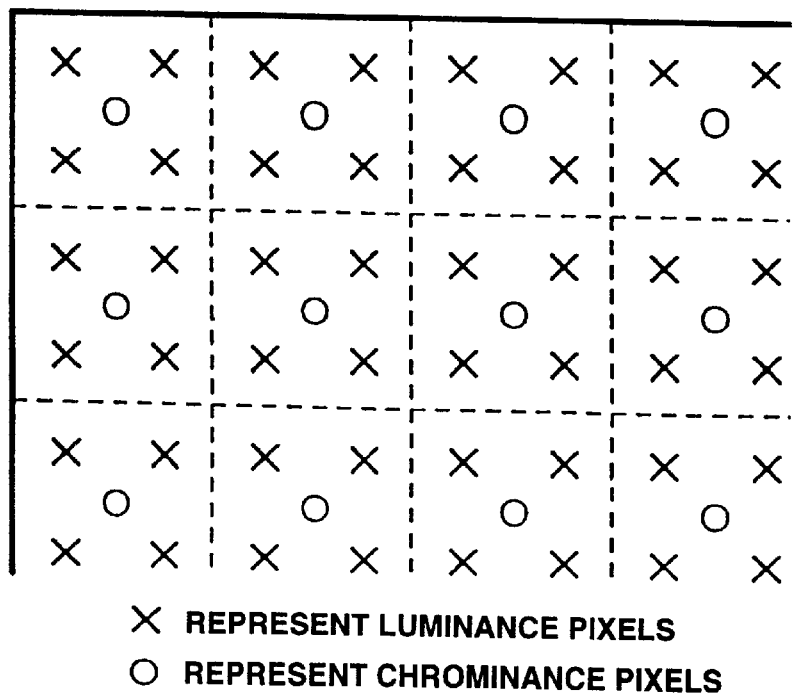
FIGS. 13A and 13B are diagrams respectively illustrating the relationship of pixels in the 4:2:0 and 4:2:2 component digital formats.
Figure 13:
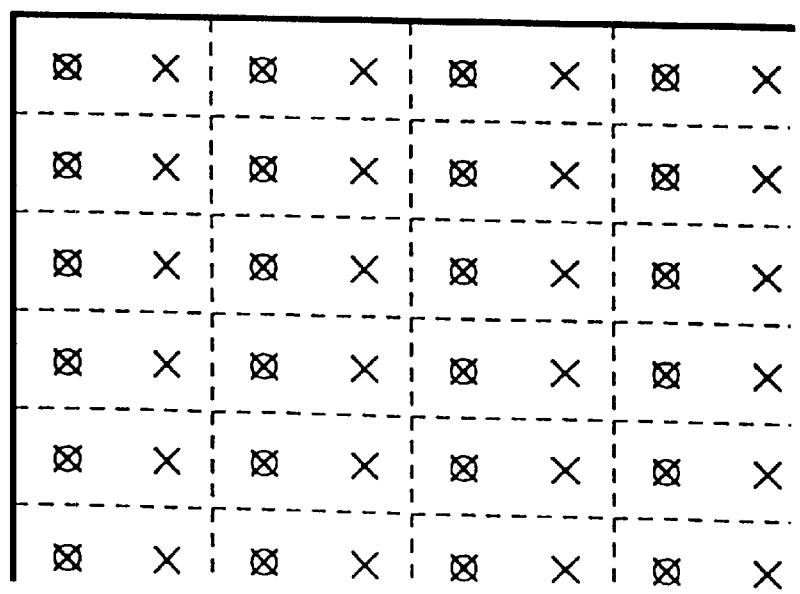

A picture can be represented by luminance (Y) data and by color difference or chrominance (Cr, Cb) data. In the 4:2:0 component digital format, there are four luminance pixels for every Cr and Cb chrominance pixel, as shown in FIG. 13A. In the 4:2:2 component digital format, there are four luminance pixels for every two Cr and Cb chrominance pixels, as shown in FIG. 13B.

Figure 14:
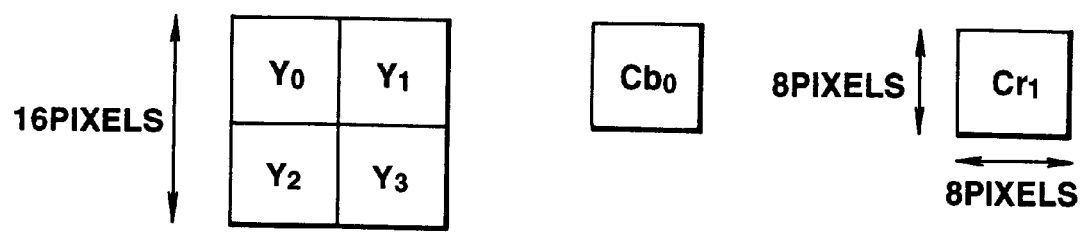
FIGS. 14A and 14B are diagrams respectively showing macroblocks for 4:2:0 and 4:2:2 component digital data.
Figure 14:
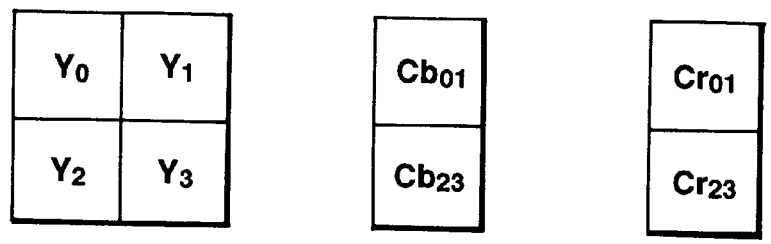

A block comprises 8 pixels×8 rows, and represents either luminance Y data, chrominance Cb data or chrominance Cr data. A macroblock comprises four luminance blocks and the corresponding chrominance blocks. In the 4:2:0 format, there are six blocks in a macroblock, referred to herein as blocks Y0, Y1, Y2, Y3, Cb0, Cr1, as shown in FIG. 14A. In the 4:2:2 format, there are eight blocks in a macroblock, referred to herein as blocks Y0, Y1, Y2, Y3, Cb01, Cb23, Cr01, Cr23, as shown in FIG. 14B.

Macroblock transmission during scanning cycles will now be explained.

FIG. 15A shows a macroblock in 4:2:0 format processed with a frame-based transformation by the encoder of FIG. 3. As can be seen, four blocks of interlaced luminance information and two blocks of chrominance information are transmitted during one cycle.

FIG. 15B shows a macroblock in 4:2:0 format processed with a field-based transformation by the encoder of FIG. 3. The four blocks of luminance information are segregated into two blocks of odd field luminance coefficient data and two blocks of even field luminance coefficient data. All of the luminance and chrominance data are transmitted during one cycle.

FIG. 15C shows a macroblock in 4:2:2 format processed with a frame-based transformation by the encoder of FIG. 3. As can be seen, four blocks of interlaced luminance information and four blocks of chrominance information are transmitted during one cycle.

FIG. 15D shows a macroblock in 4:2:2 format processed with a field-based transformation by the encoder of FIG. 3. All information is transmitted during one cycle. Both the luminance and the chrominance information are segregated into odd field blocks and even field blocks.

FIG. 16A shows a macroblock in 4:2:0 format processed with a frame-based transformation by the encoder of FIG. 4. It will be seen that the encoded data is identical to that shown in FIG. 15A.

FIG. 16B shows a macroblock in 4:2:0 format processed with a field-based transformation by the encoder of FIG. 4. As before, the luminance information is formed into segregated blocks. Here, the odd field luminance information and the chrominance information are transmitted during the odd cycle, while the even field luminance information is transmitted during the even cycle.

FIG. 16C shows a macroblock in 4:2:2 format processed with a frame-based transformation by the encoder of FIG. 4. It will be seen that the encoded data is identical to that shown in FIG. 15C.

FIG. 16D shows a macroblock in 4:2:2 format processed with a field-based transformation by the encoder of FIG. 4. Here, the odd field luminance information and the odd field chrominance information are transmitted during the odd cycle, while the even field luminance information and the even field chrominance information are transmitted during the even cycle.

Considering each of the areas shown in FIGS. 11 and 12 as a macroblock, and in view of the macroblock transmission sequence shown in FIGS. 15A–D and 16A–D, the encoded signal produced by the encoders of FIGS. 3 and 4 may be readily envisioned.

A variation of predictive encoding for field-based motion prediction of macroblocks in the 4:2:2 component digital format will now be explained.

Figure 17:
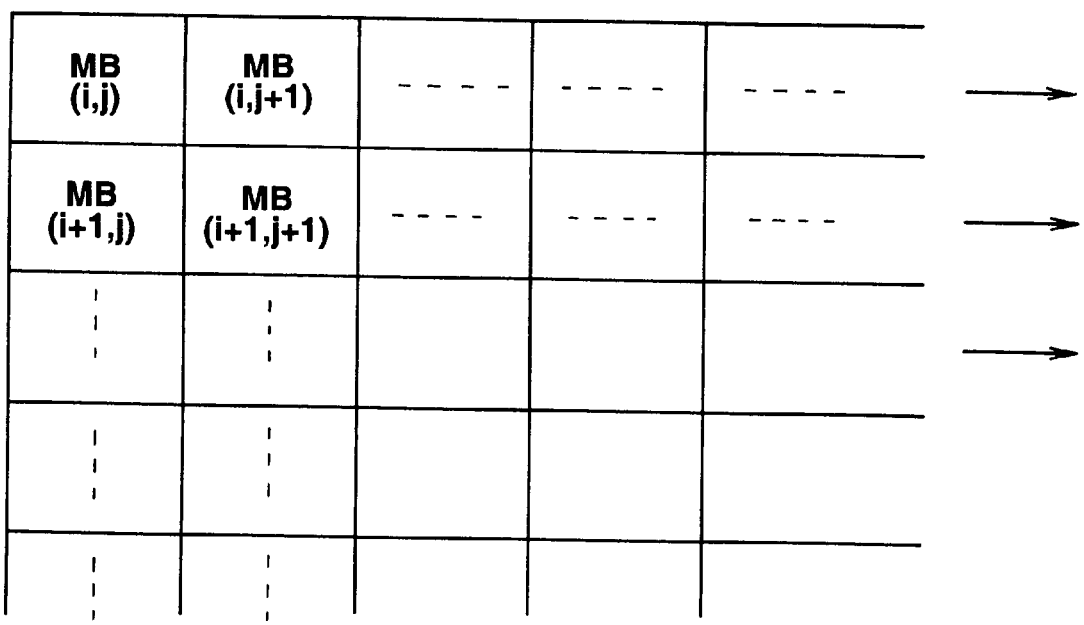
FIG. 17 is a chart showing macroblocks in a portion of a frame.

FIG. 17 shows a portion of a picture divided into macroblocks. The first row comprises macroblocks MB(i,j), MB(i,j+1), . . . , the second row comprises macroblocks MB(i+1, j), MB(i+1, j+1), . . . , and so on. Prediction of the macroblocks proceeds row by row, and from left to right within the row.

Figure 18A:
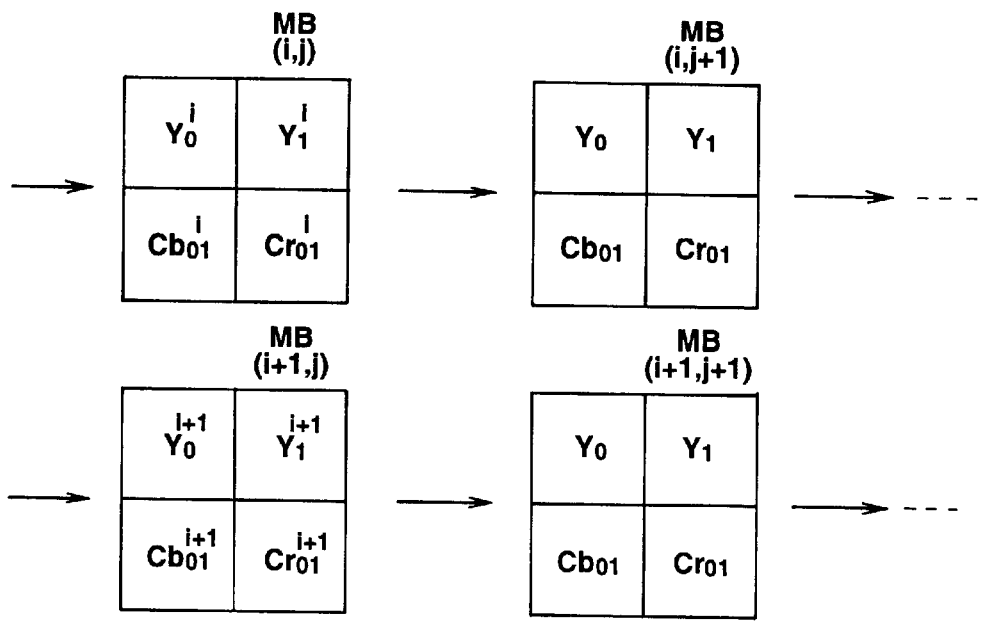
FIG. 18A is a diagram illustrating frame-based predictive encoding of macroblocks representing 4:2:2 component digital data.

FIG. 18A shows frame-based prediction of each macroblock. Although only the Y0, Y1, Cb01, Cr01 blocks are shown for ease of illustration, it is to be understood that the Y2, Y3, Cb23, Cr23 blocks are treated in like manner.

Figure 18B:
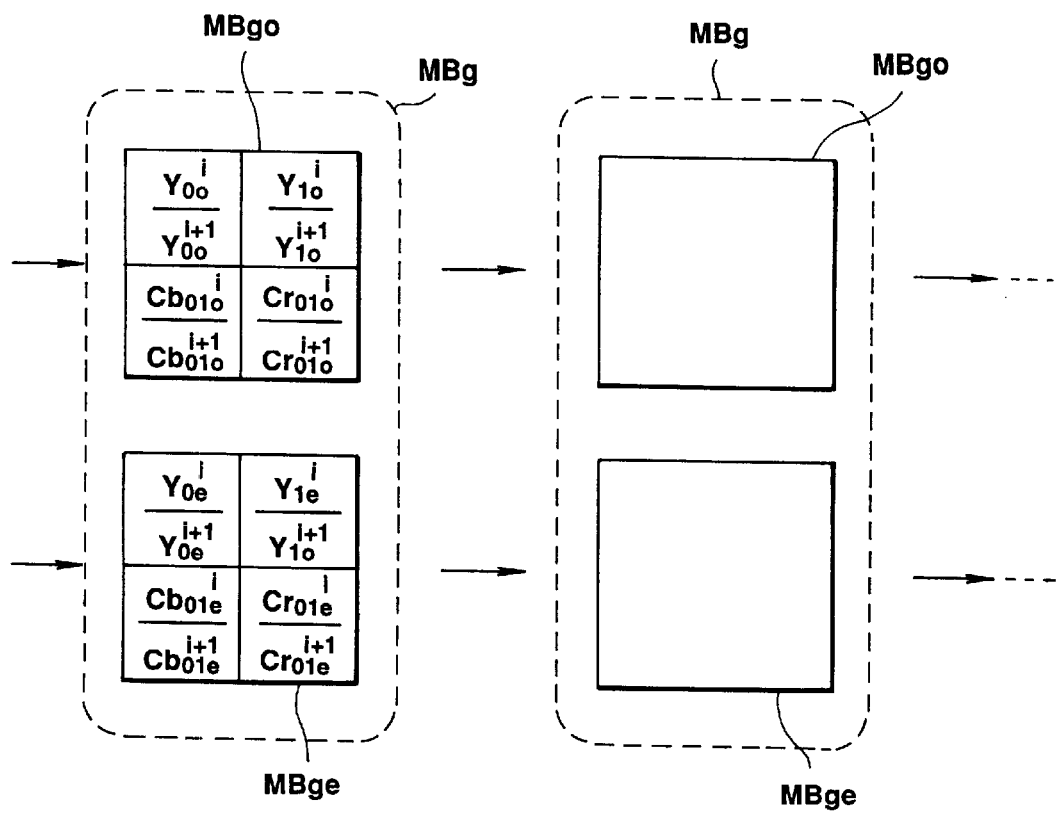
FIG. 18B is a diagram illustrating a variation of field-based predictive encoding of macroblocks representing 4:2:2 component digital data.

For field-based motion prediction of the macroblocks, a macroblock and the immediately below macroblock, such as MB(i,j) and MB(i+1, j), are considered as a macroblock group MBg, and prediction occurs macroblock group by macroblock group. More specifically, in field-based prediction, a macroblock group MBg comprises an odd macroblock group MBgo and an even macroblock group MBge, as shown in FIG. 18B. The odd and even macroblock groups contain odd and even data from each of the macroblocks MB(i,j) and MB(i+1, j), respectively. For example, the upper left 8×8 block of the odd macroblock group MBgo contains odd field data from the luminance block Y0 of macroblock MB(i,j) and odd field data from the luminance block Y0 of macroblock MB(i+1, j). Similarly, the lower right block of the even macroblock group MBge contains even field data from the color difference block Cr01 of macroblock MB(i,j) and even field data from the color difference block Cr01 of macroblock MB(i+1, j).

In the macro-block shown in FIG. 18A, the luminance blocks Y0, Y1 and the color difference blocks Cb01, Cr01 are predicted, with e.g. the frame prediction mode, for each of the macro-blocks MB(i, j), MB(i, j+1), . . . , MB(i+1, j) and MB(i+1, j+1) . . . Consequently, with the frame prediction mode, prediction of each macro-block is not affected by the prediction of other macro-blocks.

Conversely, with the field processing mode, as shown in FIG. 18B, the macro-blocks making up the macro-block set MBg are divided into macro-blocks MBgo of odd-numbered fields and macro-blocks MBge of even-numbered fields and luminance blocks $Y0_o^i|Y0_o^{i+1}$, $Y1_o^i|Y1_o^{i+1}$; and color difference blocks, $Cb01_o^i|Cb01_o^{i+1}$, $Cr01_o^i|Cr01_o^{i+1}$; within the odd-field macro-block MBgo are processed with DCT. If the macro-block set MBg is made up of the macro-blocks MB(i, j) and MB(i+1, j) of FIG. 18A, the luminance blocks $Y0_o^i|Y0_o^{i+1}$, $Y1_o^i|Y1_o^{i+1}$; within the odd-field macro-block MBgo in the macro-block MBg are made up of odd-field luminance blocks of the macro-block MB(i, j) and odd-field luminance blocks of the macro-block MB(i+1, j) and the color difference blocks $Cb01_o^i|Cb01_o^{i+1}$, $Cr01_o^i|Cr01_o^{i+1}$; within the odd-field macro-block MBgo are made up of odd-field color difference blocks of the macro-block MB(i, j) and odd-field color difference blocks of the macro-block MB(i+1, j). Similarly, the luminance blocks $Y0_e^i|Y0_e^{i+1}$, $Y1_e^i|Y1_e^{i+1}$; within the even-field macro-block MBge in the macro-block MBg are made up of even-field luminance blocks of the macro-block MB(i, j) and even-field luminance blocks of the macro-block MB(i+1, j) and the color difference blocks $Cb01_e^i|Cb01_e^{i+1}$, $Cr01_e^i|Cr01_e^{i+1}$; within the even-field macro-block MBge are made up of even-field color difference blocks of the macro-block MB(i, j) and even-field color difference blocks of the macro-block MB(i+1, j).

As may be seen from above, the relation between motion prediction mode and DCT processing mode is as follows: In the present encoding device, if, in the macro-block MB(i, j), the motion prediction is of the frame prediction mode and the DCT is of the frame processing mode, the difference between the predicted picture and an input picture (original picture), extracted from a picture decoded in the frame memory group fitted with motion compensator 20 as a reference frame, is processed with DCT. The DCT coefficients and frame motion vectors are transmitted.

If, in the macro-block MB(i, j), the motion prediction is of the field prediction mode and the DCT is of the field processing mode, the difference between the predicted picture extracted from the odd-numbered field and the odd-field original picture and the odd-field motion vector are encoded for the macro-block MB(i, j), while the difference between the predicted picture extracted from the even-numbered field and the even-field original picture and the even-field motion vector are encoded for the macro-block MB(i+1, j).

If, in the macro-block MB(i, j), the motion prediction is of the field prediction mode and the DCT is of the frame processing mode, a frame difference between a predicted picture for the position of the macro-block MB(i, j) output from the reference frame and the input picture, the odd-field motion vector and the even-field motion vector are transmitted for the macro-block MB(i, j). A frame difference between a predicted picture for the position of the macro-block MB(i+1, j) taken out from the reference frame and the input picture is transmitted for the macro-block MB(i+1, j).

If, in the macro-block MB(i, j), the motion prediction is of the frame prediction mode and the DCT is of the field processing mode, a difference between a predicted picture taken out from the odd-numbered field and the odd-field original picture, the frame motion vector of the macro-block MB(i, j) and the frame motion vector of the macro-block MB(i+1, j) are transmitted for the macro-block MB(i, j), while the difference between the even-numbered predicted picture and the input picture is transmitted for the macro-block MB(i+1, j).

The encoder of FIG. 3 comprises an input terminal 1, an output terminal 2, frame memory group 10, address generator 11, subtractor 12, orthogonal transformation (DCT) circuit 13, quantizer 14, variable length coding circuit 15, buffer 16, dequantizer 17, inverse DCT circuit 18, adder 19, motion compensating frame memory 20, field motion detector 21, frame motion detector 22, motion prediction decision circuit 23, selector 24 and block processing decision circuit 25.

The input terminal 1 serves to receive digital picture signals. The frame memory group 10 is coupled to the input terminal 1, and is adapted to store plural frames of the digital picture signal, and to output data for each frame in units of macroblocks to the subtractor 12. The address generator 11 is adapted to supply read out addresses to the frame memory group 10 in accordance with a control signal supplied thereto so that data in a macroblock is read out as interlaced blocks representing the odd and even fields of a frame or as segregated blocks representing either the odd field or the even field of a frame.

The subtractor 12 receives macroblocks of the current picture from the frame memory group 10 and predicted macroblocks selected from previously encoded macroblocks, and functions to subtract the predicted macroblock from the current macroblock to generate differential data for the current macroblock.

The DCT circuit 13 is adapted to transform the differential data supplied thereto from the time domain to the frequency domain using a discrete cosine transformation performed on a block by block basis. When a block has interlaced data, the DCT circuit 13 is referred to as performing a frame-based transformation, while, when the block has segregated data, the DCT circuit 13 is referred to as performing a field-based transformation.

The quantizer 14 is coupled to the output of the DCT circuit 13 to receive therefrom the frequency coefficients of each block and serves to quantize the coefficient data using a quantizing step width. More specifically, the quantizer 14 serves to divide the coefficient data by the quantizing step width to generate quantized coefficient data, and to supply this quantized data to the variable length coding circuit 15 and to a dequantizer 17.

The variable length coding circuit 15 functions to encode the quantized coefficient data using, for example, a variable length code and/or a Huffman code. The coding circuit 15 appends side information supplied thereto, including the motion vectors, quantization step width used to generate the quantized data, information identifying the type (frame-based or field-based) of orthogonal transformation used to reduce spatial redundancy in the quantized data, information identifying the type (frame-based or field-based) of predictive encoding used to reduce temporal redundancy in the quantized data, information identifying the picture as an I, B or P field or frame picture, macroblock type information identifying its prediction type, that is, intra, forward, backward or bidirectional, an indication of which frame(s) or field(s) comprise the reference picture(s), and an address of the position of the macroblock in a frame. The address may be expressed as an absolute address, i.e., "macroblock 0", or an address increment, such as "increment 7", meaning it is seven macroblocks beyond a previously transmitted macroblock. The address increment scheme reduces the number of bits in the encoded data, since the absolute macroblock address may require a large number of bits to represent its value.

The buffer 16 serves to store the variable length coded data and to supply this data to the output terminal 2 in a predetermined unit, such as a frame or field. The buffer 16 also supplies a control signal to the quantizer 14 to cause it to increase the quantizing step width thereby producing smaller value data which can be more efficiently coded when the buffer 16 is close to being filled, and to decrease the quantizing step width thereby increasing the quality of the picture resolution when the buffer 16 has sufficient unused capacity.

Dequantizer 17, inverse DCT circuit 18, adder 19 and frame memory 20 function in a similar manner as the decoder shown in FIG. 5, which should be referred to for a detailed description of these elements. Generally, these elements serve to store previously encoded blocks and to generate a prediction of the current block from a previously encoded block. The previously encoded block may be from a past picture which temporally precedes the current block or from a future picture which temporally succeeds the current block.

A prediction circuit, not shown, decides which type of picture the current field or frame is, namely, an I, B or P field or frame picture, controls the frame memory 20 accordingly, and supplies the picture type information to the coding circuit 15.

The field motion detector 21 is adapted to generate similarity data FDAD representing the difference between the most similar odd field and even field macroblock sized areas; in a previously encoded field and the current macroblock in the current field, and data FDMV representing the motion vectors between the most similar macroblock sized areas in the previously encoded field and the macroblock in the current field. As noted above, the encoder of FIG. 3 does not perform intra-frame motion prediction, thus, the previously encoded macroblocks are from a different frame or frames than the current macroblock. For I picture macroblocks, the detector 21 is inoperative. For P picture macroblocks, the detector 21 detects motion between the current macroblock and macroblock sized areas in at least two previously encoded fields, namely, the odd and even fields of a previously encoded I or P picture. Also, the motion prediction error for a prediction obtained by averaging the two field predictions is obtained. For B picture macroblocks, the detector 21 detects motion between the current macroblock and macroblock sized areas in at least four previously encoded fields, namely, a previously encoded temporally past odd field, a previously encoded temporally past even field, a previously encoded temporally future odd field, and a previously encoded temporally future even field. Also, the motion prediction error for a prediction obtained by averaging the two best predictions of the four previously enumerated predictions is obtained.

The frame motion detector 22 is adapted to generate similarity data FMAD representing the difference between the most similar macroblock sized area; in a previously encoded frame and the current macroblock in the current frame, and data FMMV representing the motion vector between the most similar macroblock sized area in the previously encoded frame and the macroblock in the current frame. For I picture macroblocks, the detector 22 is inoperative. For P picture macroblocks, the detector 22 detects motion between the current macroblock and macroblock sized areas in at least one previously encoded frame, namely, a previously encoded I or P picture. For B picture macroblocks, the detector 22 detects motion between a current macroblock and macroblock sized areas in at least two previously encoded frames, namely, a previously encoded temporally past frame and a previously encoded temporally future frame. Also, for a B picture, the motion prediction error for a prediction obtained by averaging the predictions from the past and future frames is obtained.

The motion prediction decision circuit 23 functions to decide which of frame-based motion prediction MPFM and field-based motion prediction MPFD of previously encoded data should be performed by frame memory 20 as a function of the similarity data FDAD and FMAD supplied thereto by field motion detector 21 and frame motion detector 22, respectively.

In response to the motion prediction control data MPFM or MPFD generated by the decision circuit 23, the selector 24 serves to select among the corresponding frame motion vectors FMMV and the field motion vectors FDXV supplied thereto from motion detectors 21 and 22, respectively. The selector 24 supplies either the frame motion vectors FMMV or the field motion vectors FDMV to the block processing decision circuit 25, the frame memory 20 and the variable length coding circuit 15.

The block processing decision circuit 25 receives the selected one of the frame or field motion vectors from selector 24, the motion prediction control data MPFM or MPFD from motion prediction decision circuit 23, and upcoming macroblock data from frame memory group 10. For an I picture, the decision circuit 25 is adapted to select based on upcoming data of the original picture which of a frame-based DCT transformation MDFM or a field-based DCT transformation MDFD will result in the least amount of encoded data, that is, will be most efficient. For a P or B picture, the block processing decision circuit 25 is adapted to form an approximate differential macroblock without using the actual predicted picture which will be used to encode the upcoming macroblock. The motion vector data supplied from the selector 24 is used to determine a starting address of a macroblock sized window of data which is then read out of the frame memory group 10. The read out data forms the approximate differential macroblock. Based upon this approximate differential macroblock, the circuit 25 is adapted to select which of a frame-based DCT transformation MDFM or a field-based DCT transformation MDFD will be most efficient.

The encoder of FIG. 3 is thus able to select which of frame-based and field-based orthogonal transformation is most efficient for a macroblock, and to independently select which of frame-based and field-based predictive encoding is most efficient for the macroblock. Table 5 shows the four possible cases of a macroblock encoded by the encoder of FIG. 3 with both DCT transformation and predictive encoding. t,0410

Figure 19:
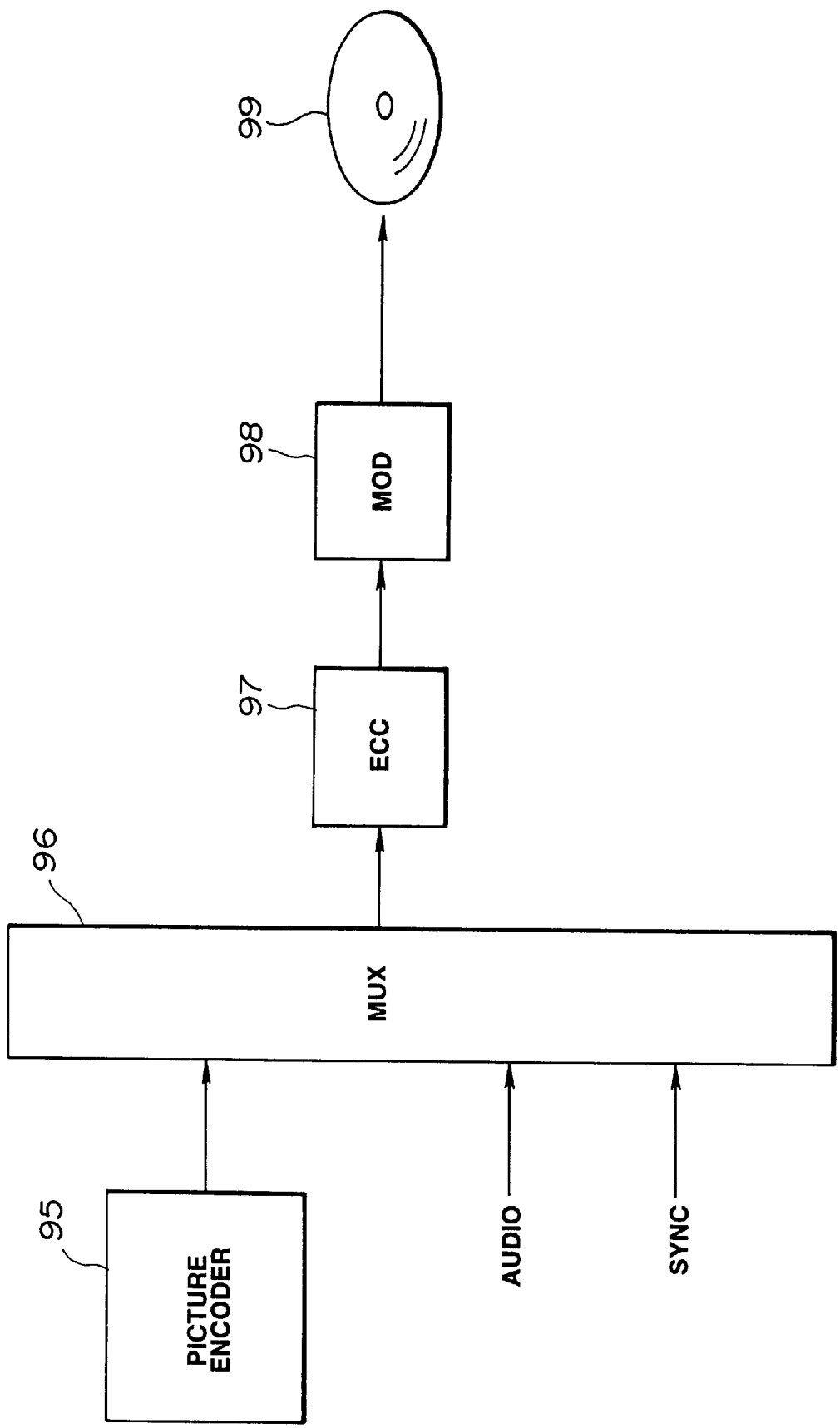
FIG. 19 is a block diagram illustrating how data encoded according to the present invention are recorded on a recording medium.

The encoder of FIG. 3 is shown as picture encoder 95 in FIG. 19. The data supplied to output terminal 2 of the encoder of FIG. 3 is supplied to a multiplexer 96 which is adapted to multiplex the encoded data with encoded audio signals, synchronization signals, etc. and to supply the multiplexed data to an error correction coding circuit 97 that serves to append error correction codes to the multiplexed data. A modulator 98 is coupled to the output of the error correction coding circuit 97, and functions to modulate the output thereof. The modulated signal is recorded on a recording medium, such as an optical disc, magnetic tape or a semiconductor memory, by means of, for example, a laser beam.

Instead of being recorded on a recording medium, the encoded signal could be transmitted, such as over a telecommunications channel, or broadcast, such as over a satellite link.

The operation of the encoder shown in FIG. 3 will now be explained.

In all cases, that is, an I, P or B picture, the data received at terminal 1 is stored in the frame memory group 10.

If the data represents an I picture, it is processed as follows.

For each macroblock in this I picture, there are no previously encoded frames or fields to compare with, and intra-frame motion prediction is not possible in the encoder of FIG. 3, so each macroblock is encoded using a frame-based or field-based DCT transformation and no predictive encoding. The appropriate one of frame-based and field based transformation is selected as follows.

The circuit 25 calculates for a macroblock in the even field of a frame and for a macroblock in the same position in the odd field of a frame, the absolute value of the difference between vertically adjacent pixels in the odd field plus the difference between vertically adjacent pixels in the even field of the current frame to obtain a difference EFD, as in equation 1. t,0430
The circuit 25 calculates the absolute value of the difference between vertically adjacent pixels in each interlaced macroblock (pair of field macroblocks) of the current frame to obtain a difference EFM, as in equation 2. t,0431

For each macroblock, if the difference between the frame and field difference data is greater than a predetermined threshold T2, that is, EFM−EFD >T2, then field-based DCT transformation is selected for the macroblock by the circuit 25. If the difference between the frame and field difference data is less than or equal to the predetermined threshold T2, that is, EFM−EFD ≦T2, then frame-based DCT transformation is selected for the macroblock by the circuit 25.

Since the frame memory 20 lacks a previously encoded picture, no predicted data is supplied to subtractor 12, so the differential data output by subtractor 12 is the same as the current picture data. The original picture data is DCT transformed, quantized, variable length coded and stored in the buffer 16. The quantized coefficient data is also supplied to the dequantizer 17, which dequantizes it, that is, multiplies it by the quantizing step width used during quantizing, and then to the inverse DCT circuit 18 which converts it to time domain data. Since there is no previously encoded picture, the adder 19 simply supplies the time domain data to the frame memory 20 where it is stored and available for predictive encoding of an upcoming macroblock. This procedure is repeated for each macroblock in the frame. After the last macroblock is processed, frame memory 20 contains the decoded time domain data for the frame. The frame memory group 10 also retains the frame data, for motion detection with future pictures.

If the data represents a P picture, it is processed as follows.

For each macroblock in this P picture, the field motion detector 21 considers the current P picture as comprised of an odd field and an even field. For each macroblock in the current P picture, motion is detected with respect to the fields of the temporally past I picture. First, a macroblock sized (16×16) window is positioned in the upper left corner of the past frame and only the $I_{ODD}$ field lines are considered. The absolute value of the pixel-by-pixel difference between the $I_{ODD}$ field pixels in the macroblock sized window and the odd field pixels in the current macroblock are obtained and summed as similarity data AD. Next, the window is slid one pixel (or one half pixel) to the right, and similarity data AD is obtained. The window is successively slid by one pixel (or one half pixel) to the right until the end of the row, and similarity data AD are obtained at each position.

Now, the window is returned to the leftmost position in the row and moved downwards by one pixel (or one half pixel), and similarity data AD is obtained. The window is successively slid by one pixel (or one half pixel) to the right until the end of the row, and similarity data AD are obtained at each position. This procedure is repeated until the bottom edge of the window is one pixel beyond the bottom edge of the odd field, that is, all pixels in the odd field have been considered in at least one AD value.

This entire procedure is repeated for the even field of the reference picture with respect to the odd field pixels of the current macroblock and then repeated for the even field pixels of the current macroblock with respect to each of the odd and even fields of the reference picture.

The value FDAD is the sum of all of the AD data obtained when comparing the most similar macroblock sized areas in the odd and even fields of the reference picture with the current macroblock.

As a variation, to reduce the length of time needed to execute this procedure, only a region of each field of the reference picture within the spatial vicinity of the current macroblock position is evaluated.

If the most recently encoded reference picture is a P picture, rather than an I picture as in this example, then the motion between each of the macroblocks in the current P picture and each of the macroblocks in the past P picture is detected.

For each macroblock in this P picture, the frame motion detector 22 considers the current P picture as having interlaced macroblocks (see FIG. 6), and for each macroblock therein, detects the motion between the macroblock in the P picture and each of the macroblock sized areas in the temporally past I (or P, as explained) picture which is considered as having interlaced macroblocks.

The specific method used in calculating motion detection is not an important aspect of the encoder shown in FIG. 3. For convenience, only luminance data may be used in motion detection, although both luminance and chrominance data will be actually predicted.

The location of a macroblock in a picture may be indicated by (x,y) co-ordinates, as shown in FIG. 17. If a macroblock in the past picture is identified as P(px,py) and a macroblock in the current picture is identified as C(cx,cy), then the motion vector is the difference therebetween, $$MV=((px-cx), (py-cy))$$

The length, also referred to herein as the magnitude, of this motion vector is $((px-cx)^2+(py-cy)^2)^{1/2}$.

The frame motion vectors pertain to interlaced macroblocks in previously encoded macroblock sized areas relative to a current macroblock. In the case of a P picture, the frame motion vector is MVP, as shown in FIG. 8.

The field motion vectors pertain to macroblock sized areas from an odd or even previously encoded field relative to a current macroblock which is from an odd or even field. In the case of a P picture, the field motion vectors are MVoPo, MVePo, MVoPe, MVePe, as shown in FIG. 8. Also, as noted above, for a P picture the average of the two best predictions corresponding to each of these motion vectors is also evaluated for each macroblock.

Thus, it will be appreciated that detecting the motion between two pictures comprises calculating a set of similarity data AD and the associated motion vectors corresponding to the macroblock sized areas for each AD value in the set.

The motion prediction decision circuit 23 determines which of frame-based and field-based motion prediction is most efficient for the current macroblock. If the difference between the frame and field similarity data is greater than a predetermined threshold T1, that is, FMAD−FDAD>T1, then field-based movement prediction is selected by the circuit 23. If the difference between the frame and field similarity data is less than or equal to the predetermined threshold T1, that is, FMAD−FDAD≦T1, then frame-based movement prediction is selected by the circuit 23.

The block processing decision circuit 25 next determines which of frame-based and field-based DCT transformation is most efficient for the current macroblock. Since the current picture is a P picture, it will be encoded as differential data referenced to a previously encoded I or P picture. Therefore, for each macroblock in the current picture, the decision circuit 25 applies the motion vector supplied from the selector 24 to obtain a macroblock sized areas of the reference picture stored in the frame memory group 10 to used as an approximate predicted macroblock which is subtracted from the current macroblock to obtain an approximate differential macroblock. For convenience, only luminance data may be considered to determine which of field-based or frame-based transformation will be used, although both luminance and chrominance data are included in the actual encoded data.

The decision circuit 25 decides which of frame-based and field-based transformation is most efficient for each macroblock of a P picture as follows.

First, the motion vector data supplied from the selector 24 is used to determine the read out addresses of a macroblock sized amount of data from the preceding reference picture stored in field memory group 10. The selection of the reference picture is in accordance with the signal from the decision circuit 23.

Next, the read out data is subtracted from the current macroblock on a pixel-by-pixel basis to form an approximate differential macroblock. Then the values EFD and EFM are computed for the approximate differential macroblock, and the transformation type (frame-based or field-based) is selected as above.

The P picture is then supplied to the subtractor 12, which subtracts therefrom predictive data generated by the frame memory 20 to obtain differential data. The frame memory 20 uses the motion vectors FMMV, FDMV supplied from the selector 24 to the output a macroblock sized areas of the I (or P) picture stored therein in accordance with the motion prediction control signal MPFM, MPFD supplied from the decision circuit 23, thereby obtaining a predicted macroblock. The frame memory 20 uses the transformation control signal MDFM, MDFD to determine the proper readout address sequence for supplying the predicted macroblock, that is, as an interlaced macroblock as shown in FIG. 6 or as a segregated macroblock as shown in FIG. 7.

After the last macroblock in the P picture is processed, buffer 16 contains encoded data for the P picture frame, and frame memory 20 contains the decoded time domain data for the P and I picture frames. The frame memory group 10 also retains the P and I picture frame data, for motion detection with future pictures. The I picture frame may also still be in the buffer 16.

If the data represents a B picture, it is processed in a similar manner as a P picture, except that the two reference pictures temporally preceding and succeeding the B picture are evaluated, rather than just one.

That is, for predictive encoding, frame-based prediction alternatives using the motion vectors FMVB, BMVB and the average of these predictions (FMVB+BMVB)/2, and field-based prediction alternatives using the motion vectors FMVoBo, FMVeBo, BMVoBo, BMVeBo, FMVoBe, FMVeBe, BMVoBe, BMVeBe, and the average of the two best predictions corresponding to motion vectors from the set (FMVoBo, FMVeBo, BMVoBo, BMVeBo, FMVoBe, FMVeBe, BMVoBe, BMVeBe) are evaluated, and the most efficient of these alternatives is selected by the-motion prediction decision circuit 23.

For DCT transformation, the block processing decision circuit 25 forms its approximate predicted macroblock in accordance with the selection of the motion prediction decision circuit 23, and subtracts this approximate predicted macroblock from the current macroblock to obtain an approximate differential macroblock, in the manner generally described above. The decision circuit 25 then evaluates the differences EFM and EFD for this approximate differential macroblock to select which of frame-based transformation and field-based transformation is most appropriate for each macroblock of the B picture.

Subsequent encoding of the B picture is performed in like manner as encoding of the P picture. It will be appreciated that, for a B picture, frame memory 20 may produce the predicted data from one or more reference frames, different fields of the same reference frame, or fields of different reference frames.

An aspect of the operation of the variable length coding circuit 15 of the encoder shown in FIG. 3 will now be explained with reference to FIGS. 20 and 21.

Figure 20:
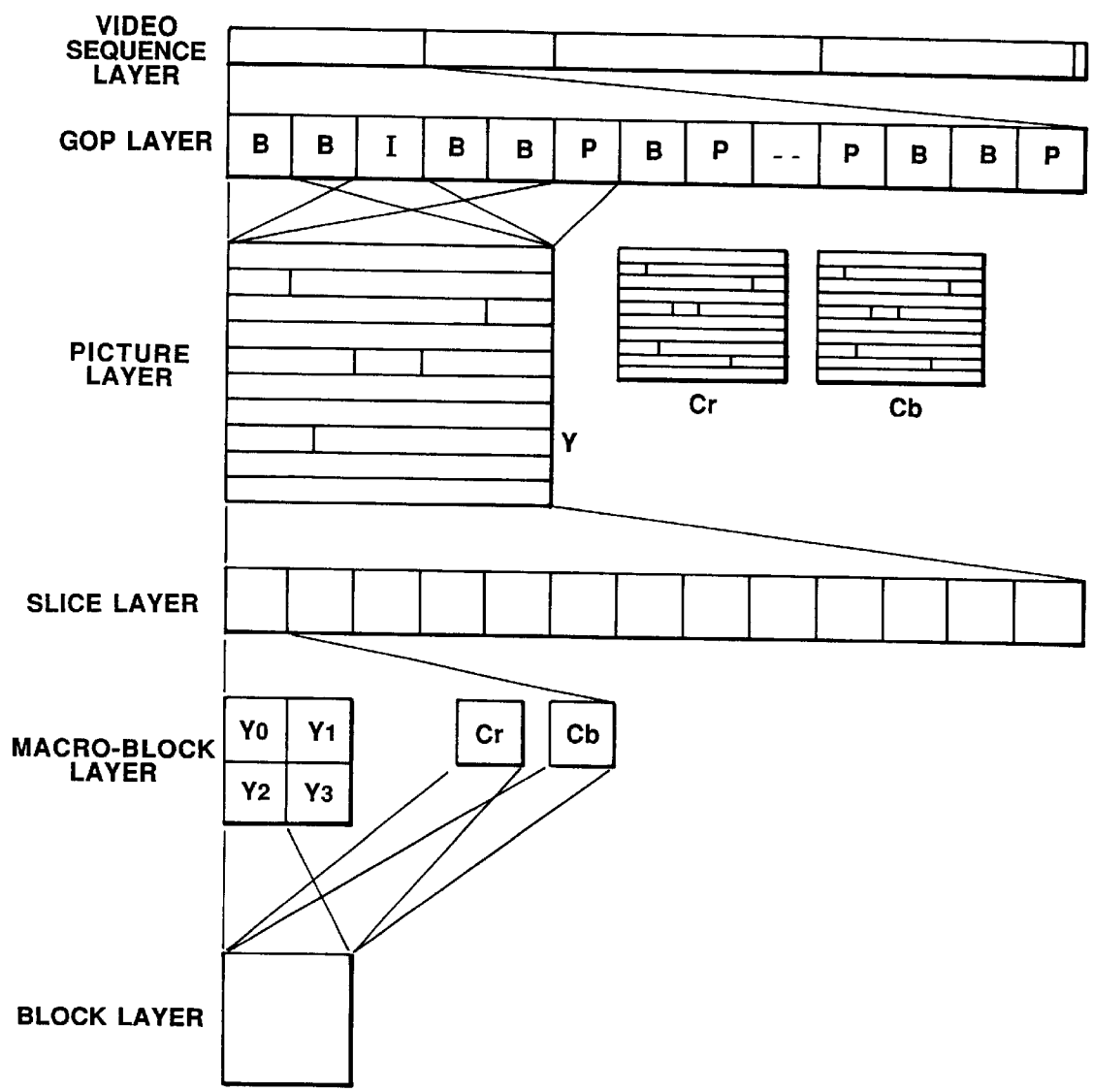
FIG. 20 is a diagram showing a logical data structure of a sequence of encoded pictures to which reference will be made in explaining the present invention.

FIG. 20 shows the logical data structure of 4:2:0 pictures encoded by the encoder of FIG. 3. FIG. 21 shows the recording data sequence corresponding thereto.

The logical data structure shown in FIG. 20 comprises six layers: a sequence layer, a group of pictures (GOP) layer, a picture layer, a slice layer, a macroblock layer and a block layer.

The video sequence layer represents a sequence of pictures, such as an entertainment program or a portion thereof, and comprises one or more GOP layers having the same picture size, picture rate and so on.

The GOP layer comprises a group of one or more pictures intended to assist random access into the group. The first temporal picture in the first group is always an I picture. The last temporal picture in any group is an I or P picture. The first temporal picture in the second and subsequent groups is either an I picture or a B picture from the preceding group. The decoder must receive the reference pictures, both temporally past and future, for a B picture before the differential data for the B picture itself is received. Consequently, the position of pictures in the encoded data is different than their temporal display order.

The picture layer comprises one of an I, B or P picture. Each picture layer includes at least one slice, but it is preferred that a plural number of slices be included in each picture layer.

The slice layer allows a decoder to recover from a data error and to resynchronize its decoding. The slice layer includes at least one macroblock, with the macroblocks in a slice being contiguous in the picture scanning sequence. Each macroblock belongs to exactly one slice layer. The boundaries of a slice with respect to a series of macroblocks may change from picture to picture. At the beginning of a slice, the motion vector, DC component and quantization width in a picture are reset. The absolute address of the first macroblock in each slice is provided. The addresses of the remaining macroblocks in each slice are expressed as address increments relative to the absolute address of the first macroblock in each slice.

The macroblock layer contains a macroblock representing a section of luminance values and the corresponding chrominance values, as explained above. The luminance data in a macroblock is of size 16 pixels×16 rows. The encoder of FIG. 3 performs one of frame-based and field-based predictive encoding and one of frame-based and field-based orthogonal transformation for each macroblock in a picture.

The block layer represents the unit of data processed together in the DCT circuit. A block is of size 8 pixels×8 rows.

Figure 21:
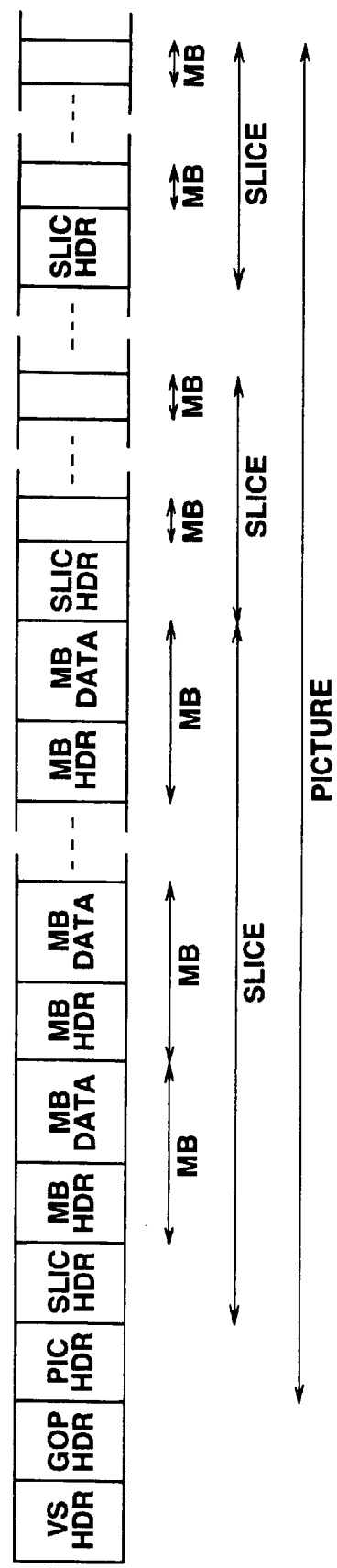
FIG. 21 is a diagram showing a data transmission format of a sequence of encoded pictures to which reference will be made in explaining the present invention.

As shown in FIG. 21, the recording data sequence includes a header for each layer. The block layer is not shown to simplify the illustration.

The variable length coding circuit 15 receives information identifying the picture as an I, B or P field or frame picture, and places this information in the picture header.

As noted above, the first macroblock in a slice has an absolute address identifying its position in a picture, while subsequent macroblocks in the slice have an incremental address expressed relative to that of the first macroblock, so as to reduce the number of bits in the encoded data. The coding circuit 15 places this address information in the macroblock header.

The variable length coding circuit 15 receives information identifying the type (frame-based or field-based) of orthogonal transformation used in encoding a macroblock, information identifying the type (frame-based or field-based) of predictive encoding used in encoding a macroblock, macroblock type information identifying its prediction type, that is, intra, forward, backward or bidirectional, an indication of which frame(s) or field(s) comprise the reference picture(s) and information identifying the quantization step width used to generate the quantized data in a macroblock, and places this information in the macroblock header.

Meanwhile, with the encoding device of the present embodiment, the present code is realized by adding extension bits to the macro-block type of Committee Draft MPEG 90/176/Revision 2 for interchangeability with the conventional system.

That is, in the encoder of FIG. 3, the macro-block type has three predictions, namely forward prediction, backward prediction and bidirectional prediction. Since prediction from odd-numbered and even-numbered fields of the previous frame are possible with the forward prediction, the present code is realized by appending extension bits useful for recognizing which of these predictions is used. Since there are two predictions, it suffices to add one bit for one direction, that is for the forward or backward direction. For example, if the prediction is forward or backward prediction and from the odd-numbered fields, it suffices to add a code 1 as an extension bit to the conventional macro-bit type. Similarly, if the prediction is from the even-numbered field, it suffices to add a code 0 as an extension bit to the conventional macro-bit type. For bidirectional prediction, both extension bits are appended for both forward and backward predictions.

Meanwhile, for a frame prediction mode, no extension bits are appended, so that the bit string is of the same style as the conventional bit stream of Committee Draft MPEG 90/176/Revision 2.

The above applies to the P-frame as well.

The encoder of FIG. 4 comprises generally the same elements as the encoder of FIG. 3, and a description thereof is omitted for brevity. The differences between the encoders of FIGS. 3 and 4 will now be described.

The encoder of FIG. 4, as already noted, transmits data in the even scanning cycle when field-based orthogonal transformation is performed, as shown in FIGS. 12, 16B and 16D, and permits intra-frame prediction from an odd field to an even field, as shown in FIG. 8. Thus, field motion detector 21' of FIG. 4 differs from field motion detector 21 of FIG. 3 in that, for macroblocks of an even field, detector 21' functions to detect motion to this macroblock from the macroblock sized areas in the odd field of the same frame as the even field. Also, frame memory 20' of FIG. 4 differs from the frame memory 20 of FIG. 3 in that it is adapted to generate a predicted even field macroblock from a macroblock in the odd field of the same frame. Furthermore, address generator 11' differs from address generator 11 of FIG. 3 in that, for field-based transformation, the even field blocks are read out of frame memory group 10 during the even scanning cycle rather than during the same scanning cycle as the odd field blocks.

It will be appreciated that the encoder of FIG. 3 can be modified in the manner of FIG. 4 to permit intra-frame prediction, with transmission of the even field data during the even cycle.

Mode decision circuit 43 of FIG. 4 combines the functions of motion prediction decision circuit 23 and block processing decision circuit 25 of FIG. 3. The circuit 43 is adapted to generate an approximate predicted macroblock in an even field from a macroblock sized areas in the odd field of the same frame. Furthermore, the mode decision circuit 43 selects the type of orthogonal transformation to be the same as the type of predictive encoding for a macroblock, that is, selects one of either frame-based transformation and frame-based motion prediction, or field-based transformation and field-based motion prediction. An advantage of selecting these types to be the same is that address generation in the frame memory 20' is simpler than address generation in the encoder of FIG. 3. Also, a decoder which decodes the encoded data produced by the encoder of FIG. 4 may have simpler address generation circuitry.

In the encoder of FIG. 4, the macro-block type has three predictions, namely forward prediction, backward prediction and bidirectional prediction for e.g. the B-frame. If the prediction is the forward prediction with the field prediction mode, it is necessary to append extension bits to the macroblock for allowing to recognize if, when the prediction is for the field prediction mode, the prediction is that from an odd-numbered field, an even-numbered field or from an odd-numbered field of the current frame. That is, since there is a prediction from the current frame in the forward field prediction mode, one or two extension bits are required for expressing three predictions including odd- and even-numbered predictions by extension bits. On the other hand, for backward field prediction mode, since there are two predictions, that is prediction for odd and even numbers, 1 extension bit is required. For example, for forward prediction, a code 01 for odd-numbered field of a forward frame and, a code Ol for even-numbered field of a forward frame and a code 11 for prediction from odd-numbered field of a rear frame are appended. For backward prediction, it suffices to append codes 1 and 0 for prediction from an odd-numbered field of a backward frame and for prediction from an even-numbered field of a backward frame to the conventional macro-bit type.

If the mode is the frame prediction mode, no extension bits are appended, so that the bit string is of the same style as the conventional bit stream (MPEG). For bidirectional prediction, both extension bits are appended for forward or backward prediction.

The above applies to the P-frame as well.

Figure 22:
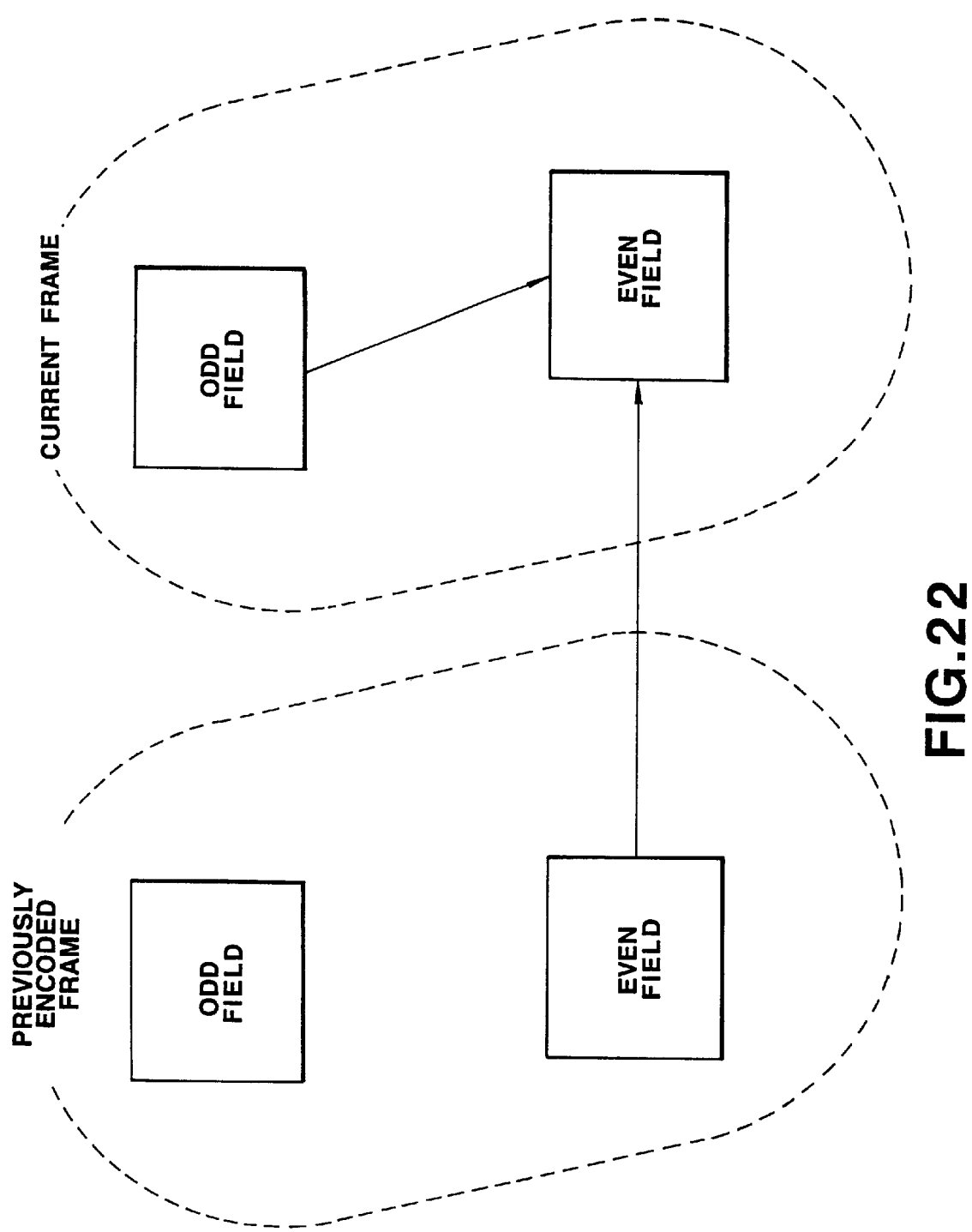
FIG. 22 is a diagram illustrating a type of field prediction which must be inhibited to reduce a number of bits needed to produce encoded picture data according to the present invention.

As a modification, the number of the extension bits can be reduced to one for forward prediction. That is, in the even-numbered cycle for the field prediction mode, the number of bits may be reduced to two and the forward prediction mode may be transmitted by one extension bit by abolishing prediction from the odd-numbered field furthest removed both temporally and spatially, as shown in FIG. 22. Specifically, for odd-numbered cycles and for forward prediction, it suffices to add codes 1 and 0 to the conventional macro-block type as extension bits in the case of prediction from an odd-numbered field of the forward frame and an even-numbered field of the forward frame. Similarly, for even-numbered cycles and for forward prediction, it suffices to add codes 1 and 0 to the conventional macro-block type as extension bits in the case of prediction from an odd-numbered field of the current frame and an even-numbered field of the forward frame. Finally, for backward prediction, it suffices to add codes 1 and 0 to the conventional macro-block type as extension bits in the case of prediction from an odd-numbered field of the backward frame and an even-numbered field of the backward frame.

The decoder of FIG. 5 comprises an input terminal 50, a variable length decoder 51, a quantization width memory 52, a dequantizer 53, an inverse DCT circuit 54, switches 55, 57, 58, 67, 68, 71, 72, adder 56, 69, motion compensators 59, 60, 63, 65, 66, field memories 61, 62, 64, a divider 70, and address generation circuits 81, 82, 83. A controller (not shown) controls the operation of switches 55, 57, 58, 67, 68, 71 and 72.

Encoded data produced by the encoder of FIG. 3 or the encoder of FIG. 4 is reproduced from a recording medium and supplied to the input terminal 50 of the decoder of FIG. 5.

The variable length decoder 51 is coupled to the input terminal 50 and receives therefrom the encoded data. The decoder 51 functions to separate the encoded coefficient data from the header data, perform variable length decoding of the encoded coefficient data and supply the coefficient data to the dequantizer 53, and supply appropriate portions of the header information to the quantization width memory 55, motion compensators 59, 60, 63, 65, 66, the address generation circuits 81, 82, 83, and to the controller, not shown, which controls the operation of the switches 55, 57, 58, 67, 68, 71, 72.

The header information for each macroblock includes motion vector data, the quantization width used during encoding, an indication of which of frame-based and field-based DCT transformation was used in encoding the coefficient data, an indication of which of frame-based and field-based motion prediction was used in encoding the coefficient data, an indication of which frame(s) or field(s) comprise the reference picture(s), an indication of whether the current picture is an I, P, or B field or frame picture, macroblock type information identifying its prediction type, that is, intra, forward, backward or bidirectional, and macroblock address information. As explained above, the header information includes the absolute address of the first macroblock in each slice, and an incremental address (address increment) for the remaining macroblocks in the slice.

The dequantizer 53 is adapted to multiply the variable length decoded coefficient data by the quantization width used during encoding to produce dequantized coefficient data, and to supply this data to the inverse DCT circuit 54 which functions to transform the coefficients to time domain data and to supply the time domain data to the adder 56.

When the macroblock being decoded is from a frame or an odd-field of an I picture, or is from an even field of an I picture that was encoded without prediction, the switch 57 supplies zero value data to the adder 56. Otherwise, the data from inverse DCT circuit 54 represents differential information, so the switch 57 supplies predicted macroblock data to the adder 56.

The adder 56 serves to add the data supplied thereto from inverse DCT circuit 54 and switch 57 to generate original picture data, and to supply this original picture data to the switch 58.

The switch 58 is controlled to switch the original picture data so that, when it represents an I picture, it is stored in frame buffer 64. When the data represents a P picture, it is stored in frame buffer 61, and subsequently received P pictures are stored in frame buffers 64 and 61 in alternating fashion. When the data represents a B picture, it is stored in frame buffer 62.

The frame buffers 61, 62, 64 each comprise an odd field memory and an even field memory, and are adapted to store odd field original picture data in the odd field memory and even field original picture data in the even field memory.

The motion compensators 59, 60, 63, 65, 66 are adapted to use the motion vector data, prediction type data (frame-based or field-based), macroblock type and picture type (I, B or P) indicator supplied thereto to decide which data should be read out of the buffer memory, apply an appropriate address to the buffer memory and read out data therefrom as predicted macroblock data, and to supply this data to the switches 67, 68. More specifically, the motion compensator 59 controls read out of odd field data stored in buffer 61, the motion compensator 60 controls read out of even field data stored in buffer 61, the motion compensator 63 controls read out of odd field data stored in buffer 62, the motion compensator 65 controls read out of odd field data stored in buffer 64, and the motion compensator 66 controls read out of even field data stored in buffer 64.

The switches 67 and 71 are controlled so that when predicted data should be based on one reference picture, data from switch 67 is delivered directly to switch 71. When predicted data should be based on two reference pictures, that is, represents a bidirectionally coded picture, the switches 67 and 68 are controlled according to the transformation type used in encoding the current macroblock supplied to adder 56 to select the appropriate predicted data from the motion compensators, and to supply these data to an adder 69, which functions to add them, and in turn supplies the added predictive data to a divider 70 which serves to divide the added predictive data by two, and to supply the quotient data to the switch 71, which is controlled to select this data and supply it to the switch 57 for addition to differential picture data for the bidirectionally coded picture data.

The switch 72 is controlled to supply original picture data from the buffers 61, 62, 64 in its original temporal sequence, which is different than its sequence in the encoded data, as explained above, in an interlaced scanned manner for display on a display device 73. The display device 73 forms no part of the present invention.

The address generators 81, 82, 83 are adapted to receive the absolute address for the first macroblock in a slice, and the address increments for the other macroblocks in the slice, and to compute therefrom the appropriate address in the buffers 61, 62, 64 for the just decoded original picture data supplied from switch 58. The address generators 81, 82, 83 are coupled to the buffers 61, 62, 64, respectively, and are adapted to present the appropriate address to the appropriate one of these buffers as the original picture data is received at this one of the buffers.

If the encoded data was encoded with a frame-based transformation, then the entirety of the macroblock is decoded in the odd cycle of the decoder shown in FIG. 5. If the encoded data was encoded with a field-based transformation, then the odd field data in a macroblock is decoded in the odd cycle of the decoder, while the even field data in the macroblock is decoded in the even cycle of the decoder.

The quantization width memory 52 has a capacity of one field and serves to store the quantization widths separated from the encoded data by the variable length decoder 51, so that these quantization widths are available for decoding even field data during the even cycle. The switch 55 is controlled to supply the quantization width data from the variable length decoder 51 during the odd cycle, and to supply the quantization width data from the quantization width memory 52 during the even cycle.

Frame memories 20, 20' of FIGS. 3 and 4, respectively, function in a similar manner as the frame buffers, motion compensators, address generation circuits, switches 58, 67, 68, 71, adder 69 and divider 70 shown in FIG. 5.

The operation of the decoder shown in FIG. 5 will now be explained.

As an example, let the first three pictures in a first group of pictures supplied to input terminal 50 be an I picture, a P picture and a B picture, each encoded with frame-based prediction and frame-based transformation.

When the I picture is supplied to the input terminal 50, the buffers 61, 62, 64 may be considered as empty. The coefficient data of the I picture is decoded and applied to the adder 56, which simply forwards it to the switch 58, which is controlled to transmit the decoded I picture to the buffer 64.

Next, the P picture is supplied to the input terminal 50. The coefficient data are decoded to differential picture data by the variable length decoder 51, dequantizer 53 and inverse DCT circuit 54, and are applied to the adder 56. Meanwhile, the motion compensators 65, 66 have used the motion vector data accompanying the P picture to read out the I picture stored in the buffer 64 in an alternating manner to produce interlaced predicted macroblocks which are supplied to switch 67, therefrom to switch 71, therefrom to switch 57, and therefrom to the adder 56. The adder 56 adds the differential picture data and the predicted picture data to obtain original picture data, which is supplied to switch 58 and therefrom to buffer 61.

Next, the B picture is supplied to the input terminal 50. The coefficient data are decoded to differential picture data by the variable length decoder 51, dequantizer 53 and inverse DCT circuit 54, and are applied to the adder 56. Meanwhile, one or two of the motion compensators 59, 60, 65, 66 have used the motion vector data accompanying the B picture to read out the I and/or P pictures stored in the buffer 64 to produce predicted macroblocks which are supplied to switches 67 and 68. If the B picture was encoded with prediction from only one reference picture, then the data from switch 67 is supplied directly from switch 67 to switch 71, therefrom to switch 57, and therefrom to the adder 56. If the B picture was encoded with bidirectional prediction from two reference pictures, then the switches 67, 68 are controlled to present the predicted data from these reference pictures, stored in one or more of buffers 61, 64, to adder 69 which adds them, and then divider 70 divides the added prediction pictures and supplies the result to switch 71, therefrom to switch 57, and therefrom to the adder 56. The adder 56 adds the differential picture data and the predicted picture data to obtain original picture data, which is supplied to switch 58 and therefrom to buffer 61.

When a picture applied to the input terminal 50 was encoded with field-based prediction, it will be appreciated that an even field of a frame may be predicted from the odd field of the same frame during an even cycle. In the case of intra-frame prediction, the motion compensators 59, 63 and 65 produce predicted data. Since a $B_{EVEN}$ field is never used as a reference field, there is no need for a motion compensator to be coupled to the even field of buffer 62.

When the original picture data applied to switch 58 represents interlaced odd and even pixel rows, the switch 58 switches between the odd and even fields of one of the buffers 61, 62, 64 at each pixel. When the original picture data applied to switch 58 represents segregated data, that is, pixels from either an odd field or pixels from an even field, the switch 58 simply stays in one position while the entirety of this data is written into one of the fields of the buffers 61, 62, 64.

It will be appreciated that, if the encoded signal is produced by the encoder of FIG. 4, the address generation circuitry in the decoder of FIG. 5 can be correspondingly simplified.

Another important aspect of the present invention is the use of first and second structure modes.

As shown in Table 6, in the first structure mode there is no inter-frame motion prediction, but intra-frame motion prediction and inter-field motion prediction between fields in different frames are possible. In the second structure mode, inter-frame and inter-field motion prediction are possible, but intra-frame motion prediction is not possible. As shown in Table 7, in the first structure mode all blocks of data contain data from either an odd field or an even field, so only field-based orthogonal transformation may be performed. In the second structure mode, blocks of data may be either interlaced blocks, that is, contain both odd and even field data, or segregated blocks, containing data from both an odd field and an even field of a frame, so that both frame-based and field-based orthogonal transformation may be performed in a frame.

TABLE 6

Predictive Encoding in Structure Modes

| MOTION PREDICTION | STRUCTURE MODE | |
|---|---|---|
| | FIRST | SECOND |
| INTER-FRAME | NO | YES |
| INTRA-FRAME | YES | NO |
| INTER-FIELD | YES | YES |

TABLE 7

Orthogonal Transformation in Structure Modes

| ORTHOGONAL TRANSFORMATION | STRUCTURE MODE | |
|---|---|---|
| BLOCK COMPOSITION | FIRST | SECOND |
| INTERLACED ODD AND EVEN FIELD PIXEL DATA | NO | YES |
| SEPARATED ODD OR EVEN FIELD PIXEL DATA | YES, BY FIELD (MACROBLOCK HAS DATA FROM EITHER ODD OR EVEN FIELD) | YES, SEGREGATED MACROBLOCKS |

Figure 23:
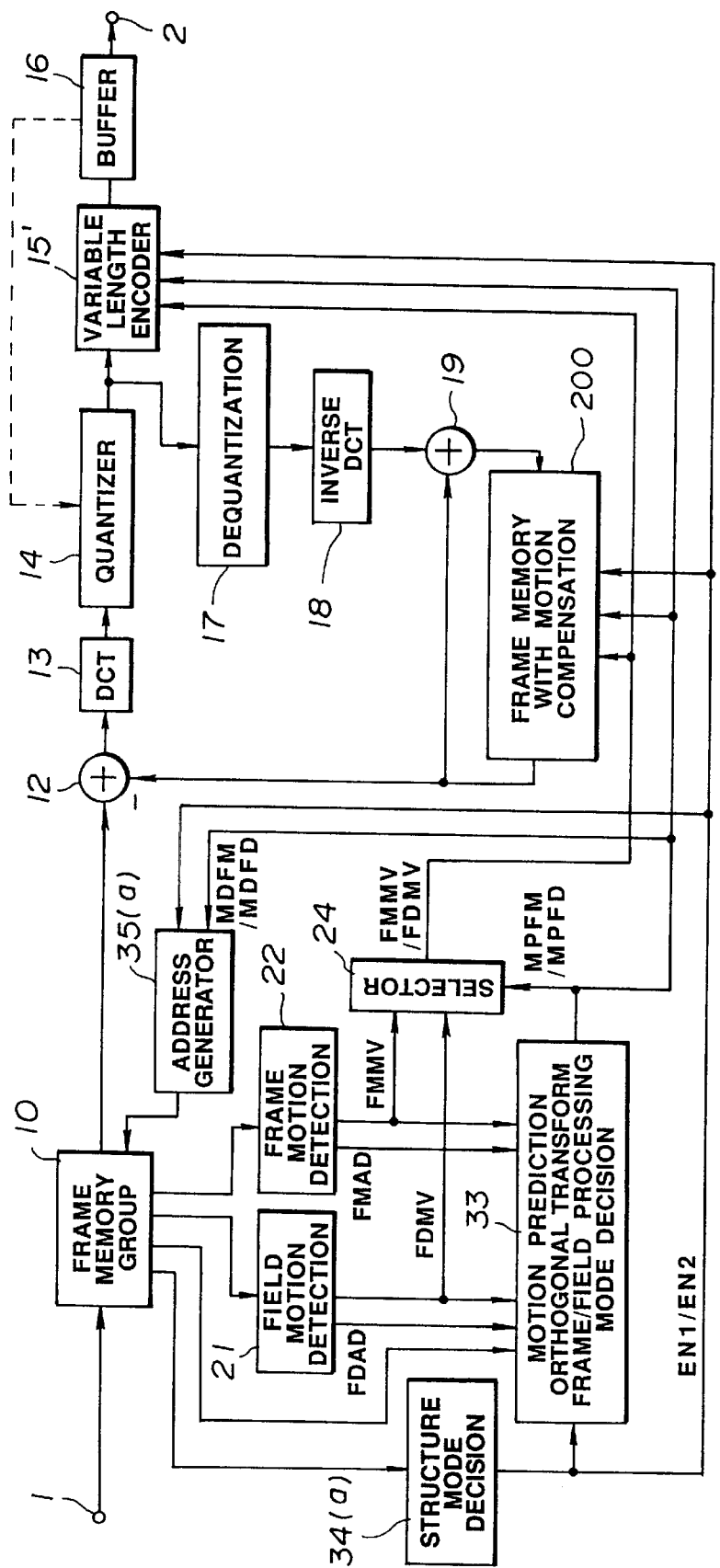
FIG. 23 is a block diagram showing another embodiment of an encoder according to the present invention.
Figure 24:
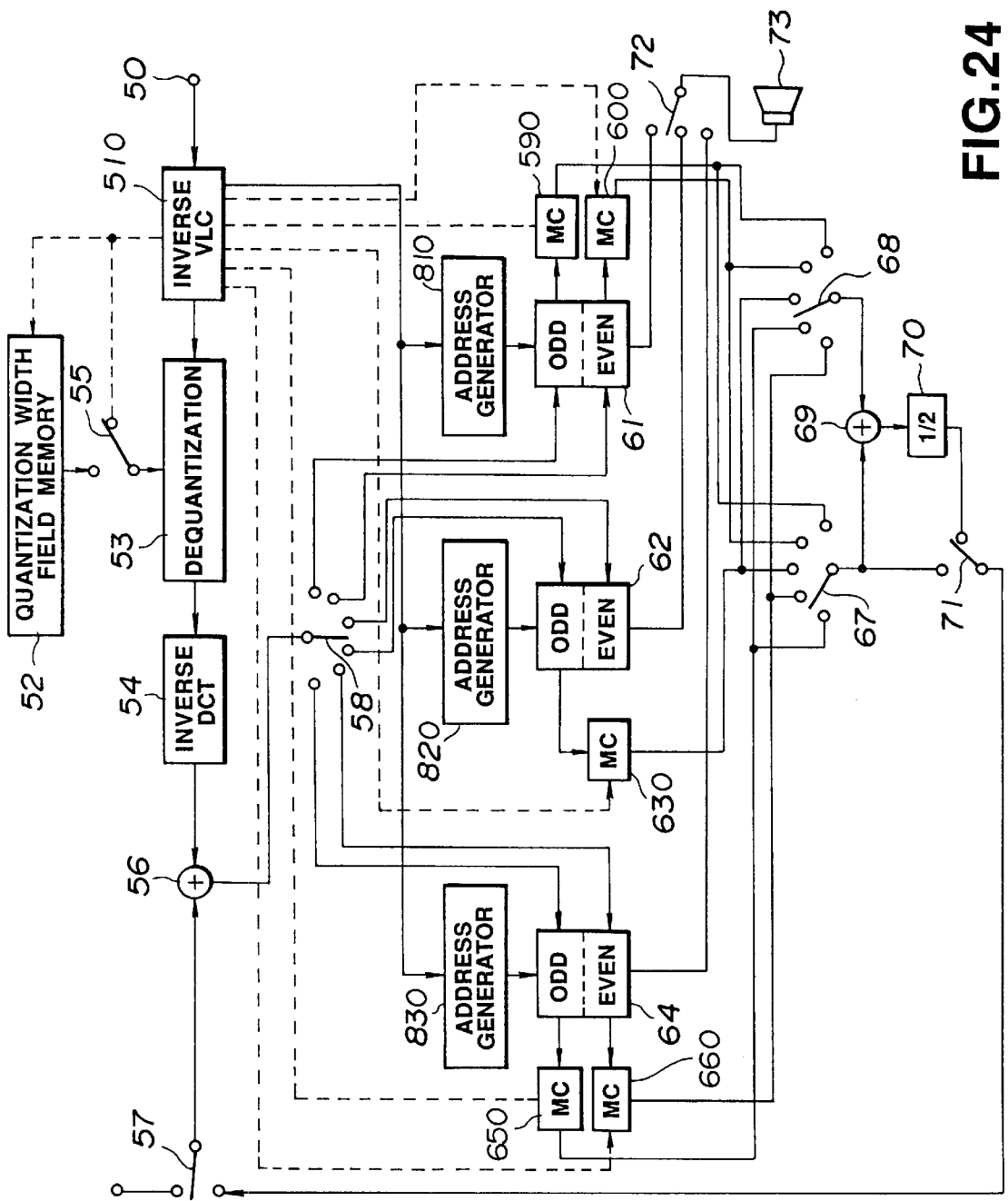
FIG. 24 is a block diagram showing another embodiment of a decoder according to the present invention.
Figure 25:
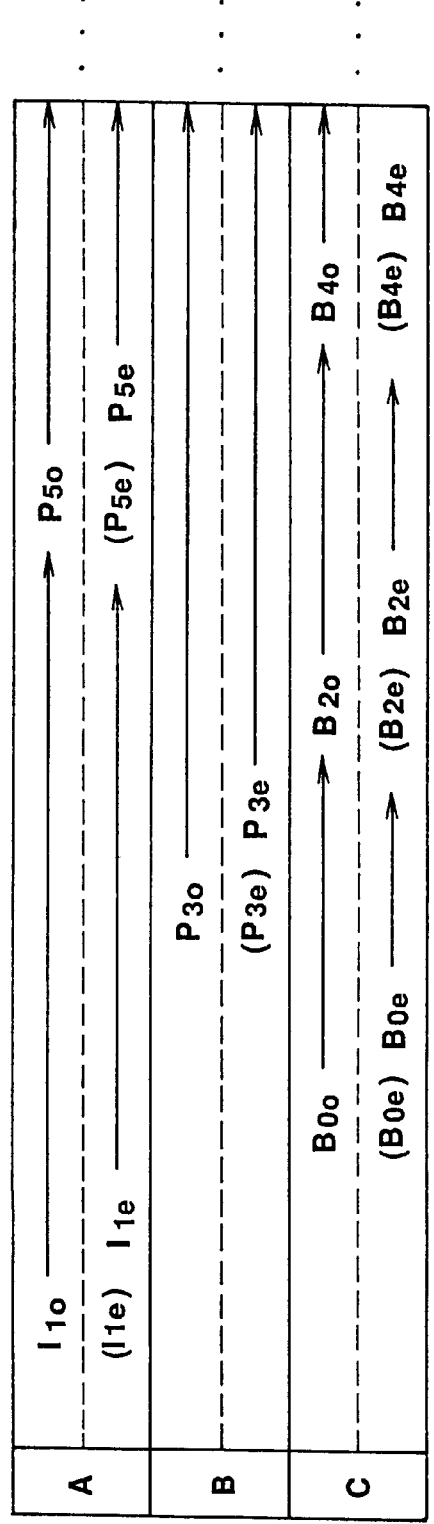
FIG. 25 is a chart showing buffer occupancy in the decoder shown in FIG. 24.

FIG. 23 shows an encoder operable to select one of the first and second structure modes for encoding of a frame of picture data. FIG. 24 shows a decoder operable to decode encoded data produced by the encoder of FIG. 23. FIG. 25 is a buffer occupancy chart for the decoder of FIG. 24. The structure modes will be further explained, several techniques for determining which structure mode is most efficient for a frame will be explained, and then the encoder and decoder shown in FIGS. 23 and 24, and the buffer occupancy chart shown in FIG. 25 will be explained in detail.

Generally, the first structure mode is effective for encoding pictures having a lot of motion, while the second structure mode is effective for encoding pictures having a moderate or no amount of motion. In other words, the efficiency of predictive encoding versus orthogonal transformation depends on the amount of motion represented in a picture.

An advantage of an encoder according to the present invention is that a picture is encoded with the predictive encoding and orthogonal transformation techniques best suited to the individual picture, that is, an encoder according to the present invention is a motion adaptive encoder.

An advantage of inhibiting intra-frame prediction in the second structure mode is that the address generator used with the memory storing the reference pictures in each of an encoder and a decoder can be simplified, resulting in a reduction in hardware size.

Figure 26:
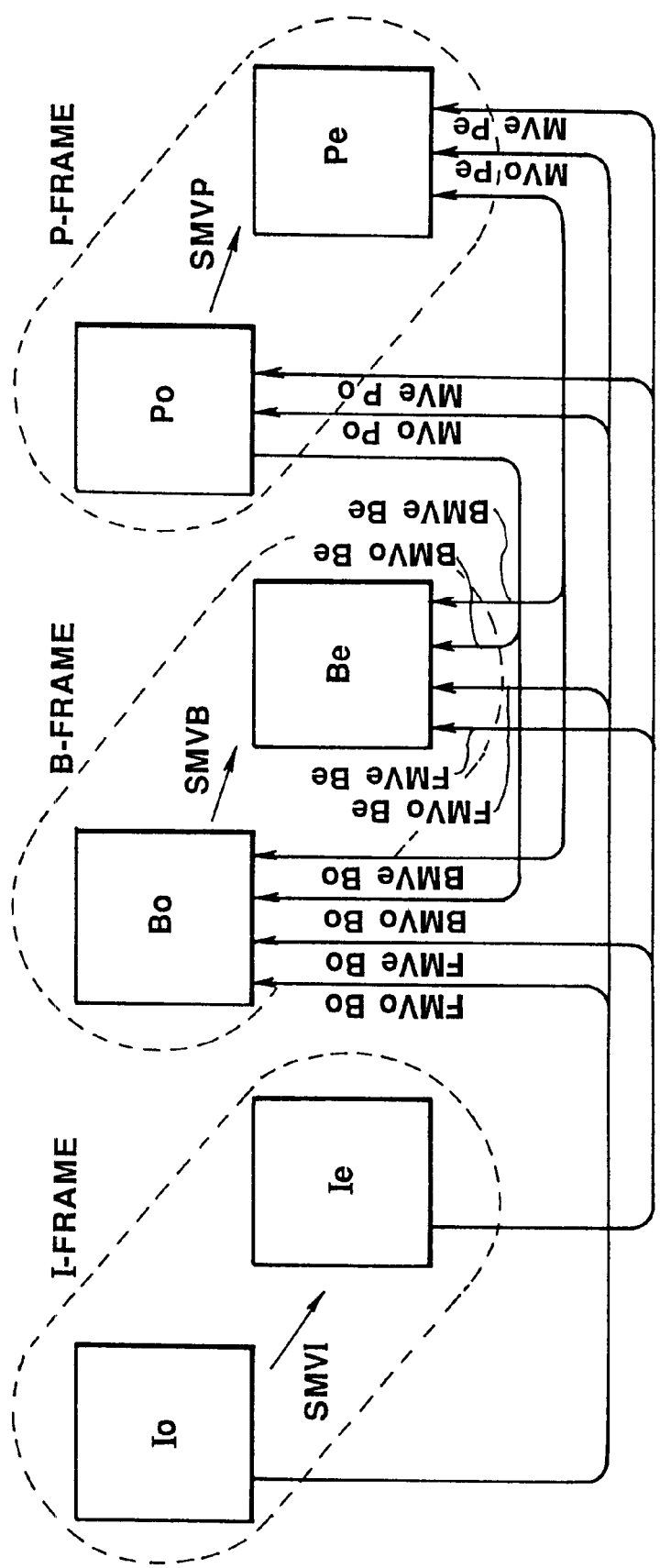
FIG. 26 is a chart illustrating motion vectors used in predictive encoding in the first structure mode.

The permissible motion vectors for the first structure mode are shown in FIG. 26. It will be seen that the inter-frame motion vectors MVP, FMVB and BMVB are not available for predicting motion between frames, but that the field to field motion vectors SMVI, SMVB, SMVP, MVoPo, MVePo, MVoPe, MVePe, FMVoBo, FMVeBo, FMVoBe, FMVeBe, BMVoBo, BMVeBo, BMVoBe and BMVeBe are available for predicting motion between frames.

The permissible motion vectors for the second structure mode are shown in FIG. 9. That is, the second structure mode has the same motion prediction possibilities as the encoder shown in FIG. 3.

Figure 27:
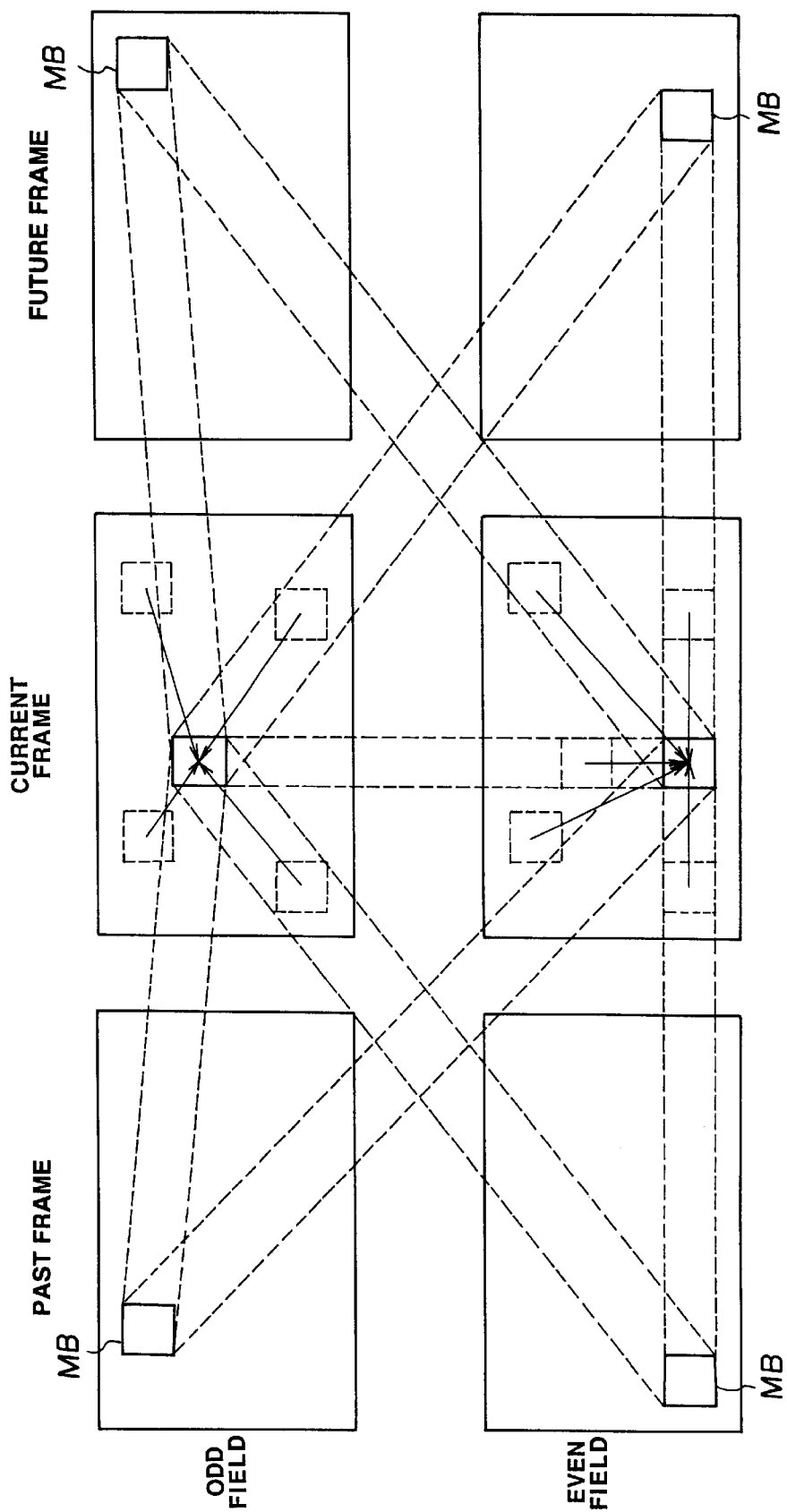
FIG. 27 is a chart illustrating motion prediction possibilities for the first structure mode.

FIG. 27 shows prediction possibilities for the first structure mode using another type of illustration. In FIG. 27, the current frame, assumed to be a B picture, is shown between a temporally past reference frame and a temporally future reference frame. Since there can be multiple B pictures between successive reference (I or P) pictures, it will be understood that a temporally past or future frame is not necessarily the immediately preceding or immediately succeeding frame.

Figure 28:
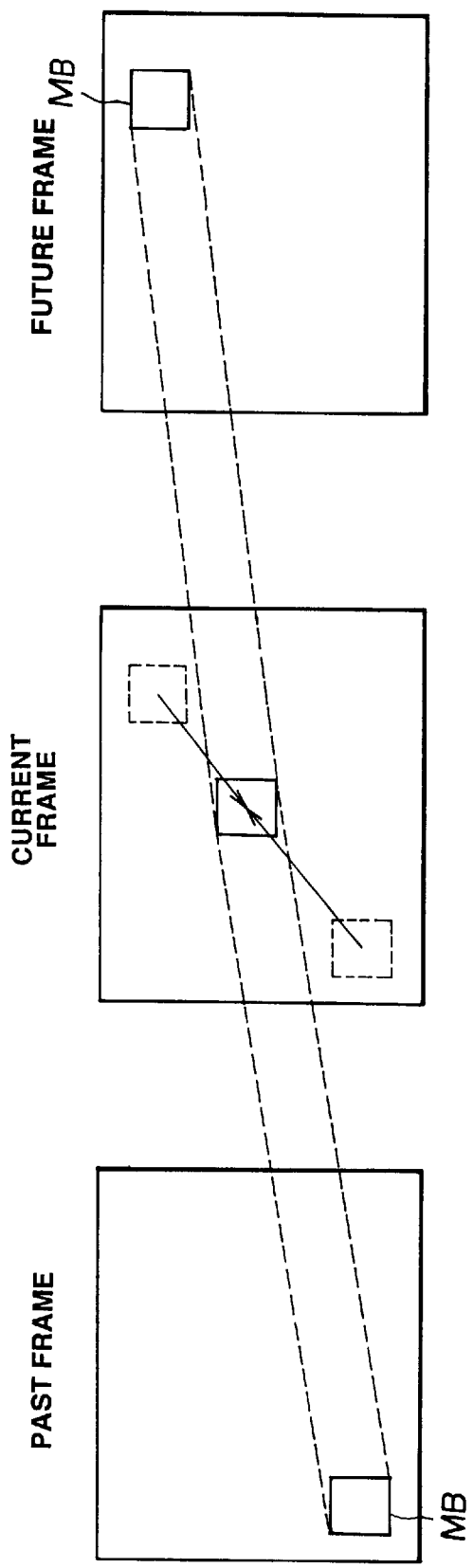
FIG. 28 is a chart illustrating motion prediction possibilities for frame-based prediction in the second structure mode.

FIG. 28 shows prediction possibilities for the second structure mode when frame-based motion prediction is used.

Figure 29:
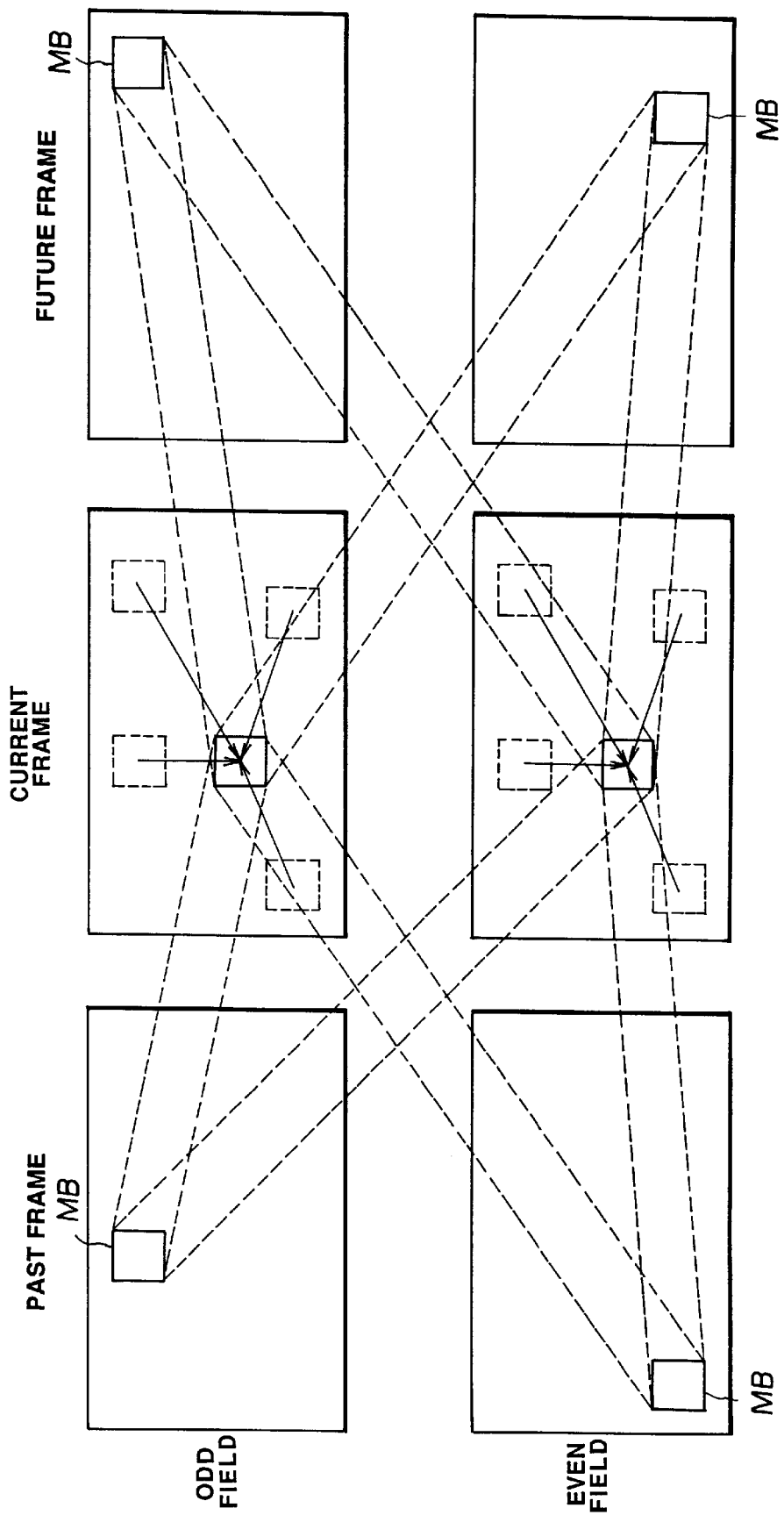
FIG. 29 is a chart illustrating motion prediction possibilites for field-based prediction in the second structure mode.

FIG. 29 shows prediction possibilities for the second structure mode when field-based motion prediction is used. As explained, in the second structure mode, intra-frame prediction is not possible.

In the first structure mode, only field-based transformation of original picture or differential picture data is performed. First the odd field data for a picture is transformed in an odd scanning cycle, then the even field data for the picture is transformed in an even scanning cycle. Thus, the macroblocks produced in the first structure mode contain either odd field or even field data. Frame scanning in the first structure mode is shown in FIG. 10B.

In the second structure mode, either field-based or frame-based transformation of the blocks in a macroblock is possible. However, the entirety of each macroblock is transformed at one time, that is, there are no odd and even cycles. An example of frame scanning in the second structure mode is shown in FIG. 10C.

As explained below, when the constraints inherent in the first and second structure modes are combined with additional constraints, the memory capacity required in an encoder and decoder according to the present invention may be reduced.

Several techniques for determining which structure mode is most efficient for a frame will now be explained. Each of these techniques attempts to determine whether there is a lot of motion in the current frame, and if there is, chooses the first structure mode as the best mode for encoding of the frame. Each of these techniques may be employed in the encoder of FIG. 23.

A simple technique for deciding which of the first and second structure modes should be used is as follows. A frame is divided into an odd field and an even field. The sum of the absolute values of the differences of the pixels between the odd field and the even field is obtained. If this sum exceeds a predetermined threshold value, then the first structure mode is selected. If this sum does not exceed the predetermined threshold value, the second structure mode is selected.

Another technique for selecting which of the first and second structure modes is most appropriate for a frame is as follows. The field motion vector data FDMV for intra-frame prediction is received from the field motion detector 21. If the intra-frame field motion vector data FDMV exceeds a predetermined threshold value, then the first structure mode is selected. If the intra-frame field motion vector data FDMV does not exceed the predetermined threshold value, the second structure mode is selected.

Figure 30:
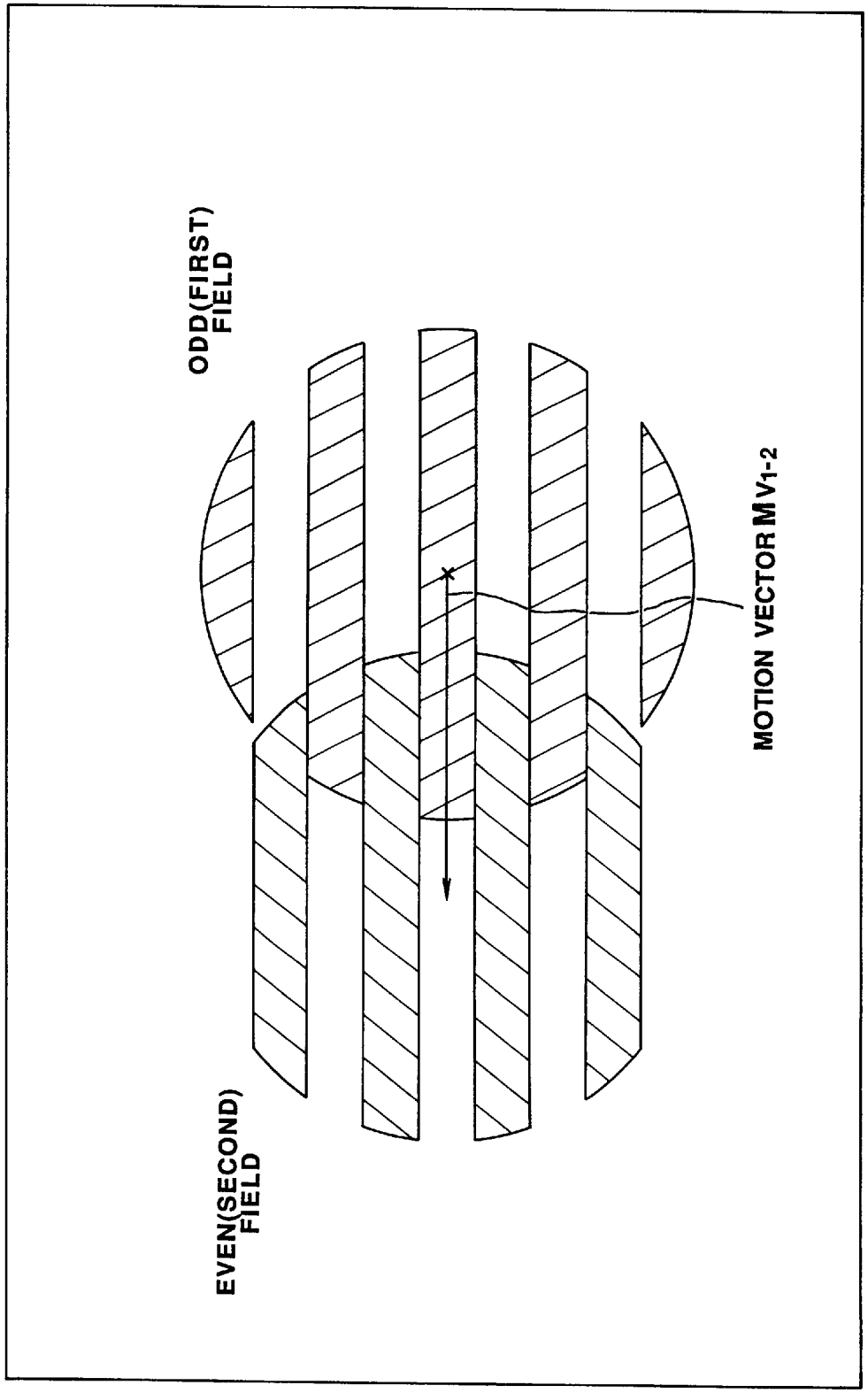
FIG. 30 is a diagram illustrating a motion vector from an odd field to an even field.

FIG. 30 shows a motion vector $MV_{1-2}$ from an odd field to an even field. The structure mode may be selected in accordance with the motion vectors, such as $MV_{1-2}$, needed for intra-frame odd field to even field prediction.

Figure 31:
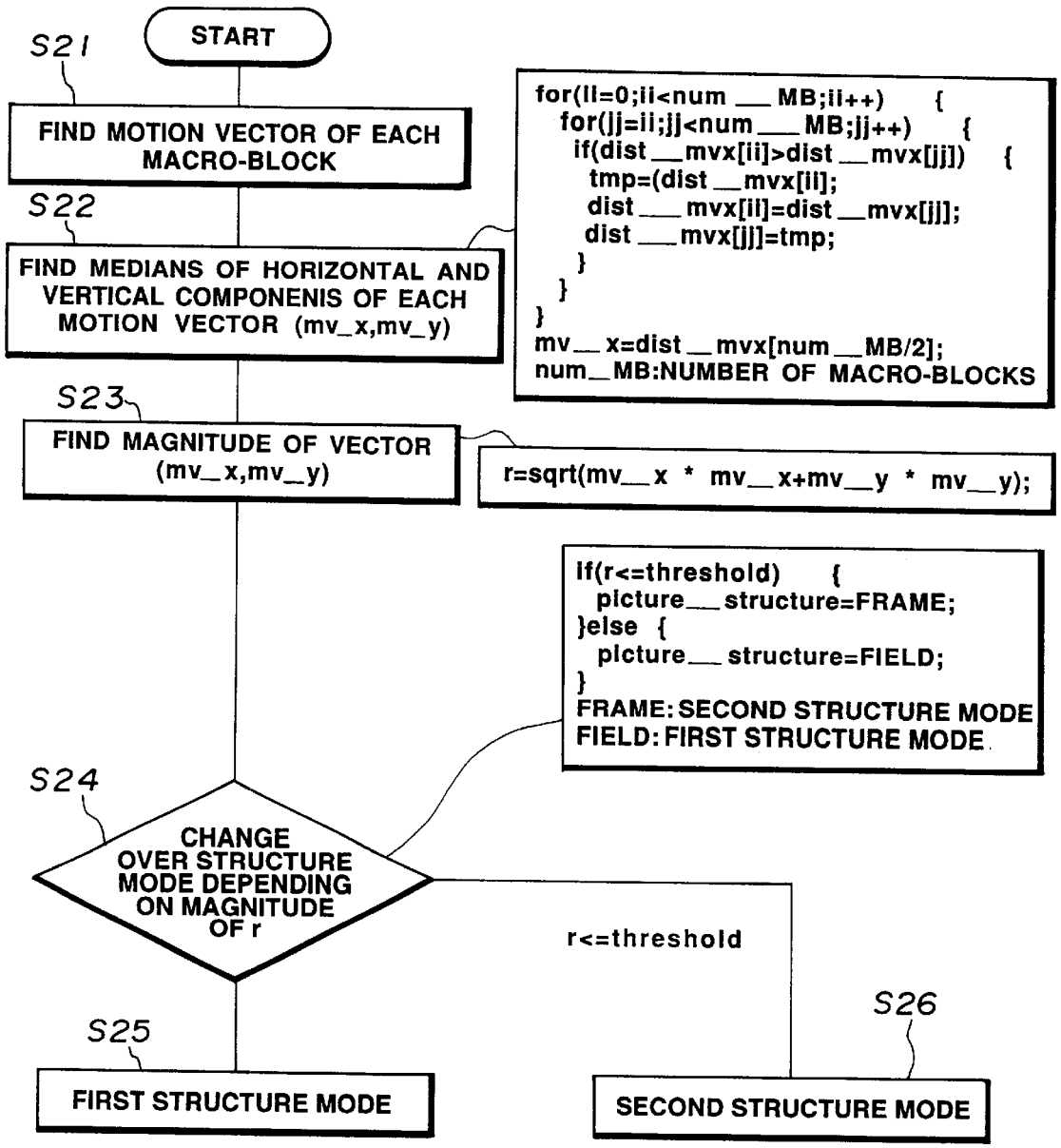
FIGS. 31–35 are flowcharts to which reference will be made in explaining techniques for selecting between the first structure mode and the second structure mode during encoding of a picture according to the present invention.

FIG. 31 shows a flowchart of a technique for determining which structure mode is most efficient for a frame. The technique illustrated in FIG. 31 is referred to herein as a median motion vector technique, and determines the amount of motion in a frame by checking whether the magnitude of the median motion vector needed for intra-frame odd to even field prediction exceeds a threshold.

At steps 21, the motion vectors to predict each macroblock in the even field of the frame from the macroblock sized areas in the odd field of the frame are obtained. As explained, a motion vector may be obtained by summing the absolute value of the pixel-by-pixel differences between a macroblock in the even field and each macroblock sized areas in the odd field, and choosing the odd field macroblock sized areas corresponding to the smallest summed value as the reference macroblock for the even field macroblock. The motion vector is the difference between the macroblock position coordinates of the reference macroblock in the odd field and the macroblock position coordinates of the current macroblock in the even field. To obtain all the motion vectors for the even field, this procedure needs to be repeated for each of the macroblocks in the even field.

At step S22, the horizontal (x-axis) components for all of the motion vectors for the even field are sorted from the smallest value to the largest value, and the vertical (y-axis) components for all of the motion vectors for the even field are also sorted from the smallest value to the largest value. Then, the median value of the horizontal components mv_x is selected, and the median value of the vertical components mv_y is selected. The median motion vector (mv_x, mv_y) approximately represents the motion of the entire picture.

At step S23, the magnitude r of the median motion vector is found according to equation 3.

$$r = |MV| = \sqrt{(Mv\_x^2 + Mv\_y^2)} \qquad \text{Eq. 3}$$

At step S24, the magnitude r of the median motion vector is compared to a predetermined threshold value.

If the magnitude r is at least equal to the threshold, that is, r≧"threshold", then at step S25, the first structure mode is selected.

If the magnitude r is less than the threshold, that is, r<"threshold", then at step S26, the second structure mode is selected.

Figure 32:
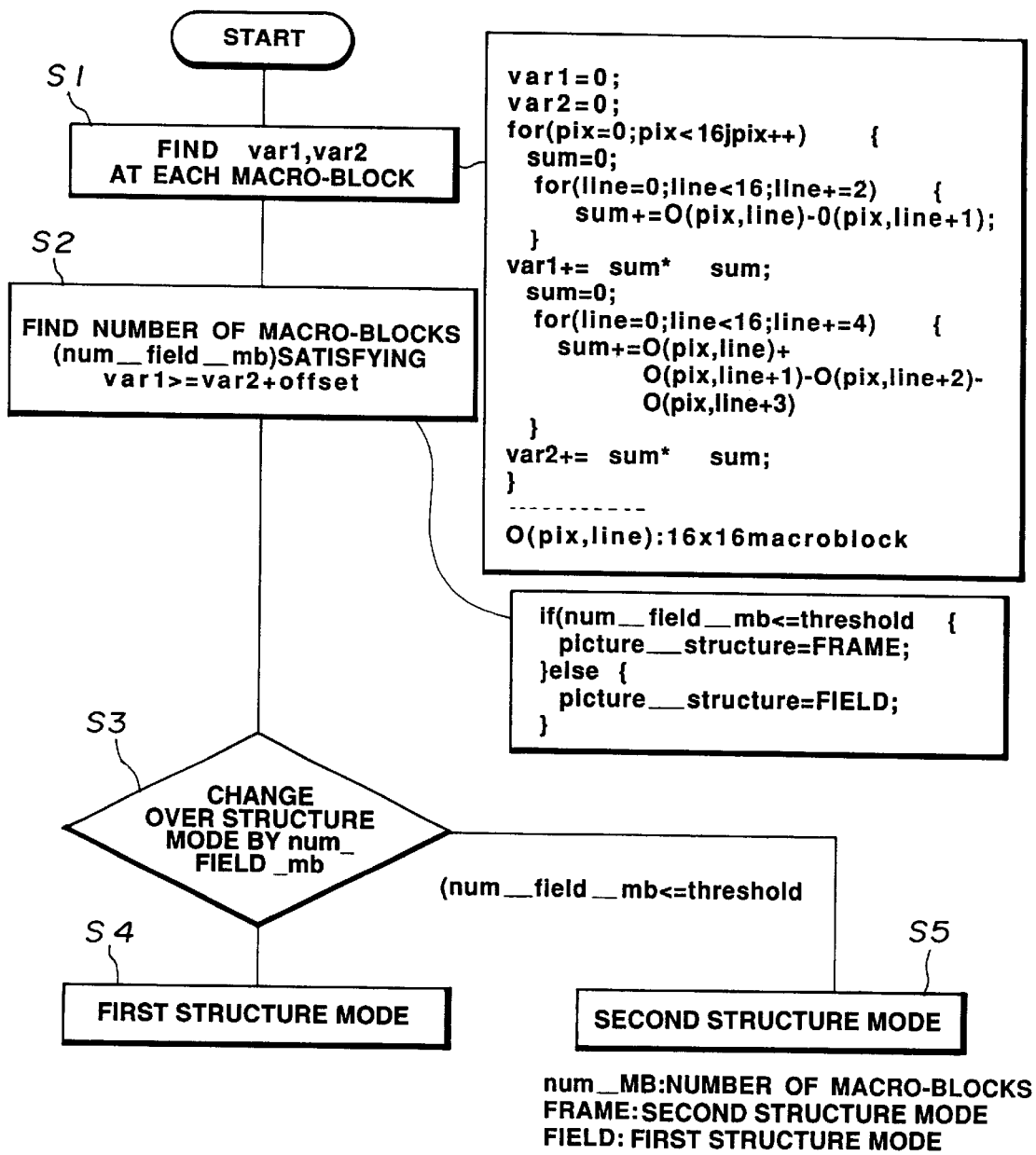

FIG. 32 shows a flowchart of a further technique for determining which structure mode is most efficient for encoding a frame. The technique illustrated in FIG. 32 is referred to herein as a field correlation technique, and determines the amount of motion in a frame based on the correlation between the odd and even fields in the frame.

At step S1, for each macroblock position in a field, the variable var1, indicating the similarity between corresponding odd and even rows in a frame having interlaced rows which are considered in an amount representing an odd field macroblock and an even field macroblock at the macroblock position is determined in accordance with the following:

$$var1 = \sum_{pix=0}^{15} \sum_{line=0}^{15} (O(pix, line) - O(pix, line + 1))^2 \text{ increment by 2}$$

It will be appreciated that the variable var1 is used to detect comb deformation of edges in a picture due to motion.

Also, the variable var2, indicating the similarity between a first pair of odd and even rows with a second pair of odd and even rows vertically just beneath the first pair is determined in accordance with the following:

$$var2 = \sum_{pix=0}^{15} \sum_{line=0}^{15} (\{O(pix, line) + O(pix, line + 1)\} - \{O(pix, line + 2) + O(pix, line + 3)\})^2 \text{ increment by 4}$$

It will be appreciated that pairs of vertically adjacent rows are expected to be devoid of comb distortion, whether the picture represents a stationary object or a moving object.

At step S2, for each macroblock, the variable var1 is compared to the variable var2 plus a predetermined offset, which may serve to represent naturally occurring edges in a macroblock. In other words, for each macroblock, this step detects whether the edge activity is higher than would be expected in a naturally occurring picture. The number of macroblocks num_field_mb for which var1 exceeds var2 plus the offset is obtained.

At step S3, it is determined whether the number of macroblocks num_field_mb exceeds a predetermined threshold, and if so, then at step S4, the first structure mode is selected. If the number of macroblocks num_field_mb does not exceed the threshold, then, at step S5, the second structure mode is selected.

Figure 33:
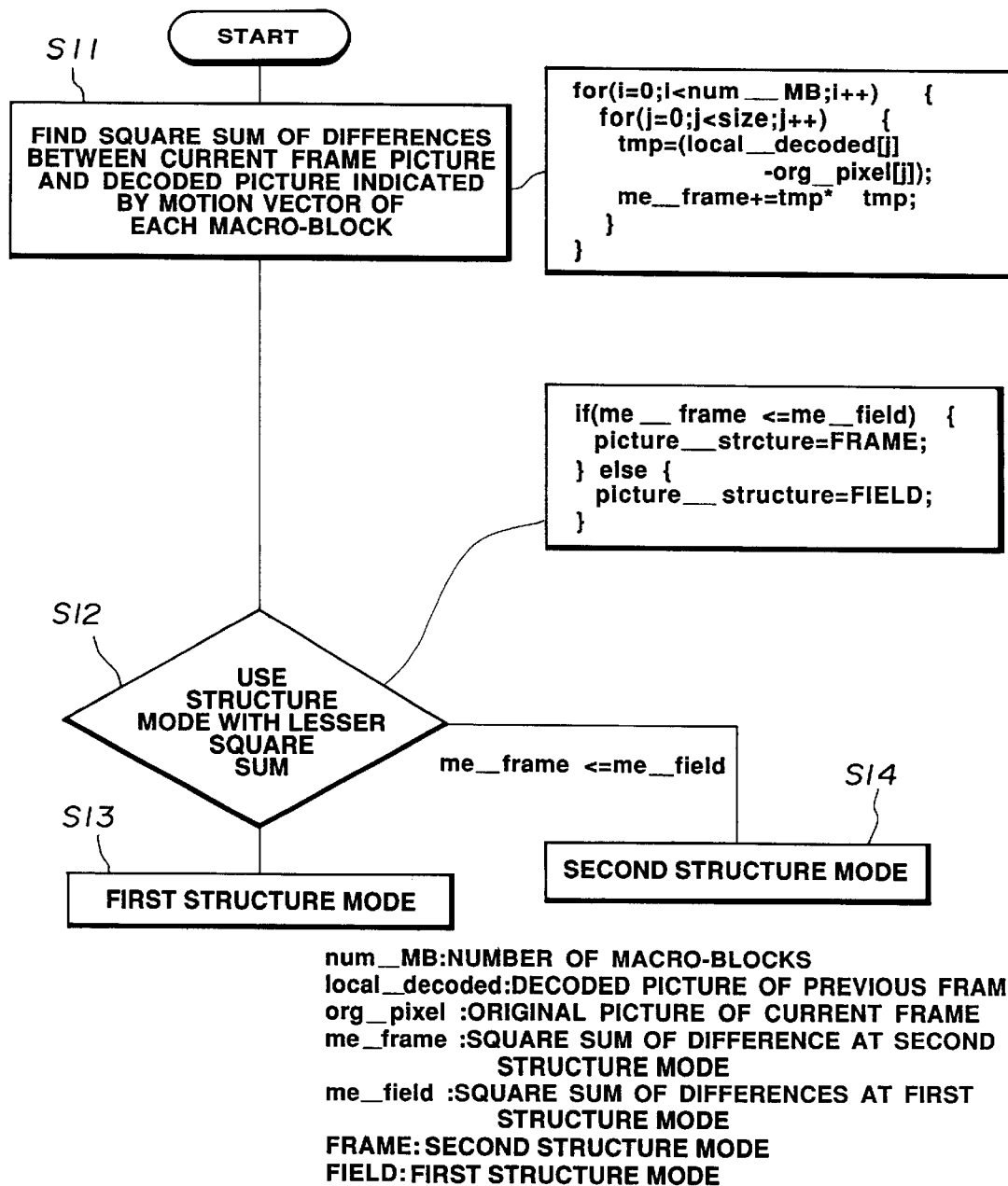

FIG. 33 shows a flowchart of another technique for determining which structure mode is most efficient for encoding a frame. The technique illustrated in FIG. 33 is referred to herein as a sum of squares technique.

At step S11, the difference between the previously decoded picture referred to by the motion vector and the current picture, for each of the macro-blocks of the current picture, is found, the square sums of the differences are found, and the structure mode selection is made at step S12, using the thus found square sums. The square sums of the differences are found with the first and second structure modes, and the structure mode having the lesser values of the square sums is selected.

Figure 34:
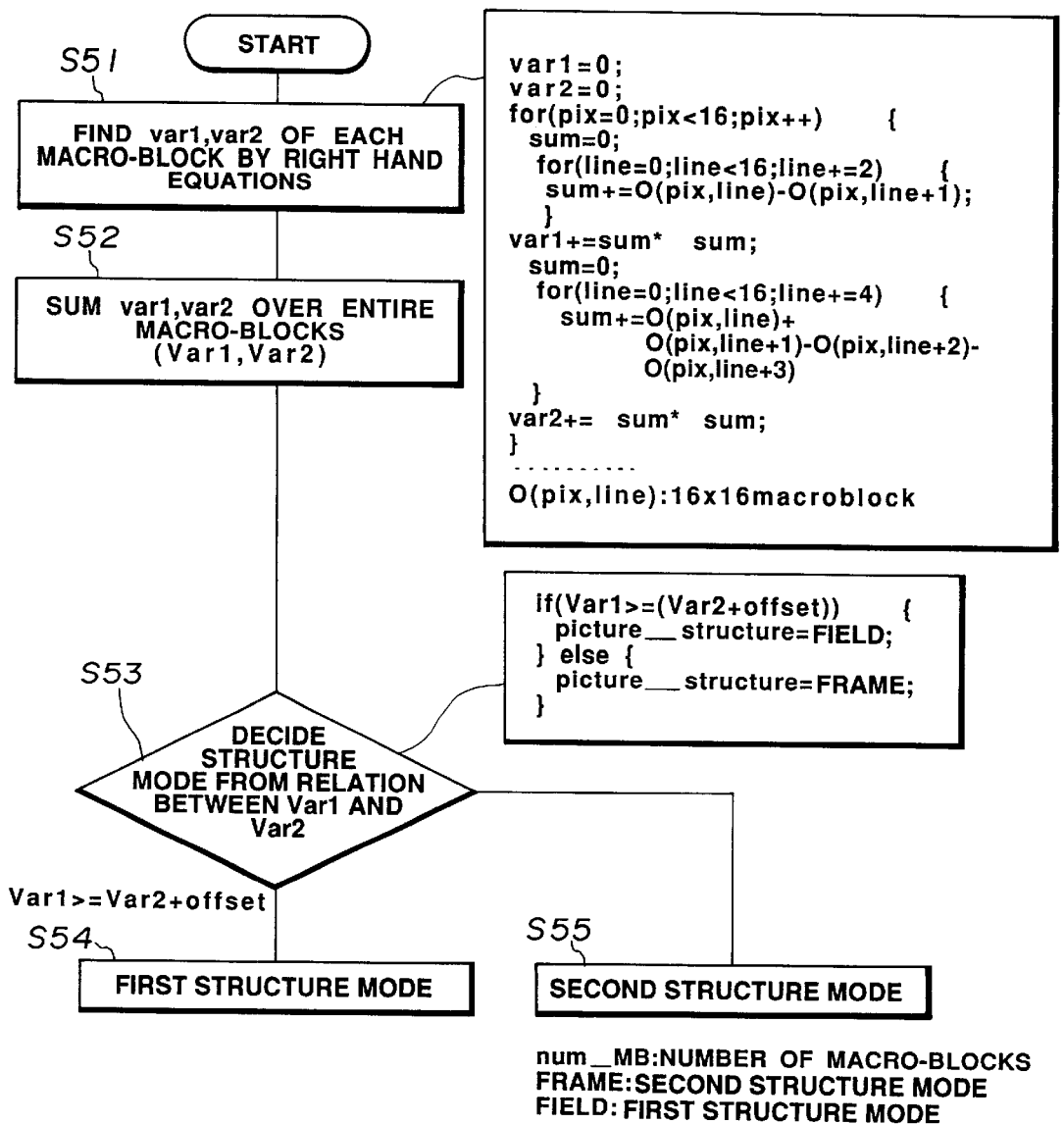

FIG. 34 shows a flowchart of still another technique for determining which structure mode is most efficient for encoding a frame. The technique illustrated in FIG. 34 is referred to herein as a summed field correlation technique, and determines the amount of motion in a frame based on the correlation between the odd and even fields in the frame, summed over the macroblocks in the frame.

Step S51 is identical to step S1 of FIG. 32. That is, at the conclusion of step S51, the variables varn and var2 are obtained for each pair of odd field and even field macroblocks at corresponding positions in the current frame.

At step S52, the variables Var1 and Var2, representing the respective sums of varn and var2 for all of the macroblocks in the frame are determined.

At step S53, the variable Var1 is compared with the variable Var2 plus a predetermined offset. In contrast, the technique of FIG. 32 obtains the number of macroblocks wherein var1 exceeds var2 plus a predetermined offset.

If Var1 exceeds or is equal to Var2 plus the predetermined offset then, at step S54, the first structure mode is selected. If Var1 does not exceed Var2 plus the predetermined offset then, at step S55, the second structure mode is selected.

Figure 35:
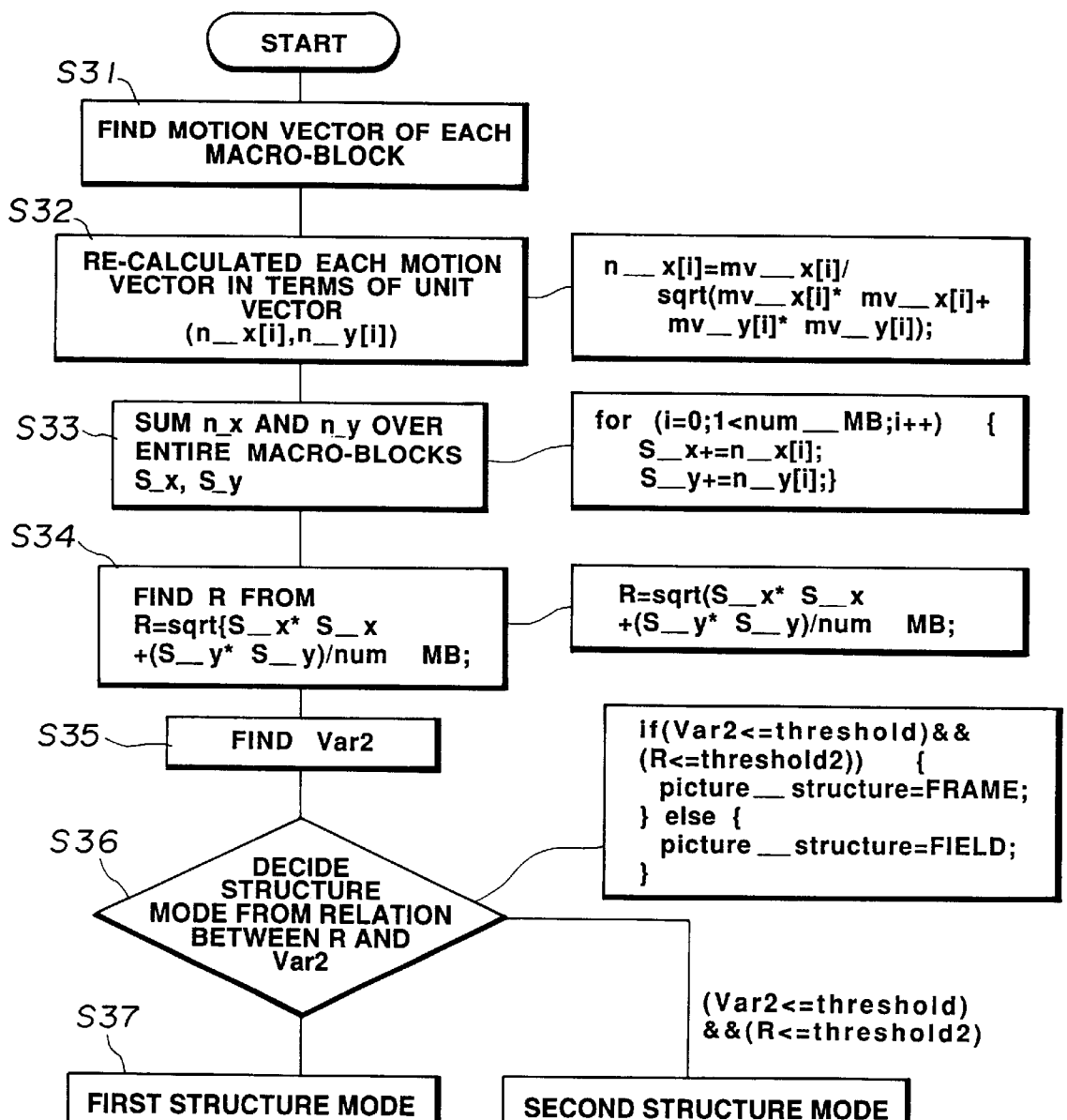

FIG. 35 shows yet another technique for determining which structure mode is most efficient for encoding a frame. The technique illustrated in FIG. 35 is referred to herein as a vector anisotropy technique, and determines the amount of motion in a frame based on the overall horizontal and vertical movement of the first field relative to the second, and the correlation between the first and second fields in the frame.

At step S31, the motion vector for each of the macroblocks is found. At step S32, the motion vector is converted into a fractional horizontal value and a fractional vertical value by dividing the horizontal and vertical motion vector components by the length of the motion vector, that is, expressing the horizontal and vertical motion vector components relative to a unit vector according to equations 4 and 5.

$$n\_x = \frac{mv\_x}{\sqrt{(mv\_x^2 + mv\_y^2)}} \qquad \text{Eq. 4}$$

$$n\_y = \frac{mv\_y}{\sqrt{(mv\_x^2 + mv\_y^2)}} \qquad \text{Eq. 5}$$

At step S33, the unit vectors in the horizontal direction n_x[i] for all of the macroblocks are summed together to produce an overall horizontal movement vector S_x, and the unit vectors in the vertical direction n_y[i] for all of the macroblocks are summed together to produce an overall vertical movement vector S_y.

At step S34, the length of the overall movement vector (S_x, S_y) is divided by the number of macroblocks num_MB to obtain the value R representing the average movement in a macroblock according to equation 6. The value R is a statistical quantity measuring the motion vector anisotropy, that is, the significance of the entirety of the movement in the picture $$R = \frac{\sqrt{(S\_x^2 + S\_y^2)}}{num\_MB} \qquad \text{Eq. 6}$$

At step S35, the field correlation variable Var2 is determined. As explained with respect to FIG. 34, the variable Var2 represents the sum of the variable var2 for each macroblock in the frame.

At step S36, it is determined whether the variable Var2 is less than or equal to a first threshold and whether the motion vector anisotropy R is less than or equal to a second threshold.

If both of these conditions exist, then at step S38, the second structure mode is selected. Otherwise, if either the field correlation variable Var2 exceeds the first threshold or the vector anisotropy R exceeds the second threshold, at step S37 the first structure mode is selected.

The encoder of FIG. 23 is constructed in a generally similar manner as the encoder of FIG. 3. For brevity, only the differences between these encoders will be discussed.

Structure mode decision circuit 34(*a*) is adapted to select one of the first and second structure modes for a frame using one of the techniques previously described, to generate a structure selection signal EN1 when the first structure mode is selected and a structure selection signal EN2 when the second structure mode is selected, and to supply the structure selection signal EN1/EN2 to a decision circuit 33, an address generator 35(*a*), a frame memory 200 and a variable length code encoder 15'.

The decision circuit 33 is adapted to select which of frame-based or field-based motion prediction, and which of frame-based or field-based orthogonal transformation is most efficient, for each macroblock in a frame, in accordance with the structure mode selected for the frame, the field and frame similarity data FDAD, FMAD and the field and frame motion vectors FDMV, FMMV supplied thereto from the field and frame motion detectors 21, 22. That is, in the first structure mode, frame-based motion prediction is never selected, while in the second structure mode, intra-frame motion prediction is never selected. Furthermore, in the first structure mode, only field-based transformation is selected, since the data in a macroblock belongs to the same field, while in the second structure mode, either frame-based or field-based transformation may be selected.

The address generator 35(*a*) is adapted to generate addresses so that, when the first structure mode is selected, only odd field pixels are read out of the frame memory group 10 during an odd scanning cycle and only even field pixels are read out of the frame memory group 10 during an even scanning cycle, and when the second structure mode is selected, data is read out of the frame memory group 10 with either interlaced macroblocks or segregated macroblocks, depending on whether frame-based transformation or field-based transformation is selected by the decision circuit 33. When data for the first structure mode is read out of the frame memory group 10, it may be considered to be read out in macroblocks having two 8×8 blocks.

The variable length encoder 15' serves to add a structure indication bit to the picture header of the encoded picture data, indicating which of the first structure mode and second structure mode was used during encoding, in response to the structure selection signal EN1/EN2.

The frame memory 200 uses the structure selection signal EN1/EN2 when computing read out addresses for a reference picture stored therein.

The decoder of FIG. 24 is constructed in a generally similar manner as the decoder of FIG. 5. For brevity, only the differences between these decoders will be discussed.

A variable length decoder 510 is operable in generally the same manner as the variable length decoder 51 of FIG. 5. Additionally, the variable length decoder 510 is operable to extract a structure indication bit from the encoded data supplied to input terminal 50, identifying whether the encoded data is in the first structure mode or the second structure mode, and to supply the structure mode indication to each of motion compensators 590, 600, 630, 650, 660 and address generators 810, 820 and 830.

The motion compensators and address generators function in generally the same manner as the corresponding elements in FIG. 5, and are also operable to use the structure mode indication supplied from variable length decoder 510 to properly store and access the decoded original picture data in the buffers 61, 62, 63.

The buffer occupancy chart shown in FIG. 25 for the decoder of FIG. 24 will now be explained.

The characters 1*o* 1*e* 2*o* 2*e* . . . in the top row of FIG. 25 indicate field processing intervals.

As shown in the decoding sequence of FIG. 25, the encoded data, representing part of a stream of encoded data received at input terminal 50 of the decoder of FIG. 24, begins with an odd cycle of I picture data $I_{1o}$ followed by an even cycle of the same I picture data $I_{1e}$. This I picture may be the starting picture of a group of pictures (GOP), but is from a second or subsequently transmitted group, since a B picture from a 0th time, that is, a time preceding the 1st time of the I picture, follows the I picture. In other words, the B picture is from a previous group of pictures than the I picture. The B picture comprising $B_{0o}$ and $B_{0e}$ is transmitted (or reproduced) in the processing times 2*o* and 2*e*.

After the original picture data for the I picture is decoded, it is stored in buffer 64 of the decoder shown in FIG. 24, shown as buffer A in FIG. 25. After the original picture data for the B picture is decoded, it is stored in buffer 62 of the decoder, shown as buffer C in FIG. 25.

The P picture comprising $P_{3o}$ and $P_{3e}$, processed during processing times 3*o* and 3*e*, is decoded to original picture data, and it is stored in the buffer 61 of the decoder, shown as buffer B in FIG. 25.

Next, the B picture comprising $B_{2o}$ and $B_{2e}$ is processed during times 4*o* and 4*e*. Both possible reference pictures for this B picture, namely the I picture ($I_{1o}$, $I_{1e}$) and the P picture ($P_{3o}$, $P_{3e}$) are already stored in the decoder buffers A and B, so the B picture may be properly converted from differential data to original picture data, and then stored in the buffer C, replacing the previous B picture.

As shown in the display sequence of FIG. 25, the pictures are read out of the buffers A, B and C for display in the temporal sequence $B_{0o}$, $B_{0e}$, $I_{1o}$, $I_{1e}$, $B_{2o}$, $B_{2e}$, $P_{3o}$, $P_{3e}$.

During processing times 5*o* and 5*e*, a second P picture is processed, and after its original picture data is recovered, it is stored in buffer A, replacing the original I picture, and becoming accessible as a reference picture for motion prediction for the next B picture, processed during times 6*o* and 6*e*. In the display sequence, this B picture ($B_{4o}$, $B_{4e}$) precedes the P picture ($P_{5o}$, $P_{5e}$) from which it was predicted, and which preceded the B picture in the decoded data.

Variations of the encoder shown in FIG. 23 are shown in FIGS. 36–39. These variations will now be explained.

Figure 36:
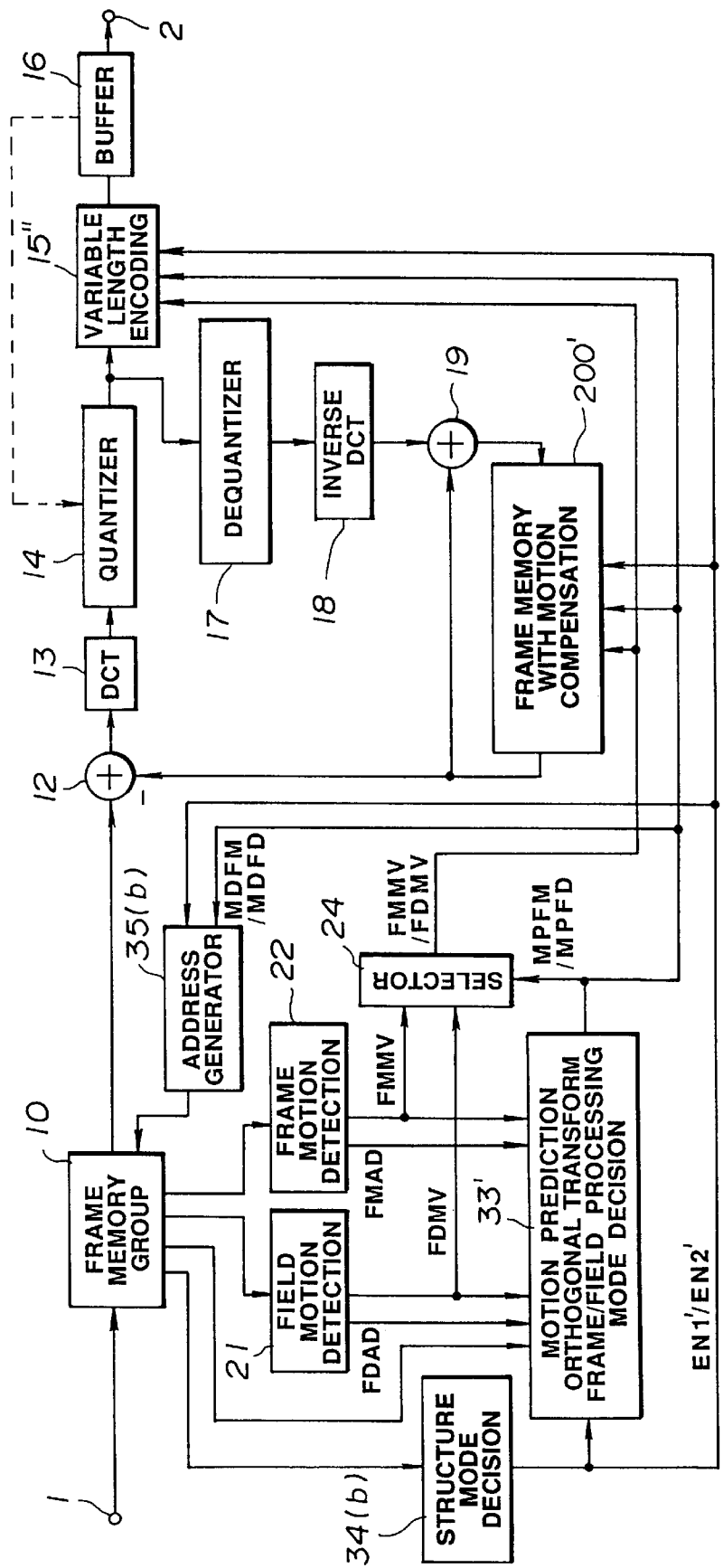
FIGS. 36–40 are block diagrams respectively showing an additional embodiment of an encoder according to the present invention.

The encoder of FIG. 36 is adapted to select one of the first and second structure modes on a slice-by-slice basis, rather than the frame-by-frame basis used in the encoder of FIG. 23.

Structure mode decision circuit 34(*b*) serves to select one of the first and second structure modes, using one of the techniques previously described, but instead of evaluating a parameter for a frame, the parameter is evaluated for a slice. Each of address generator 35(*b*) and frame memory 200' is adapted to operate in a similar manner as the corresponding elements of the encoder shown in FIG. 23 with a structure mode selection signal EN1'/EN2' which may change from slice to slice. The variable length decoder 15" is similar to the variable length decoder 15', but operates to insert the structure mode selection indicating bit into the slice header of the encoded signal rather than the picture header.

It will be understood that a decoder operable with the encoder shown in FIG. 36 is adapted to extract the structure mode indicating bit from the slice headers in an encoded signal, and to process the encoded signal in an otherwise similar manner to the decoder shown in FIG. 24, with the structure mode possibly differing at each slice.

Figure 37:
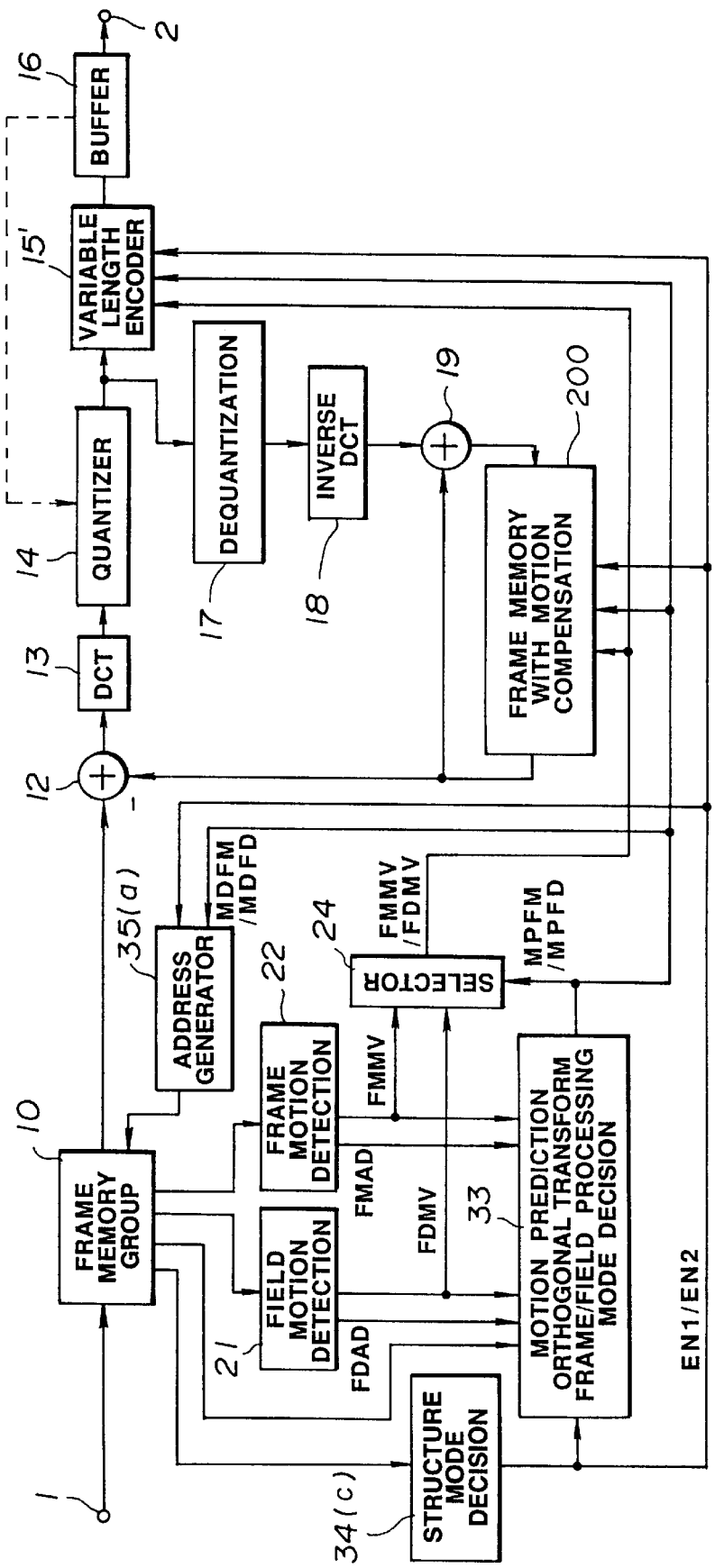

The encoder of FIG. 37 is adapted to select one of the first and second structure modes as a function of the cumulative values of FDAD and FMAD for a frame, referred to as SFDAD and SFMAD, respectively.

A structure mode decision circuit 34(c) functions to generate the similarity data FDAD and FMAD for each macroblock in a frame to be encoded, and sums these respective data for all of the macroblocks in a frame to obtain similarity data SFDAD and SFMAD. When SFDAD exceeds SFMAD plus a predetermined threshold, the first structure mode is selected, otherwise the second structure mode is selected.

Figure 38:
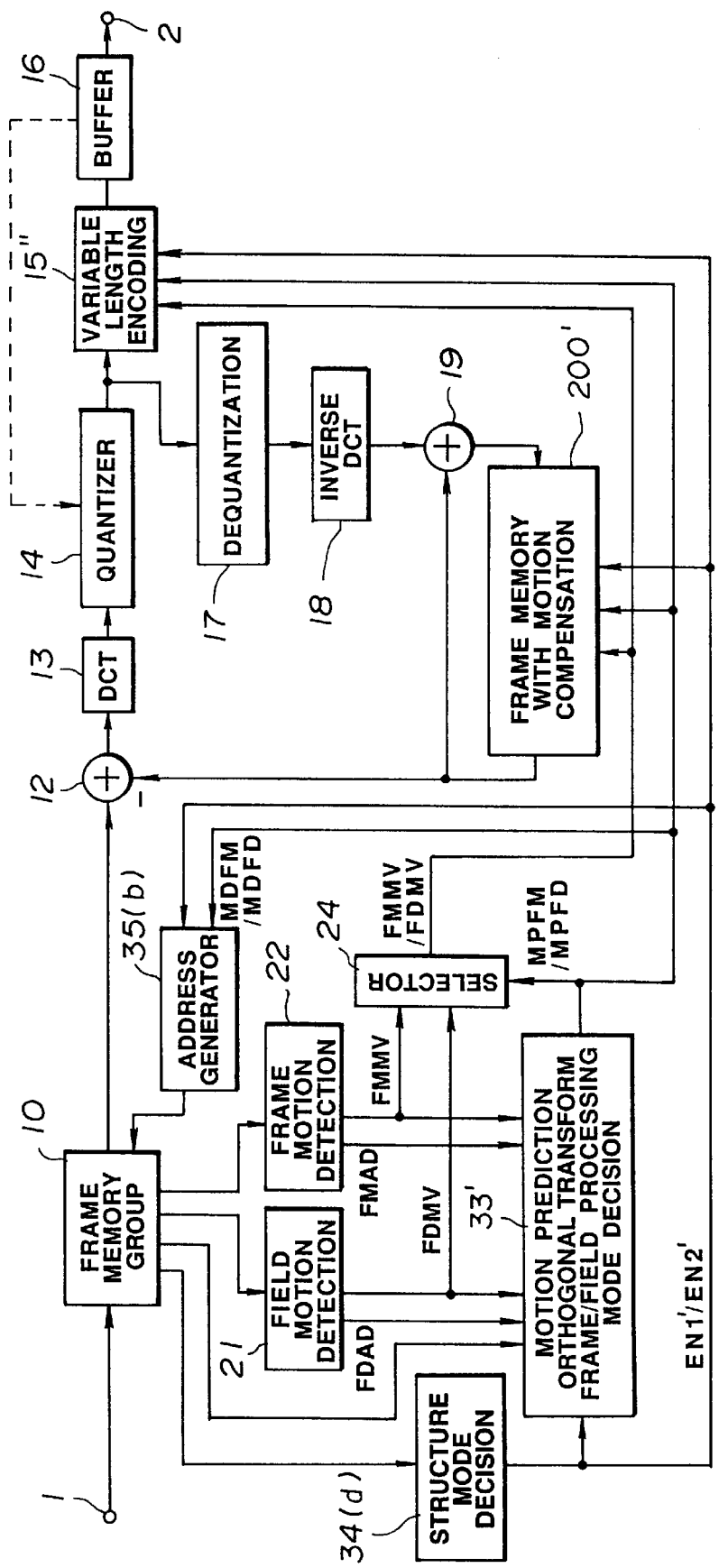

The encoder of FIG. 38 is adapted to select one of the first and second structure modes as a function of the cumulative values of FDAD and FMAD for a slice, referred to as SLCFMAD and SLCFDAD, respectively.

A structure mode decision circuit 34(d) serves to generate the similarity data FDAD and FMAD for each macroblock in a frame to be encoded, and sums these respective data for all of the macroblocks in a slice to obtain similarity data SFDAD and SFMAD. When SFDAD exceeds SFMAD plus a predetermined threshold, the first structure mode is selected for the slice, otherwise the second structure mode is selected.

Figure 39:
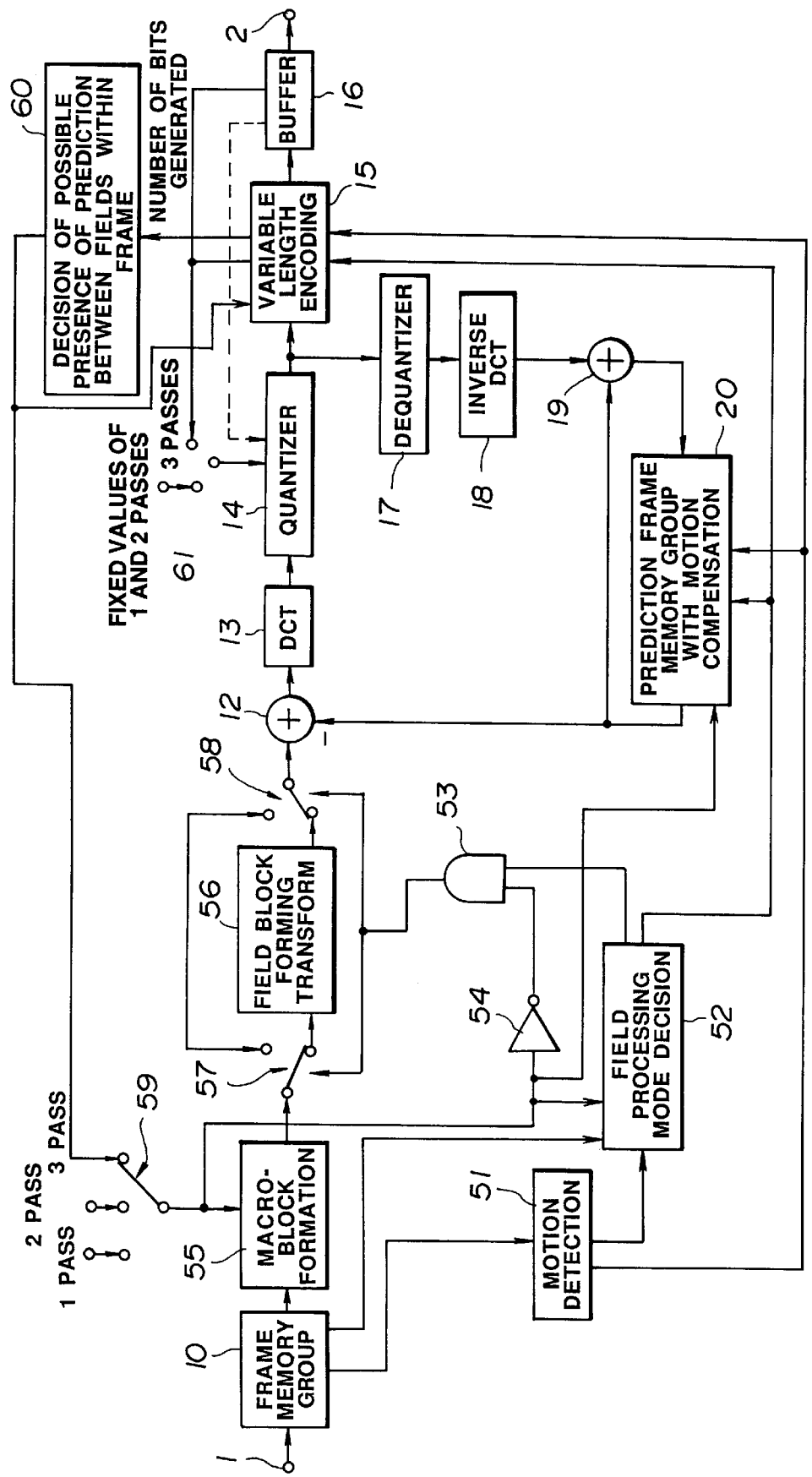

The encoder of FIG. 39 is adapted to select one of the first and second structure modes for a frame using a three pass method. In the first pass, a first value is determined representing an amount of data that would be produced if the frame were encoded in the first structure mode with a fixed quantization width. In the second pass, a second value is determined representing an amount of data that would be produced if the frame were encoded in the second structure mode with a fixed quantization width. In the third pass, the picture data are encoded with a controlled quantization width using the one of the first and second structure modes which results in the lesser of the first and second values determined in the first and second passes.

A macro-block unit 55, a changeover switch 57, a field block-forming transform circuit 56 and another changeover switch 58 are connected to a downstream side of the frame memory group 10. Picture data from the frame memory group 10 is transmitted to a motion detection circuit 51 effectuating frame and field motion detection. An output of the motion detection circuit 51 is transmitted to a processing mode decision circuit for selecting the frame/field modes for motion detection and block division for orthogonal transform 52, frame memory group 20 and the variable length encoding circuit 15.

Output mode data from the processing mode decision circuit 52 is transmitted to the frame memory group 20 and the variable length encoding circuit 15. Of these data, field processing mode data are supplied to one input terminal of a two-input AND gate 53. An output of the changeover switch 59, which is changed over depending on the pass numbers 1 to 3 is supplied to the other input terminal of the AND gate 53. An output terminal of the 2-input AND gate is connected to movable terminals of the changeover switches 57, 58.

Data of the number of the produced bits is outputted from the variable length encoding circuit 15 and transmitted to a selecting circuit 60 for selecting one of the-first and second structure modes with smaller number of produced bits based on the data of the number of the produced bits (circuit for deciding whether or not there is interfield prediction between the fields in one frame). The stored volume data from buffer 16 is transmitted to the variable length encoding circuit 15 and to one of the fixed terminals of the changeover switch 61. Fixed values of the first and second passes are supplied to the other fixed terminal of the changeover switch 61.

In the encoder of FIG. 39, the picture entered to terminal 1 is temporarily stored in the frame memory group 10. Frame or field data are fetched as required from the frame memory 10 and, using these picture data, the motion vector is found by the motion detector 51. The processing mode decision circuit 52 gives a decision of the field/frame mode for each macro-block from the motion prediction residues from the motion detector 51. The macro-block unit 55, connected to the downstream stage of the frame memory group 10, receives the information for the first, second and third passes, that is the information of the presence/absence of interfield prediction within one frame which is the above-mentioned second or first structure mode, via changeover switch 59. If the macro-block unit 55 has received the first structure mode information, it transmits only the block of the odd field (first field) and subsequently transmits the even field (second field), while turning off the block division of the frame processing mode. The picture data the macro-blocks of which are set to the frame processing mode based on the information of the second structure mode in the macro-block unit 55 is set to the block of the frame processing mode in the field block division conversion circuit 56. 1 bit is added to the selected mode information for each frame.

When a picture is encoded on a slice-by-slice basis, the present invention also comprehends use of the three pass method for determining which of a first structure mode and a second structure mode should be used to encode the picture.

Figure 40:
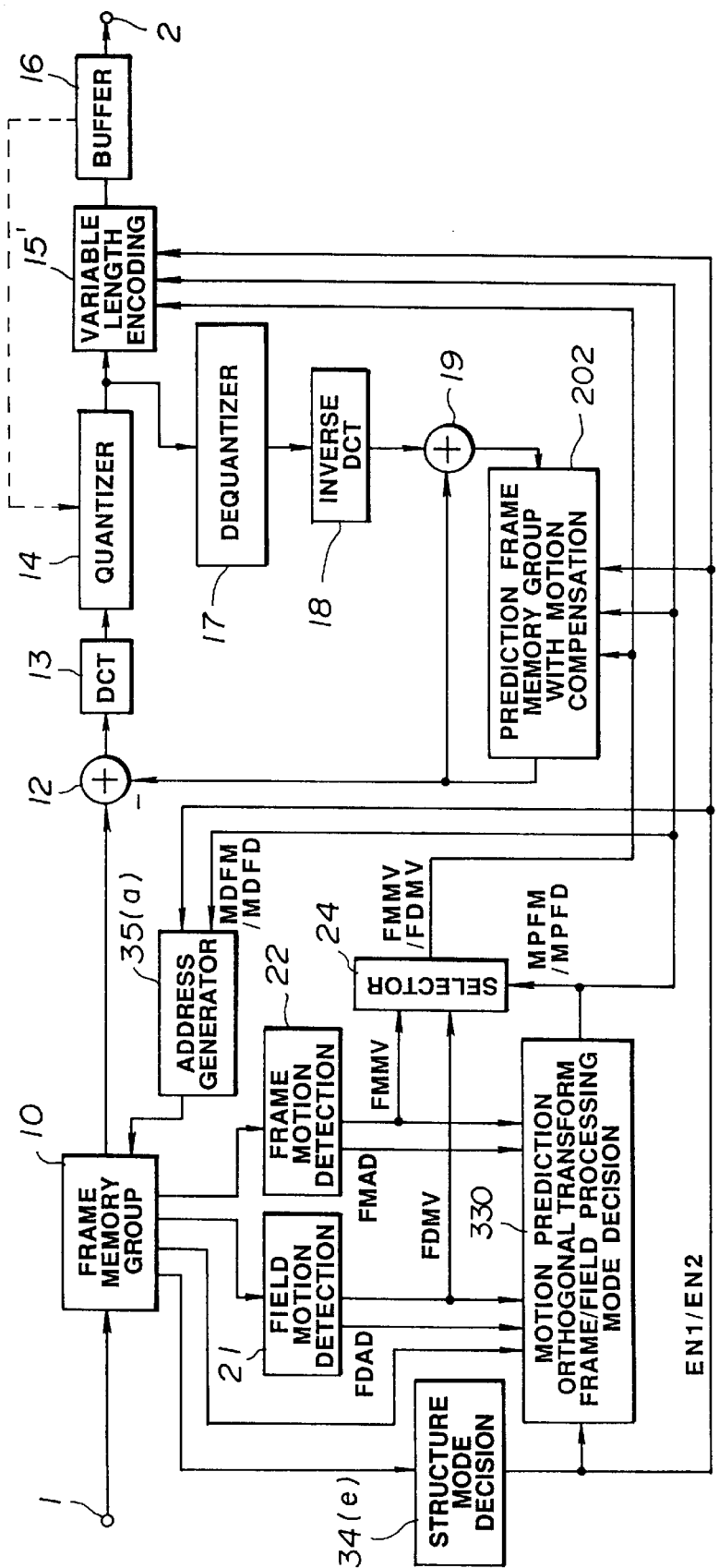
Figure 41:
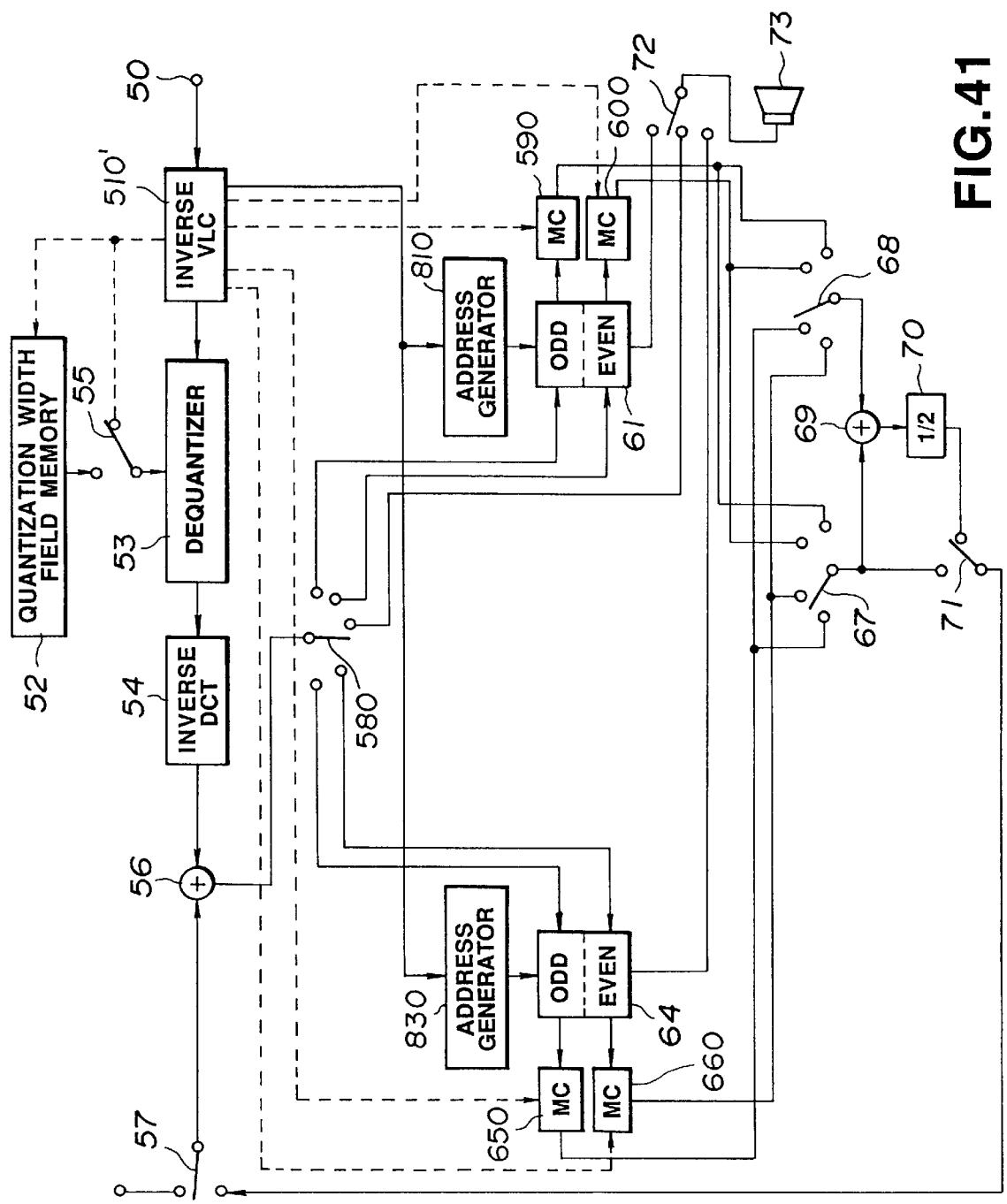
FIG. 41 is a block diagram showing another embodiment of a decoder according to the present invention.
Figure 42:
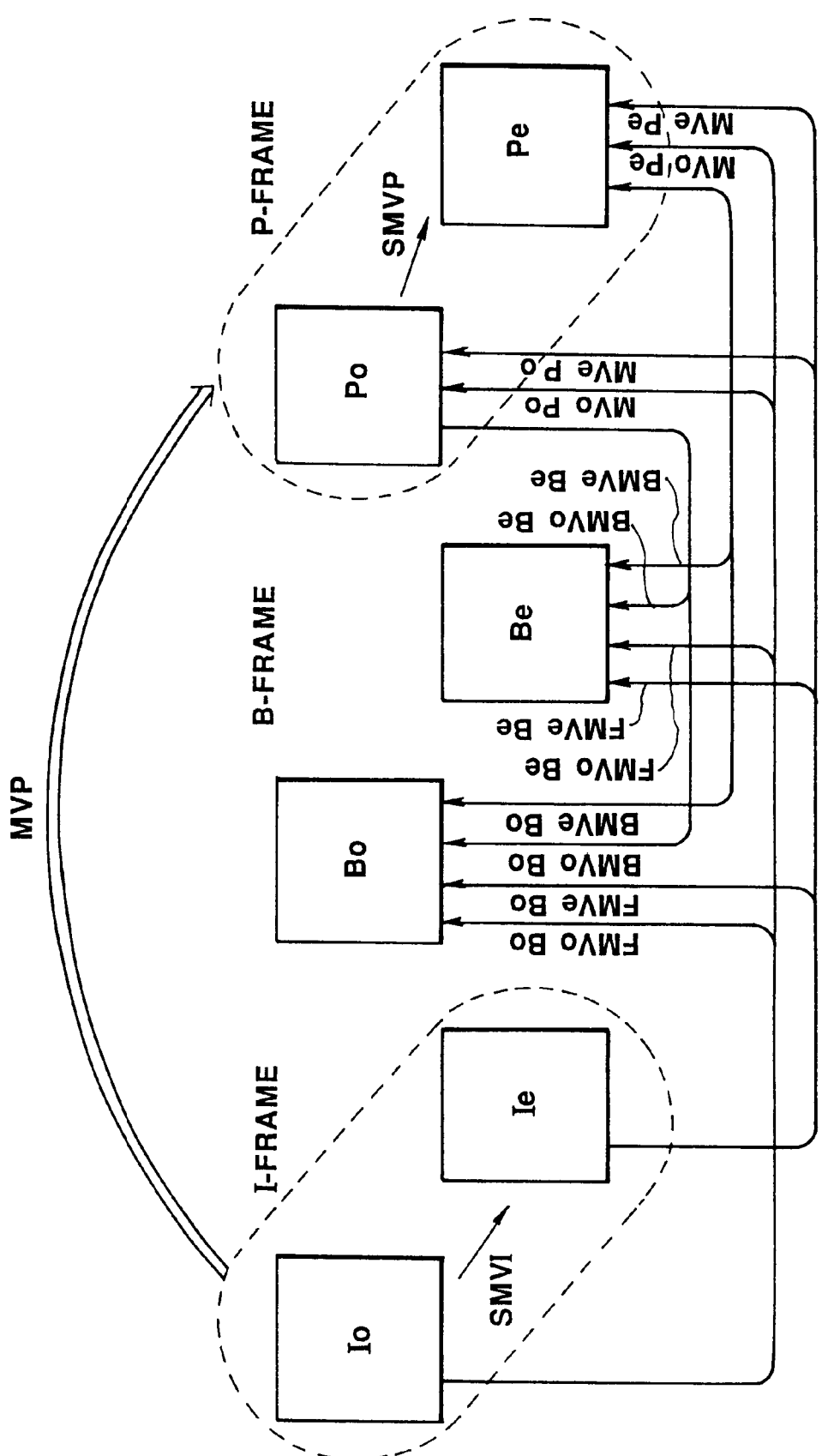
FIG. 42 is a chart illustrating motion vectors used in predictive encoding in the encoder shown in FIG. 40.
Figure 43:
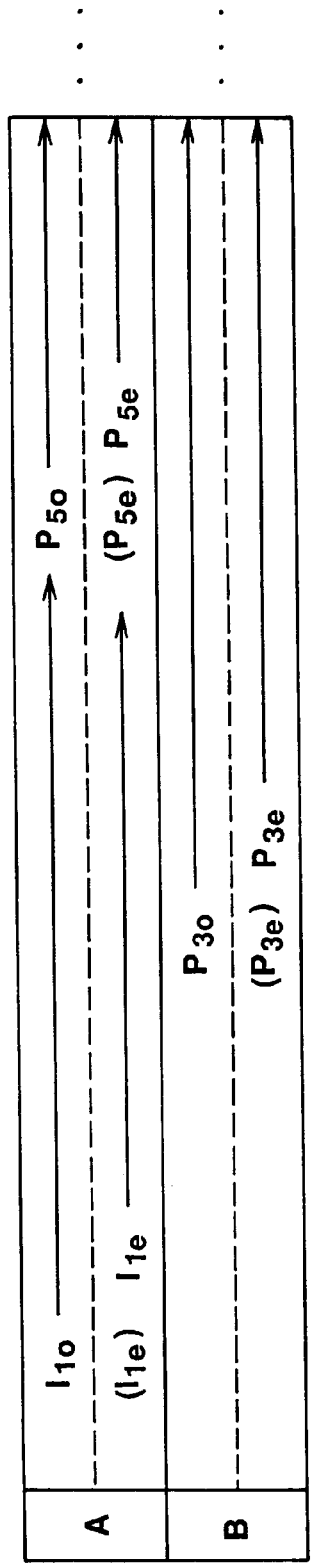
FIGS. 43 and 44 are charts respectively showing buffer occupancy in the decoder shown in FIG. 41.
Figure 44:
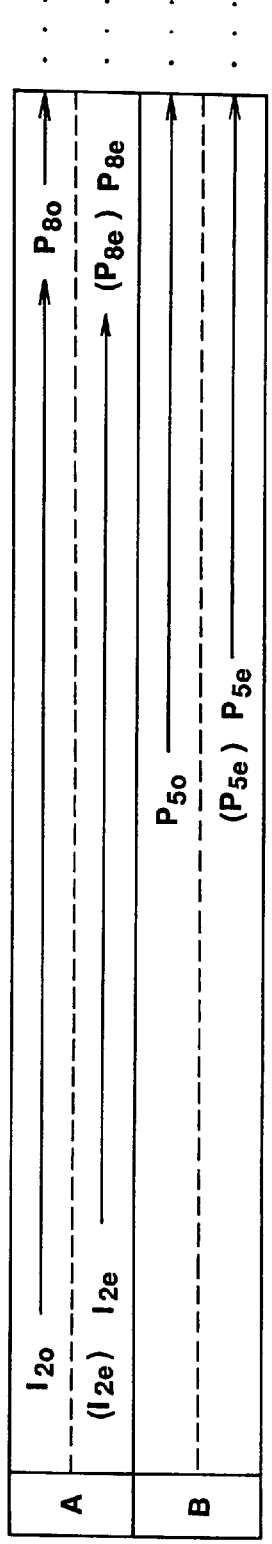

FIGS. 40 and 41 show an encoder and decoder, respectively, which use only two frames (four fields) of buffer memory, instead of the three frames (six fields) used by the encoder and decoder of FIGS. 23 and 24. FIG. 42 shows motion prediction possibilities for the encoder and decoder of FIGS. 40 and 41. FIGS. 43 and 44 show buffer occupancy charts for the decoder of FIG. 41.

Referring to the buffer occupancy chart shown in FIG. 25 for the decoder of FIG. 24, it will be seen that the position of a B picture is the same in the decoding sequence and the display sequence. However, the B picture needs to be stored, since in the first structure mode, the odd field of the B picture may be needed to predict the even field of this B picture, while in the second structure mode when frame-based transformation was used during encoding, both fields of the B picture are decoded at the same time, so that neither field is available until the frame is decoded.

The present invention recognizes that, if the need for storage of a B picture is eliminated, one of the frame buffers in a decoder and in the frame memory group with motion compensation in an encoder may also be eliminated.

The encoder of FIG. 40 is constrained so that, for a B picture, only the first structure mode is selected, and intra-frame prediction for the B picture is not permitted. Thus, a B picture is always encoded on a field-by-field basis, with the entirety of the data for the odd B field being available before decoding of the even B field commences. Furthermore, a B picture is never used for prediction.

FIG. 42 shows the prediction possibilities for the encoder of FIG. 40. Since a B picture is encoded in only the first structure mode, the frame motion vectors FMVB, BMVB are absent. Since intra-frame prediction is not permitted for a B picture, the field motion vector SMVB is absent.

The encoder of FIG. 40 functions in a generally similar manner as the encoder of FIG. 23. For brevity, only the differences between these encoders will be discussed.

In the encoder of FIG. 40, a structure mode decision circuit 34(e) is operative to select only the first structure mode for a B picture. A decision circuit 330 is operative so that intra-frame prediction for a B picture is never selected, that is, in the first structure mode, inter-field prediction is selected for a B picture, and in the second structure mode, either inter-frame or inter-field prediction is selected for a B picture. A frame memory group 202 has only two frame buffers of capacity for storing previously encoded data, and operates in a generally similar manner as the decoder of FIG. 41.

The decoder of FIG. 41 functions in a generally similar manner as the decoder of FIG. 24. For brevity, only the differences between these decoders will be discussed.

A variable length decoder 510' is coupled to fewer motion compensators than the variable length decoder 510 of FIG. 24, specifically, four motion compensators rather than five. A switch 580 has fewer output terminals than the switch 58 of FIG. 24, specifically, five output terminals rather than six. Importantly, the decoder in FIG. 41 has fewer frame buffers and motion compensators than the decoder in FIG. 24, specifically, two frame buffers rather than three, and four motion compensators rather than five. Thus, the decoder of FIG. 41 may be constructed as a smaller circuit than the decoder of FIG. 24. The decoder of FIG. 41 is also cheaper to construct, since it requires fewer elements.

The buffer occupancy chart of FIG. 43 for the decoder of FIG. 41 illustrates the same sequence of encoded data presented at input terminal 50 of the decoder as the chart of FIG. 25. Although a frame buffer has been eliminated, it will be seen that the display sequence is identical to that of FIG. 25, since the B pictures were predicted with the above-described constraints.

The buffer occupancy chart of FIG. 44 for the decoder of FIG. 41 illustrates a sequence of encoded data having two B pictures between reference pictures, rather than one B picture between reference pictures, as shown in each of FIGS. 25 and 43. The B picture data is displayed as it is decoded, and predicted with the above-described constraints, so only two frame buffers in the decoder are sufficient.

It will be appreciated that, when B pictures are encoded with the above-described constraints, more than two B pictures may be between the reference pictures, and yet the decoder functions properly with only two frame buffers.

Figure 45:
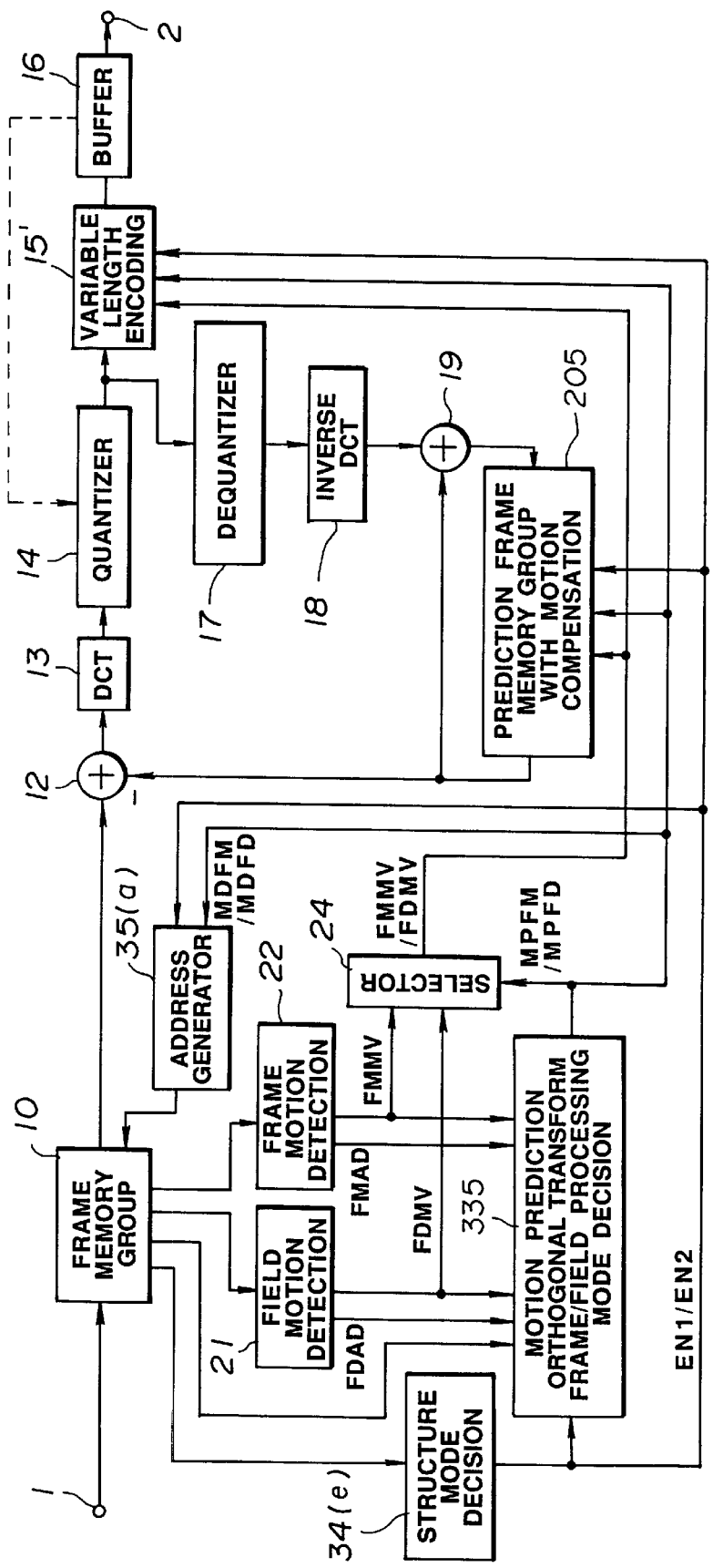
FIG. 45 is a block diagram showing another embodiment of an encoder according to the present invention.
Figure 46:
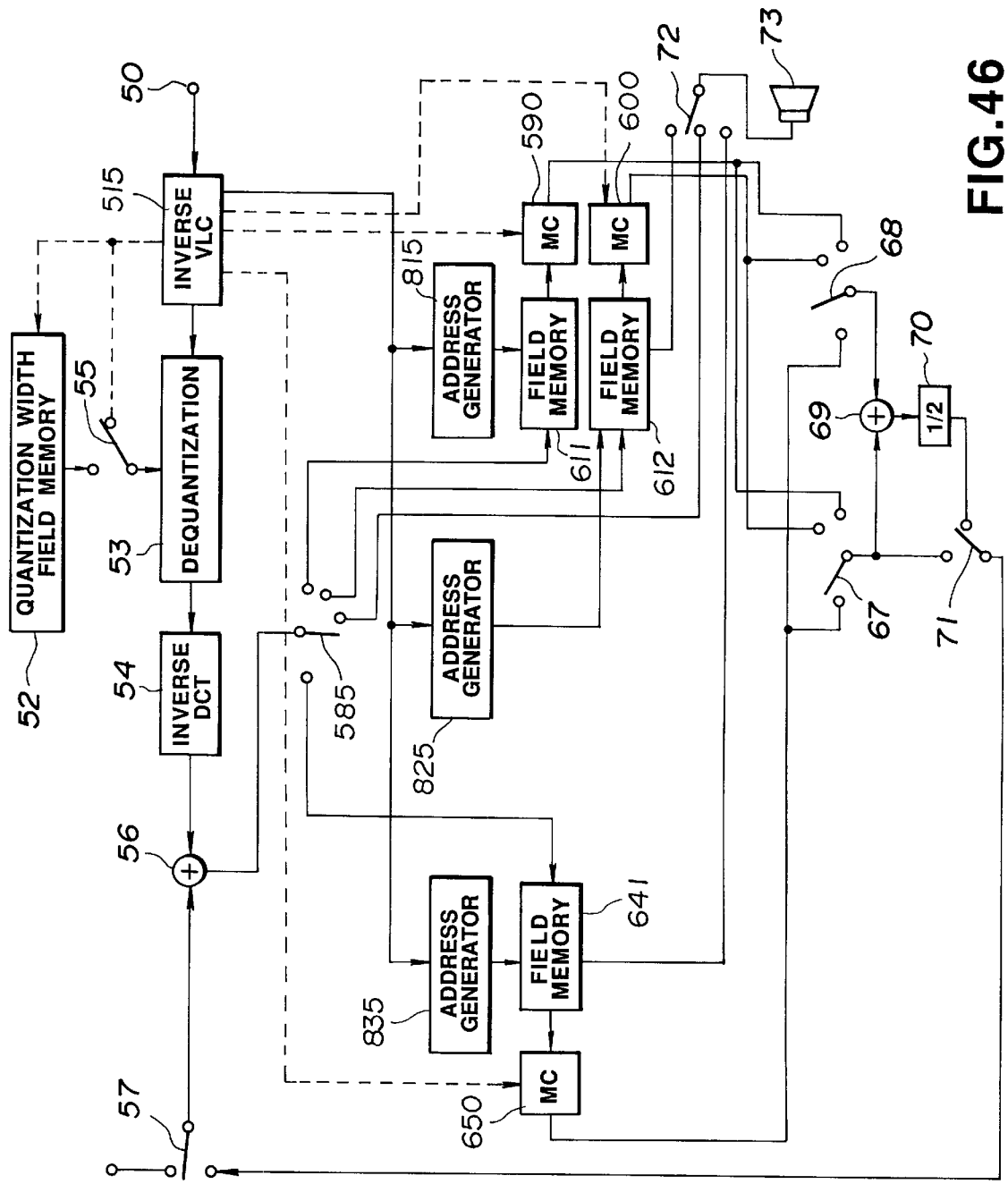
FIG. 46 is a block diagram showing another embodiment of a decoder according to the present invention.
Figure 47:
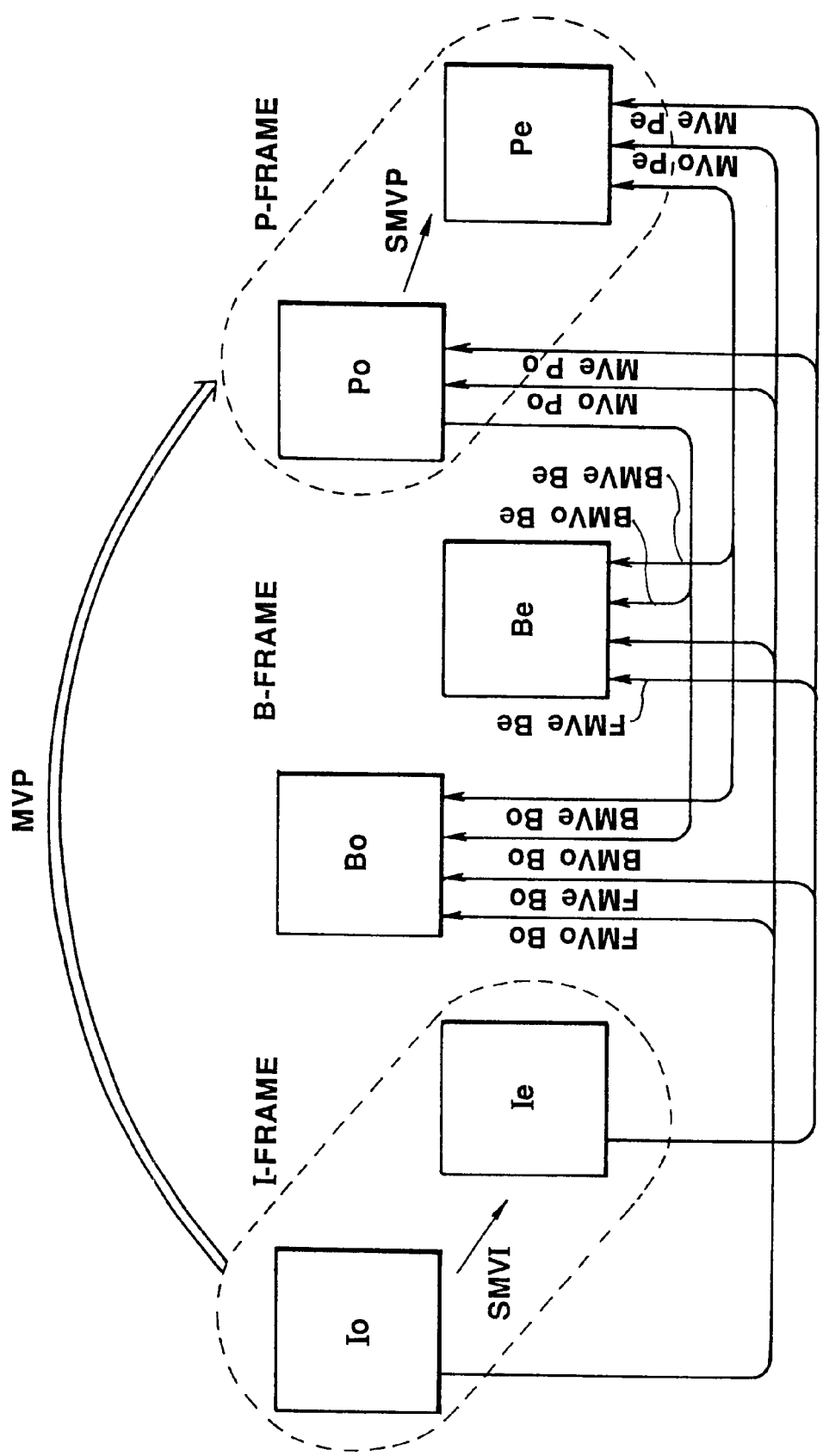
FIG. 47 is a chart illustrating motion vectors used in predictive encoding in the encoder shown in FIG. 45.
Figure 48:
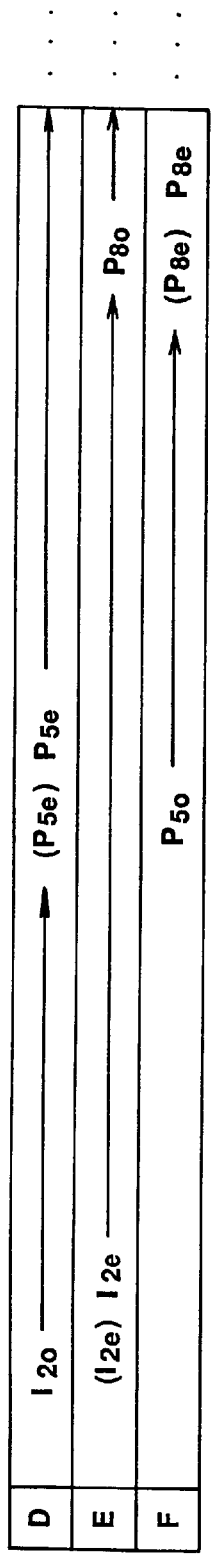
FIG. 48 is a chart showing buffer occupancy in the decoder shown in FIG. 46.

FIGS. 45 and 46 show an encoder and decoder, respectively, which use only one and one-half frames (three fields) of buffer memory, instead of the three frames (six fields) used by the encoder and decoder of FIGS. 23 and 24. FIG. 47 shows motion prediction possibilities for the encoder and decoder of FIGS. 45 and 46. FIG. 48 shows a buffer occupancy chart for the decoder of FIG. 46.

FIG. 47 shows the prediction possibilities for the embodiments of the present invention shown in FIGS. 45 and 46. It will be seen that forward prediction of a B picture from an odd field of a reference picture is not permitted. Specifically, the chart of FIG. 47 lacks the forward-predictive motion vectors FMVoBo, FMVoBe. Forward prediction may be performed from an I picture or a P picture, although the chart of FIG. 47 shows only an I picture used for forward prediction. As in the chart of FIG. 42, inter-frame and intra-frame B picture prediction are inhibited.

The encoder of FIG. 45 operates in a generally similar manner as the encoder of FIG. 40. For brevity, only the differences between these encoders will be discussed.

A decision circuit 335 is operative so that a field of a B picture is predicted from one of a past even field, a future even field or a future odd field of a respective reference (I or P) picture, or two reference pictures. That is, a field of a B picture is not predicted from either a past odd field of a reference picture or the other field of the same frame as the field of the B picture.

A frame memory group 205 is generally constructed in the same manner as the decoder in FIG. 46, that is, with only three fields of memory for previously encoded pictures, and operates in generally the same manner.

The decoder in FIG. 46 functions in a generally similar manner as the decoder of FIG. 41. For brevity, only the differences between these decoders will be discussed.

A variable length decoder 515 distributes information in a different sequence than the variable length decoder 510' of FIG. 41. The information distribution sequence of the decoder 515 is described below. A switch 585 has only four output terminals, whereas the switch 580 of FIG. 41 has five output terminals.

An important difference between the decoder of FIG. 46 and the decoder of FIG. 41 is that the former has three field buffers 611, 612, 641, whereas the latter has two frame buffers 61, 64, providing memory for four fields. That is, the decoder of FIG. 46 requires one less field memory than the decoder of FIG. 41.

FIG. 48 shows a buffer occupancy chart for the decoder of FIG. 46. During field processing times 1o and 1e, an I picture ($I_{2o}$, $I_{2e}$) is decoded, and the original picture data is stored in the field buffers 611, 612, indicated as field buffers D, E in FIG. 48. During field processing times 2o 2e 3o 3e, two B pictures possibly depending on preceding reference pictures are received. To avoid confusion, their processing will not be described.

During field processing time 4o, a P picture portion $P_{5o}$ is received at input terminal 50, decoded, and the original picture data is stored in the field buffer 641, indicated as field buffer F in FIG. 48. During this time, the I picture portion $I_{2o}$ in buffer D is displayed.

During field processing time 4e, a P picture portion $P_{5e}$ is received at input terminal 50, decoded, and the original picture data is stored in the field buffer D, from which the I picture portion $I_{2o}$ has been read out in the previous processing time 4o. During this time, the I picture portion $I_{2e}$ is displayed.

During field processing times 5o 5e 6o 6e, two B pictures predicted with one or more of the fields $I_{2e}$, $P_{5o}$, $P_{5e}$ are received and are properly decoded since these fields are stored in buffers D, E, F. These B pictures are displayed as soon as they are decoded, so they are not stored.

During field processing times 7o, 7e, a P picture ($P_{8o}$, $P_{8e}$) is received, decoded and stored in buffers E, F. During these times, the P picture ($P_{5o}$, $P_{5e}$) is displayed.

It will be appreciated that when the next P picture is received, it is stored in buffers D, E, since the P picture portion $P_{8o}$ is not used for forward prediction of a B picture.

Thus, information is stored in the field buffers in the sequence D, E, F, D, E, F, D, E, . . . , having a cycle D, E, F. The variable length decoder 515 distributes information in accordance with this sequence.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A picture signal encoding method comprising the steps of:

receiving an interlaced signal having frames each containing an odd field and an even field, said interlaced signal representing a current picture and at least one other picture;

selecting either a first or second mode of encoding, said first mode being carried out by an intra-frame prediction encoding technique and field-based orthogonal transformation and said second mode being carried out by an inter-frame prediction encoding technique and frame-based orthogonal transformation;

predictively encoding the current picture relative to said at least one other picture by the prediction encoding technique that is carried out by the selected mode of encoding; and orthogonally transforming the predictively encoded current picture by the orthogonal transformation that is carried out by the selected mode of encoding.

2. A picture signal encoding apparatus comprising:

means for receiving an interlaced signal having frames each containing an odd field and an even field, said interlaced signal representing a current picture and at least one other picture;

means for selecting either a first or second mode of encoding, said first mode being carried out by an intra-frame predictive encoding technique and field-based orthogonal transformation and said second mode being carried out by an inter-frame predictive encoding technique and frame-based orthogonal transformation;

means for predictively encoding the current picture relative to said at least one other picture by the predictive encoding technique that is carried out by the selected mode of encoding; and means for orthogonally transforming the predictively encoded current picture by the orthogonal transformation that is carried out by the selected mode of encoding.

3. An encoded picture signal produced by:

receiving an interlaced signal having frames each containing an odd field and an even field, said interlaced signal representing a current picture and at least one other picture;

selecting either a first or second mode of encoding, said first mode being carried out by an intra-frame predictive encoding technique and field-based orthogonal transformation, and said second mode being carried out by an inter-frame predictive encoding technique and frame-based orthogonal transformation;

predictively encoding the current picture relative to said at least one other picture by the predictive encoding technique that is carried out by the selected mode of encoding; and orthogonally transforming the predictively encoded current picture by the orthogonal transformation that is carried out by the selected mode of encoding.

4. The method of claim 1, wherein field-based predictive encoding between fields in different frames is carried out in said second mode.

* * * * *